United States Patent
He et al.

(10) Patent No.: US 10,218,265 B2
(45) Date of Patent: Feb. 26, 2019

(54) STATE SPACE-BASED MULTI-LEVEL VOLTAGE REGULATOR SYSTEM

(71) Applicant: TDK-Lambda Corporation, Tokyo (JP)

(72) Inventors: Jin He, Plano, TX (US); Jeffrey John Boylan, Richardson, TX (US)

(73) Assignee: TDK-LAMBDA CORPORATION, Tokyo (JP)

( * ) Notice: Subject to any disclaimer, the term of this patent is extended or adjusted under 35 U.S.C. 154(b) by 29 days.

(21) Appl. No.: 15/346,484

(22) Filed: Nov. 8, 2016

(65) Prior Publication Data

US 2017/0063220 A1    Mar. 2, 2017

Related U.S. Application Data

(60) Division of application No. 13/968,955, filed on Aug. 16, 2013, now Pat. No. 9,520,772, which is a
(Continued)

(51) Int. Cl.
*H02M 3/04* (2006.01)
*G05F 1/10* (2006.01)
(Continued)

(52) U.S. Cl.
CPC .......... *H02M 3/04* (2013.01); *G05F 1/10* (2013.01); *H02M 3/08* (2013.01); *H02M 3/3378* (2013.01);
(Continued)

(58) Field of Classification Search
CPC ....................................................... H03M 3/04
See application file for complete search history.

(56) References Cited

U.S. PATENT DOCUMENTS

| | | |
|---|---|---|
| 4,254,301 A | 3/1981 | Serino |
| 4,362,904 A | 12/1982 | Schneider et al. |

(Continued)

OTHER PUBLICATIONS

"Negative 48V Hot Swap Controller," Linear Technology, LT5250L/LT4250H, pp. 1-14.

(Continued)

*Primary Examiner* — Jue Zhang
*Assistant Examiner* — Trinh Q Dang
(74) *Attorney, Agent, or Firm* — David W. Carstens; Stephen Y. Liu; Carstens & Cahoon, LLP

(57) ABSTRACT

A multi-level voltage regulator system/method providing discrete regulation of a DC-DC intermediate bus converter (IBC) output voltage (Vout) is disclosed. The disclosed system/method allows IBC Vout to be regulated in discrete steps during periods where IBC input voltage (Vin) falls below nominal operating values. Rather than shutting down or degrading IBC Vout in an unpredictable non-linear fashion based on IBC input/loading, IBC Vout is regulated in fixed discrete steps, allowing IBC-connected point-of-load (POL) converters to obtain stable power input that is well-defined over IBC Vin. IBC operating parameters may define multi-dimensional operational state spaces of IBC Vout regulation that ensure optimum power flow to attached POLs while maintaining operational stability within the IBC regulator. Instabilities in IBC/POL performance across variations in IBC Vin, load transients, POL loading, and environmental variables may be prevented using Vin voltage step hysteresis.

20 Claims, 40 Drawing Sheets

Related U.S. Application Data continuation-in-part of application No. 13/070,959, filed on Mar. 24, 2011, now Pat. No. 8,934,267, said application No. 13/968,955 is a continuation-in-part of application No. 13/293,022, filed on Nov. 9, 2011, now Pat. No. 9,143,047.

(60) Provisional application No. 61/411,672, filed on Nov. 9, 2010.

(51) Int. Cl.
  *H02M 3/08* (2006.01)
  *H02M 3/337* (2006.01)
  *H02M 3/335* (2006.01)
  *H02M 1/00* (2006.01)

(52) U.S. Cl.
  CPC .. *H02M 3/33592* (2013.01); *H02M 2001/008* (2013.01); *H02M 2001/0022* (2013.01); *Y02B 70/1475* (2013.01)

(56) References Cited

U.S. PATENT DOCUMENTS

| | | | |
|---|---|---|---|
| 5,138,249 A | 8/1992 | Capel | |
| 5,150,282 A | 9/1992 | Tomura et al. | |
| D340,907 S | 11/1993 | Smith et al. | |
| 5,303,123 A | 4/1994 | Chandler et al. | |
| 5,303,138 A | 4/1994 | Rozman | |
| D356,291 S | 3/1995 | Kawamura | |
| D363,056 S | 10/1995 | Vinciarelli et al. | |
| 5,481,436 A | 1/1996 | Werther | |
| 5,590,032 A | 12/1996 | Bowman et al. | |
| 5,625,541 A | 4/1997 | Rozman | |
| 5,636,116 A | 6/1997 | Milavec et al. | |
| 5,659,461 A | 8/1997 | Inou et al. | |
| 5,870,290 A | 2/1999 | Chun et al. | |
| 5,880,930 A | 3/1999 | Wheaton | |
| 5,907,481 A | 5/1999 | Svardsjo | |
| 5,910,885 A | 6/1999 | Gulachenski et al. | |
| 5,920,475 A | 7/1999 | Boylan et al. | |
| D412,887 S | 8/1999 | Johnston | |
| 5,933,343 A | 8/1999 | Lu et al. | |
| 5,940,287 A | 8/1999 | Brkovic | |
| 5,999,417 A | 12/1999 | Schlecht | |
| 6,038,154 A | 3/2000 | Boylan et al. | |
| 6,088,243 A | 7/2000 | Shin | |
| 6,101,104 A | 8/2000 | Eng | |
| 6,169,675 B1 | 1/2001 | Shimamori et al. | |
| 6,189,203 B1 | 2/2001 | Heinrich et al. | |
| 6,191,954 B1 | 2/2001 | Keidl et al. | |
| 6,191,964 B1 | 2/2001 | Boylan et al. | |
| 6,201,304 B1 | 3/2001 | Moden | |
| 6,208,516 B1 | 3/2001 | Fangonilo et al. | |
| 6,222,742 B1 | 4/2001 | Schlecht | |
| D442,913 S | 5/2001 | Nagahara et al. | |
| 6,232,562 B1 | 5/2001 | Kikuchi et al. | |
| D464,317 S | 10/2002 | Tomioka | |
| D465,199 S | 11/2002 | Tomioka | |
| D466,076 S | 11/2002 | Nagashima et al. | |
| 6,519,163 B1 | 2/2003 | Yoshimoto et al. | |
| 6,545,890 B2 | 4/2003 | Pitzele | |
| 6,567,284 B2 | 5/2003 | Huang | |
| 6,577,109 B2 | 6/2003 | Dancy et al. | |
| 6,594,159 B2 | 7/2003 | Schlecht | |
| 6,646,895 B1 | 11/2003 | Jacobs | |
| 6,731,514 B2 | 5/2004 | Evans | |
| 6,731,520 B2 | 5/2004 | Schlecht | |
| 6,894,468 B1 | 5/2005 | Bretz et al. | |
| 6,896,526 B2 | 5/2005 | Pitzele | |
| 6,927,987 B2 | 8/2005 | Farrington et al. | |
| 7,035,119 B2 | 4/2006 | Koike | |
| 7,050,309 B2 | 5/2006 | Farrington | |
| 7,005,146 B2 | 6/2006 | Lee | |
| 7,072,190 B2 | 7/2006 | Schlecht | |
| 7,085,146 B2 | 8/2006 | Pitzele | |
| 7,119,524 B2 | 10/2006 | Bretz et al. | |
| 7,218,086 B1 * | 5/2007 | Ritter | H05B 33/0815 323/284 |
| 7,269,034 B2 | 9/2007 | Schlecht | |
| 7,272,021 B2 | 9/2007 | Schlecht et al. | |
| 7,272,023 B2 | 9/2007 | Schlecht | |
| 7,304,867 B2 | 12/2007 | usui | |
| 7,333,535 B2 | 2/2008 | Redfern | |
| 7,345,891 B2 | 3/2008 | Barsun et al. | |
| 7,417,861 B2 | 8/2008 | Kikuchi et al. | |
| 7,558,083 B2 | 7/2009 | Schlecht | |
| 7,564,702 B2 | 7/2009 | Schlecht | |
| 7,696,733 B2 | 4/2010 | Osaka | |
| 7,765,687 B2 | 8/2010 | Pitzele et al. | |
| 7,787,261 B2 | 8/2010 | Farrington et al. | |
| 2002/0131258 A1 | 9/2002 | Inoue et al. | |
| 2003/0057548 A1 | 3/2003 | Hartke et al. | |
| 2004/0207459 A1 | 10/2004 | Farkas et al. | |
| 2004/0259434 A1 | 12/2004 | Pitzele | |
| 2005/0007082 A1 | 1/2005 | Bretz et al. | |
| 2005/0094356 A1 | 5/2005 | Onizuka et al. | |
| 2005/0110559 A1 | 5/2005 | Farkas et al. | |
| 2005/0189566 A1 | 9/2005 | Matsumoto et al. | |
| 2005/0259448 A1 | 11/2005 | Koike | |
| 2006/0044762 A1 | 3/2006 | Kikuchi et al. | |
| 2006/0164811 A1 | 7/2006 | Maxwell et al. | |
| 2006/0284308 A1 | 12/2006 | Harada et al. | |
| 2008/0291707 A1 | 11/2008 | Fang | |
| 2008/0304299 A1 | 12/2008 | Gormann | |
| 2009/0097289 A1 | 4/2009 | Schetters | |
| 2010/0001704 A1 * | 1/2010 | Williams | H02M 3/157 323/283 |
| 2010/0091526 A1 | 4/2010 | Schlecht | |
| 2011/0063882 A1 | 3/2011 | Hawkes | |
| 2011/0096573 A1 | 4/2011 | Zhu et al. | |
| 2012/0112723 A1 | 5/2012 | He et al. | |
| 2012/0113687 A1 | 5/2012 | Wildrick | |
| 2013/0050954 A1 | 2/2013 | Albrecht, III et al. | |
| 2013/0258731 A1 * | 10/2013 | Xu | H02M 1/08 363/78 |

OTHER PUBLICATIONS

"Negative Voltage Hot Swap Controllers with ADC and I2C Monitoring," Linear Technology LTC4261/LTD4261-2, pp. 1-32.

"Maxeta iFA Series DC-DC Power Modules 48V Input, 42A Output, 504W Full Brick," Innoveta Technologies, Inc., iFA Advanced Datasheet Dec. 11, 2001, pp. 1-21.

"Power Supply for IT-Equipment / DC/DC-Converter," CB Test Certificate DE1-16122, International Electrotechnical Commission (IEC), Ref. Cert. No. DE1-16122, Jul. 22, 2002, pp. 1-2.

"Report on Component—Power Supplies, Informaton Technology Equipment, Including Electrical Business Equipment," File E220248, Project 02RT02035, Underwriters Laboratories Inc., 2002, pp. 1-3.

"Maxeta iFA Series DC-DC Power Modules 48V Input, 12V Output, 600W Full Brick"; TDK Innoveta, Inc.; Richardson, Texas, USA; Nov. 13, 2006; 18 pp.

Jitaru; "Constant Frequency Zero Voltage PWM Converters"; Power Conversion; Apr. 1992 Proceedings; pp. 428-439.

"Dual-Channel Digital Isolators, Enhanced System-Level ESD Reliability"; Analog Devices, Inc., Norwood, MA; 2007; 20 pp.

"Low-Power Dual Channel Digital Isolators"; Texas Instruments, Inc., Dallas, TX; SLLSE45B—Dec. 2010; 19 pp.

* cited by examiner

Present Invention
Exemplary Intermediate Bus Converter (IBC)
Three-Level Vout Vs. Vin Regulation Performance
(Without Hysteresis)

STATE SPACE-BASED MULTI-LEVEL VOLTAGE REGULATOR SYSTEM

CROSS REFERENCE TO RELATED APPLICATIONS

Divisional Application

This patent application is a divisional patent application of parent U.S. Utility Patent Application for "MULTI-LEVEL VOLTAGE REGULATOR SYSTEM AND METHOD", Ser. No. 13/968,955, filed electronically with the USPTO on Aug. 16, 2013 with EFS ID 16613582 and Confirmation Number 7362, issued as U.S. Pat. No. 9,520,772 on Dec. 13, 2016.

CIP Applications

Parent U.S. Utility Patent Application for "MULTI-LEVEL VOLTAGE REGULATOR SYSTEM AND METHOD", Ser. No. 13/968,955, filed electronically with the USPTO on Aug. 16, 2013 with EFS ID 16613582 and Confirmation Number 7362, issued as U.S. Pat. No. 9,520,772 on Dec. 13, 2016 is a continuation-in-part (CIP) of U.S. Utility Patent Application for "LOOSELY REGULATED FEEDBACK CONTROL FOR HIGH EFFICIENCY ISOLATED DC-DC CONVERTERS", Ser. No. 13/070,959, filed electronically with the USPTO on Mar. 24, 2011 with EFS ID 9732749 and Confirmation Number 3088.

Utility Patent Applications

Applicant claims benefit pursuant to 35 U.S.C. § 120 and hereby incorporates by reference U.S. Utility patent application for "LOOSELY REGULATED FEEDBACK CONTROL FOR HIGH EFFICIENCY ISOLATED DC-DC CONVERTERS", Ser. No. 13/070,959, filed electronically with the USPTO on Mar. 24, 2011 with EFS ID 9732749 and Confirmation Number 3088, issued as U.S. Pat. No. 8,934,267 on Jan. 13, 2015.

Applicant claims benefit pursuant to 35 U.S.C. § 120 and hereby incorporates by reference U.S. Utility Patent Application for "LOOSELY REGULATED FEEDBACK CONTROL FOR HIGH EFFICIENCY ISOLATED DC-DC CONVERTERS", Ser. No. 13/293,022, filed electronically with the USPTO on Nov. 9, 2011 with EFS ID 11374859 and Confirmation Number 3101, issued as U.S. Pat. No. 9,143,047 on Sep. 22, 2015.

Applicant claims benefit pursuant to 35 U.S.C. § 120 and hereby incorporates by reference U.S. Utility Patent Application for "MULTI-LEVEL VOLTAGE REGULATOR SYSTEM AND METHOD", Ser. No. 13/968,955, filed electronically with the USPTO on Aug. 16, 2013 with EFS ID 16613582 and Confirmation Number 7362, issued as U.S. Pat. No. 9,520,772 on Dec. 13, 2016.

Provisional Patent Applications

Applicant claims benefit pursuant to 35 U.S.C. § 119 and hereby incorporates by reference via patent application Ser. No. 13/070,959 and Ser. No. 13/293,022 (detailed above) U.S. Provisional Patent Application for "ADAPTIVE ADJUSTABLE REGULATION CONTROL FOR HIGH EFFICIENCY ISOLATED DC-DC CONVERTERS", Ser. No. 61/411,672, filed electronically with the USPTO on Nov. 9, 2010 with EFS ID 8800905 and Confirmation Number 1825.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to voltage regulator systems and methods. While not limitive of the invention teachings, the present invention may in some circumstances be advantageously applied to situations where isolated DC-DC. Intermediate Bus Converter (IBC) modules are used to supply regulated voltages to point-of-load (POL) regulator modules. General U.S. patent classifications that are associated with these application areas generally include but are not limited to 323/234; 323/293; 363/16-20; 363/21.02; 363/21.06; 363/25; 363/131; 363/95; and 363/97.

PRIOR ART AND BACKGROUND OF THE INVENTION

Overview (0100)

A loosely regulated feedback control scheme for high efficiency isolated DC-DC converter was proposed in U.S. Utility Patent Application for "LOOSELY REGULATED FEEDBACK CONTROL FOR HIGH EFFICIENCY ISOLATED DC-DC CONVERTERS", Ser. No. 13/293,022, filed electronically with the USPTO on Nov. 9, 2011 and in the parent U.S. Provisional Patent Application for "ADAPTIVE ADJUSTABLE REGULATION CONTROL FOR HIGH EFFICIENCY ISOLATED DC-DC CONVERTERS", Ser. No. 61/411,672, filed electronically with the USPTO on Nov. 9, 2010.

As discussed in these previous disclosures, in modern telecom distributed power architectures (as generally depicted in FIG. 1 (0100)), the datacomm/telecomm equipment or apparatus are powered from an AC power source (0101) (single phase or 3 phases) with the DC battery backup (0102) at −48V rail (or bus) (0103). The AC-DC rectifiers (0104) convert the AC power (0101) to a tightly regulated −48V or −54V DC voltage (0103), which charges the backup battery bank (0102) and provides the power to the downstream isolated. Intermediate Bus Converters (IBCs) (0105), which convert −48V (or −54V) (0103) to a either well regulated or a loosely regulated 12V or 10.8V or 9.6V or even 8.3V or 5V low voltage rail (or bus) (0106). Usually, one or more IBC converters (0105) (depending on the power needs) are used to feed multiple of downstream point of load (POL) non-isolated DC-DC converters (0111, 0112, 0119).

During normal operation, the AC power source (0101) provides the required power to the telecom equipment and charging the backup battery (0102) to its full capacity. When the AC power (0101) is lost, the telecom equipment will obtain power from the battery bank (0102). As the battery bank (0102) discharges, the battery voltage (i.e. input voltage to the equipment) (0103) also drops gradually. It is desirable to allow the datacomm/telecom equipment to operate as long as possible with the reduced battery voltage (0103). In some system designs, once the battery voltage drops to a certain level, the datacomm/telecom systems start the load shed to remove those non-critical loads so as to allow the systems to operate longer.

Since most POL converters (0111, 0112, 0119) can operate from either 4.5V to 14V input voltage range or 2.4V to 5.5V input voltage range, the regulation requirement of the Intermediate Bus Converters (IBCs) (0105) is minimal.

Unfortunately, some prior-art converter architectures have limited the "safe" regulation methods that can be used in the distributed power architecture with IBCs (0105) and POL converters (0111, 0112, 0119). One of these is the traditional tight regulation method (also called flat-line regulation where the regulation accuracy is better than ±1%) with the output voltage sensing and feedback control.

Typical Vin vs. Vout Regulation Performance (0200)

A significant issue in the performance of typical IBC converters is the unpredictable nature of output voltage (Vout) performance based on a variety of other parameters associated with the current IBC state. As an example, a typical graph of IBC output voltage (Vout) versus input voltage (Vin) is depicted in FIG. 2 (0200). Here it can be seen that above the nominal regulation point (0201) the output voltage (Vout) is relatively stable and properly constrained to a regulated output voltage (0202) by the IBC.

However, it is significant to note that the starting/stopping input voltage (0203) for the IBC is not constant, and neither is the transition path from low-to-high. IBC input voltage (0204) or the transition path from high-to-low IBC input voltage (0205). The non-linear transition regions (0206) (from regulated to "loosely regulated" IBC output voltage) are particularly problematic since these regions can produce unpredictable behavior in attached POL regulators. For example, these transition regions (0206) can result in undesirable oscillation of the POI converter output as the input to the POL varies from a regulated to a loosely regulated state (and vice-versa). The critical point between the control loop full regulation and the control loop loosely regulated may also cause the IBC to be unstable due to a fixed frequency, peak-sensing current mode controlled IBC converter with duty cycle approaching 50% or higher.

Exemplary Measured IBC Performance (0300)-(0800)

The typical behavior depicted in FIG. 2 (0200) can be manifested in a wide variety of manners as generally depicted in the measured IBC performance data illustrated in FIG. 3 (0300)-FIG. 8 (0800). From this measured data the following characteristics can be observed:

As evidenced in FIG. 3 (0300) and FIG. 4 (0400), the regulation characteristic of the IBC is highly load dependent even at optimal low temperature (−40° C.) operation.

As evidenced in FIG. 3 (0300) and FIG. 4 (0400), the regulation characteristic of the IBC is also temperature dependent since there may be two different Vout voltage values even with the same Vin. The only difference is the IBC converter operating temperature.

As evidenced in FIG. 5 (0500) and FIG. 6 (0600), the point at which IBC output load regulation is lost varies based on POL loading and is not generally symmetric between low-to-high (L>H) and high-to-low (H>L) IBC input voltage (Vin) state transitions due to the IBC converter self-heating impact and/or temperature dependence.

As evidenced in FIG. 7 (0700) and FIG. 8 (0800), IBC operation at elevated temperatures can have a dramatic detrimental impact on output regulation characteristics. As evidenced by the temperature samples depicted in the graphs of FIG. 3 (0300), FIG. 5 (0500), and FIG. 7 (0700), increases in temperature generally result in greater unpredictability in the operational stability of the IBC. In the examples depicting operation at 85° C. operation in FIG. 7 (0700) and FIG. 8 (0800), this peculiar starting/stopping characteristic may be exacerbated by module over-temperature conditions being reached. As can be seen in these graphs the IBC module may start correctly, shutdown prematurely due to over-temperature protection under heavy load as depicted in FIG. 8 (0800). The situation may be improved somewhat at 65° C. operation, but will still evidence a temperature-dependent startup/shutdown characteristic. Note also that by maintaining a nominally regulated output under high load/temperature conditions the IBC is more likely to shutdown due to an over-temperature condition.

The unpredictable Vout characteristic of the typical prior art IBC system can be generalized from the above graphs to include a wide range of "state spaces" in which the IBC operates, including input voltage, temperature, POL load, altitude, etc. Thus, the graphs depicted in FIG. 3 (0300)-FIG. 8 (0800) represent only a small portion of the unpredictability in IBC output voltage based on any number of state variable parameters under which the IBC operates.

Deficiencies in the Prior Art

The prior art as detailed above suffers from the following deficiencies:

Unpredictable IBC output voltage regulation. Input voltages below nominal input values may result in unpredictable IBC output voltage regulation.

Potential oscillatory behavior in POL regulation. The non-linear transition regulation regions in IBC output can result in undesirable oscillations in POL regulation and IBC operation.

Contradicting Design Requirements. IBC converters are often constrained by contradicting design requirements. For example, to achieve the highest conversion efficiency possible the IBC transformer fixed turns ratio needs to be maximized to reduce the transformer primary side current, primary switching device current, and to minimize the voltage stress across the IBC converter secondary side power switching devices. On the other hand, the transformer turns ratio is limited by the output voltage full regulation requirement at specified minimum input voltage Vin(min). For wider Vin range, either 2:1 turns ratio (36 Vin to 76 Vin) or 4:1 turns ratio (18 Vin to 76 Vin), it is more difficult to maximize the transformer turns ratio for higher conversion efficiency while maintaining the flat-line regulation down to a very low Vin point since the transformer turns ratio changes in steps, not continuously. However, this low Vin value requirement makes the desired large transformer turns ratio impossible. Otherwise, the IBC cannot maintain full (flat) regulation of the output voltage.

State space unpredictability. IBC output voltage is unpredictable over a wide range of IBC state space parameters, not just input voltage, but also temperature and other environmental variables.

While some of the prior art may teach some solutions to several of these problems, the core issue of creating a voltage regulator technique that provides for reliable regulation performance in situations where IBC state space parameters do not permit optimal regulation output has yet to be taught by the prior art.

OBJECTIVES OF THE INVENTION

Accordingly, the objectives of the present invention are (among others) to circumvent the deficiencies in the prior art and affect the following objectives:
(1) Provide for a multi-level voltage regulator system and method that provides for reliably stable output voltage regulation values within ranges of IBC input voltage.
(2) Provide for a multi-level voltage regulator system and method that reduces the potential for POL oscillatory behavior.
(3) Provide for a multi-level voltage regulator system and method that provides for a predictable IBC output voltage over a wide range of IBC state space parameters, such as input voltage, temperature, and other environmental variables.
(4) Provide for a multi-level voltage regulator system and method that provides for reliable IBC operation by limiting operation of IBC components at maximum operating values.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention addressed the deficiencies of the prior art by inspecting one or more state parameters associated with the IBC using these state parameters to select a fixed regulation point for the voltage output of the IBC. This multi-level stair-stepped approach to IBC output voltage regulation ensures that over ranges of various IBC state space (for example, IBC input voltage ranges), the IBC output voltage will remain well regulated and predictable. This methodology may be implemented using discrete hardware components and/or implemented using software control systems to ensure that POL converters attached to the IBC output bus are presented with deterministically well-defined input voltage under well-defined IBC operational state parameters.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
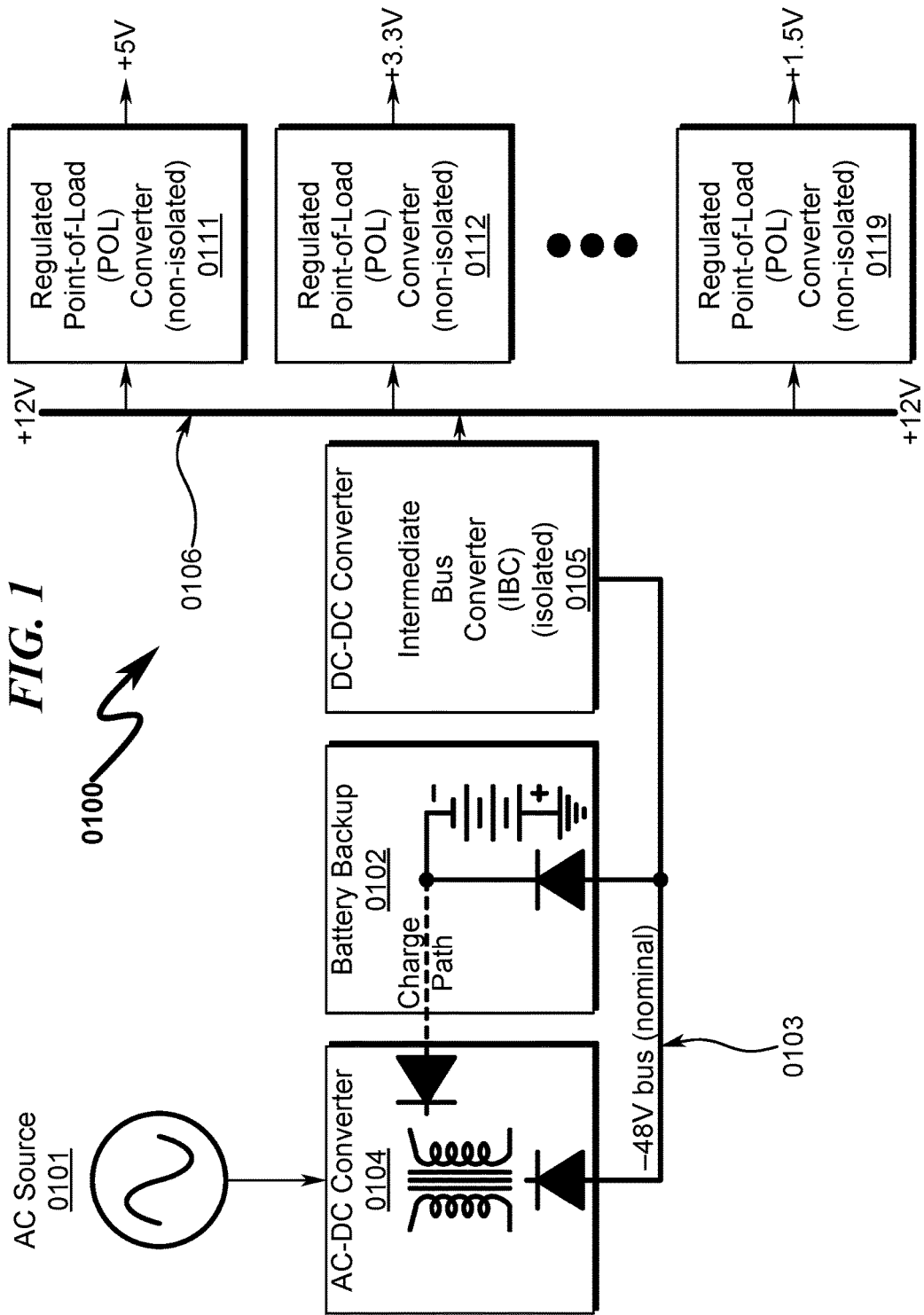
FIG. 1 illustrates a prior art intermediate bus converter (IBC) regulation methodology incorporating point-of-load (POL) regulators.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MULTI-LEVEL VOLTAGE REGULATOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Transition Inequalities not Limitive

The present invention as described herein may use relational inequalities such as ">", "≥", "<", "≤" in various contexts. One skilled in the art will recognize that the voltage levels at which IBC output voltages transition may be equivalently described in terms of inequalities that equate ">"/"≥" and "<"/"≤" depending on application context.

Hysteresis not Limitive

The present invention anticipates a wide variety of contexts in which hysteresis may be applied to the input voltage trip points associated with the IBC input voltage bus. Within this context, input voltage hysteresis, temporal hysteresis, and multi-sampling of tale input voltage (to ensure stability of the input voltage bus) are specifically anticipated but are not necessarily the only methods of hysteresis that are possible using the present invention.

Stepped Reference Voltage (SRV) Generator not Limitive

The present invention anticipates that a stepped reference voltage (SRV) generator may be used in many preferred embodiments to implement fixed) reference voltage that is use as the output voltage adjustment input to an IBC regulator system. This term should be given a broad definition consistent with the application context.

Switching Devices not Limitive

The MOS switching devices depicted in this description are merely illustrative of a wide number of equivalent semiconductor switching devices (MOSFETs, BJTs, IGBTs, etc.) that may be used to implement the present invention.

DC-DC Converter not Limitive

The present invention anticipates a wide variety of application environments, in which the disclosed system/method may operate. In many preferred applications, the use of an intermediate bus converter (IBC) isolated DC-DC regulator is anticipated. While optimal in many applications, the present invention is not necessarily limited to this particular application context.

Loosely Regulated Output not Limitive

Terms such as "non-regulated", "control loop opened", "regulation is lost" when used within this document generally refer to ranges of IBC operation in which the output is loosely regulated and not fixed at a targeted "flat-line" regulation point. In some contexts the IBC output cannot be regulated to a specified window of voltages given a Vin voltage that is below some specified minimum value. The operation of the IBC regulator may not be clearly specified within these ranges of Vin voltage where output regulation is either completely lost or the IBC merely attempts to perform regulation as best as possible given the below-minimum Vin input voltage. The performance of a typical IBC regulator in these circumstances cannot be accurately predicted and as such downstream P&L converters may have difficulty in operating under these "loosely regulated" operating conditions.

Flat-Line Regulation not Limitive

The term "flat-line" within the context of the present invention and previous discussion is defined to encompass an IBC output regulation setpoint definition (a target output regulation Vout value). One skilled in the art will recognize that no voltage regulator will provide perfectly "flat-line" regulation in that the regulation output voltage will have some small dependence on the input voltage to the IBC regulator. Thus, while the IBC output regulation will never truly be "flat-line", the regulation setpoint will be fixed and therefore may be considered a "multi-level tight regulation" of the IBC output voltage.

Exemplary Regulation Overview (0900)-(1000)

Figure 2:
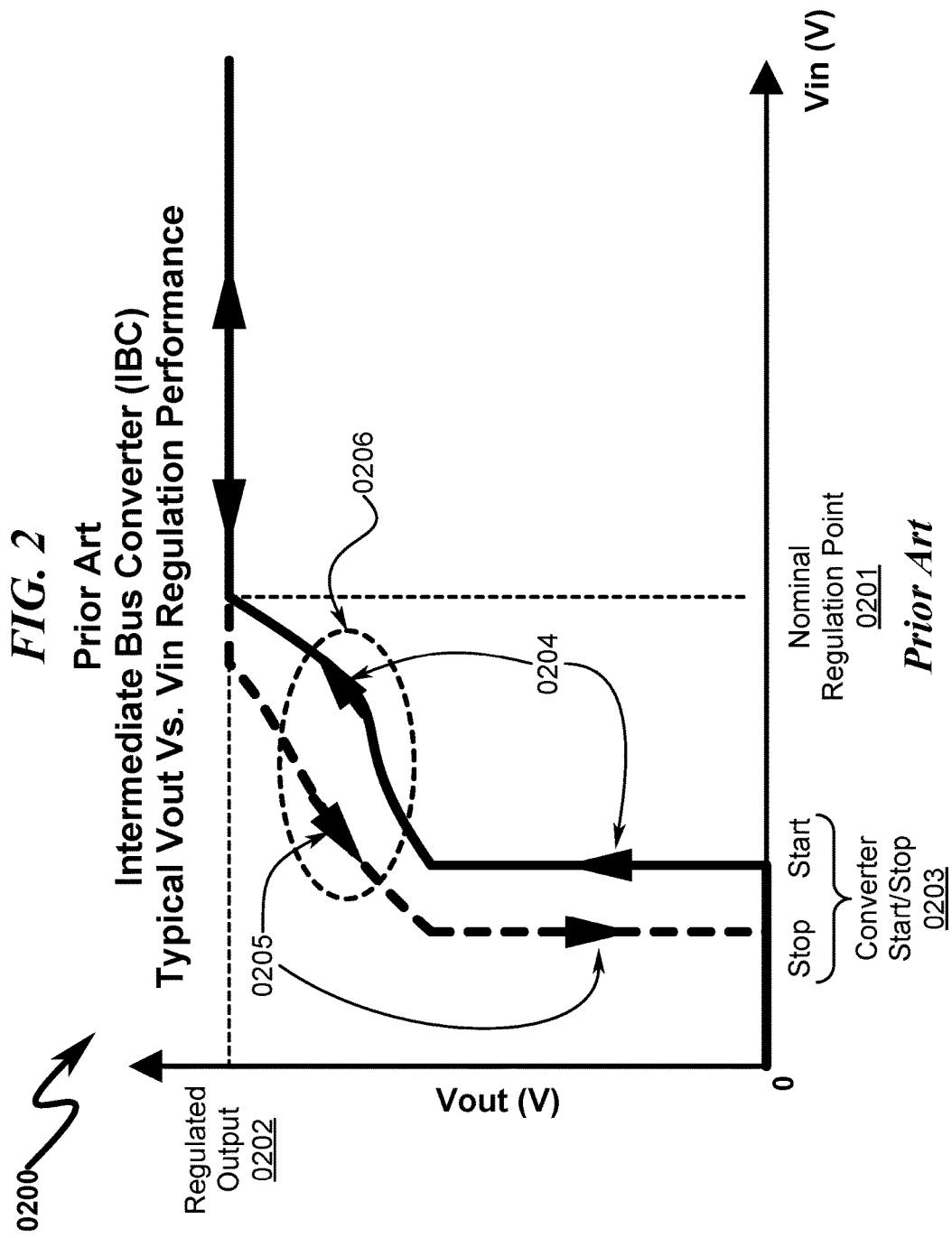
FIG. 2 illustrates a prior art intermediate bus converter (IBC) typical Vout vs. Vin regulation performance graph.
Figure 3:
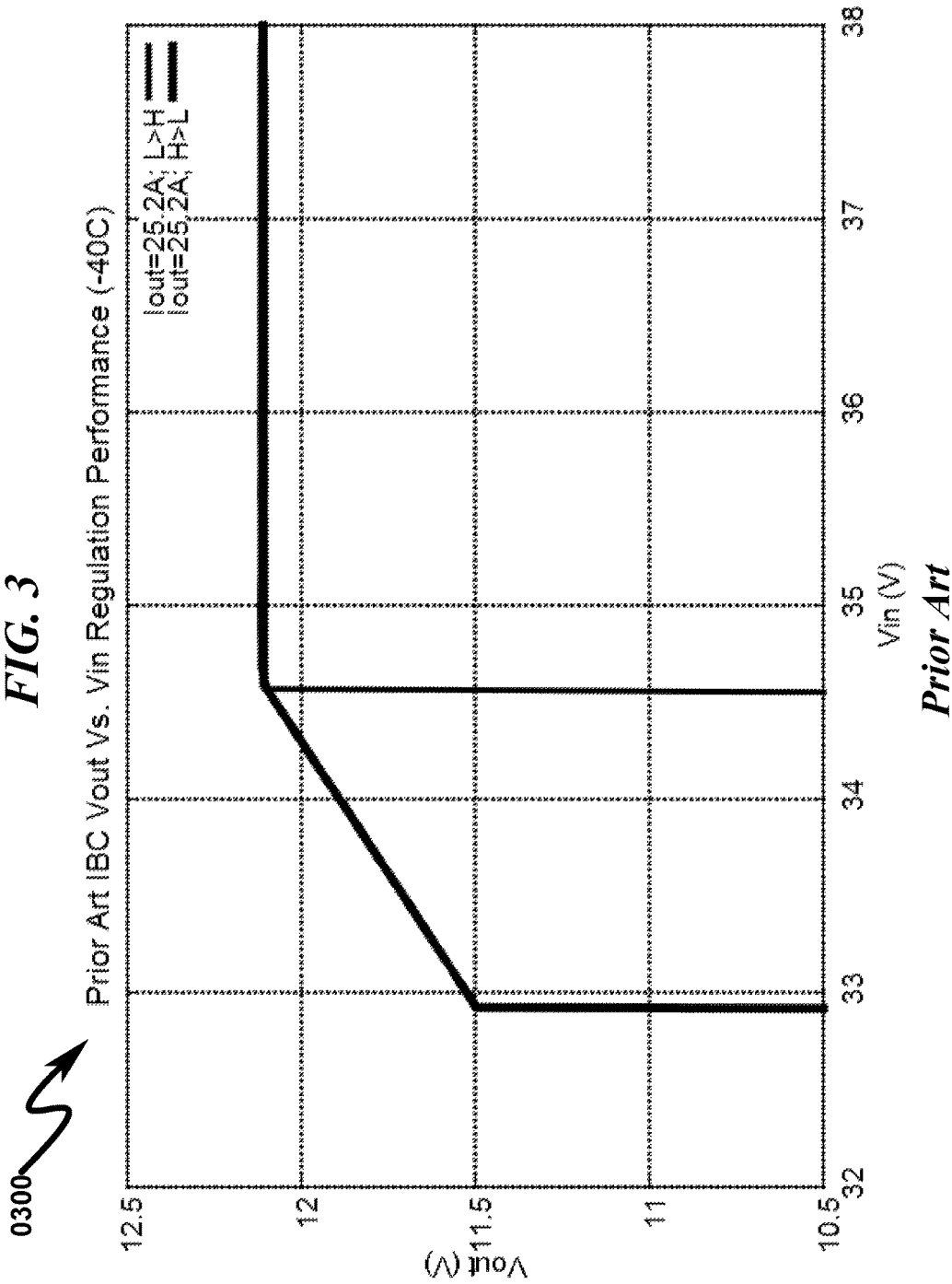
FIG. 3 illustrates a prior art intermediate bus converter (IBC) Vout vs. Vin regulation performance graph (−40° C., 25 A)
Figure 4:
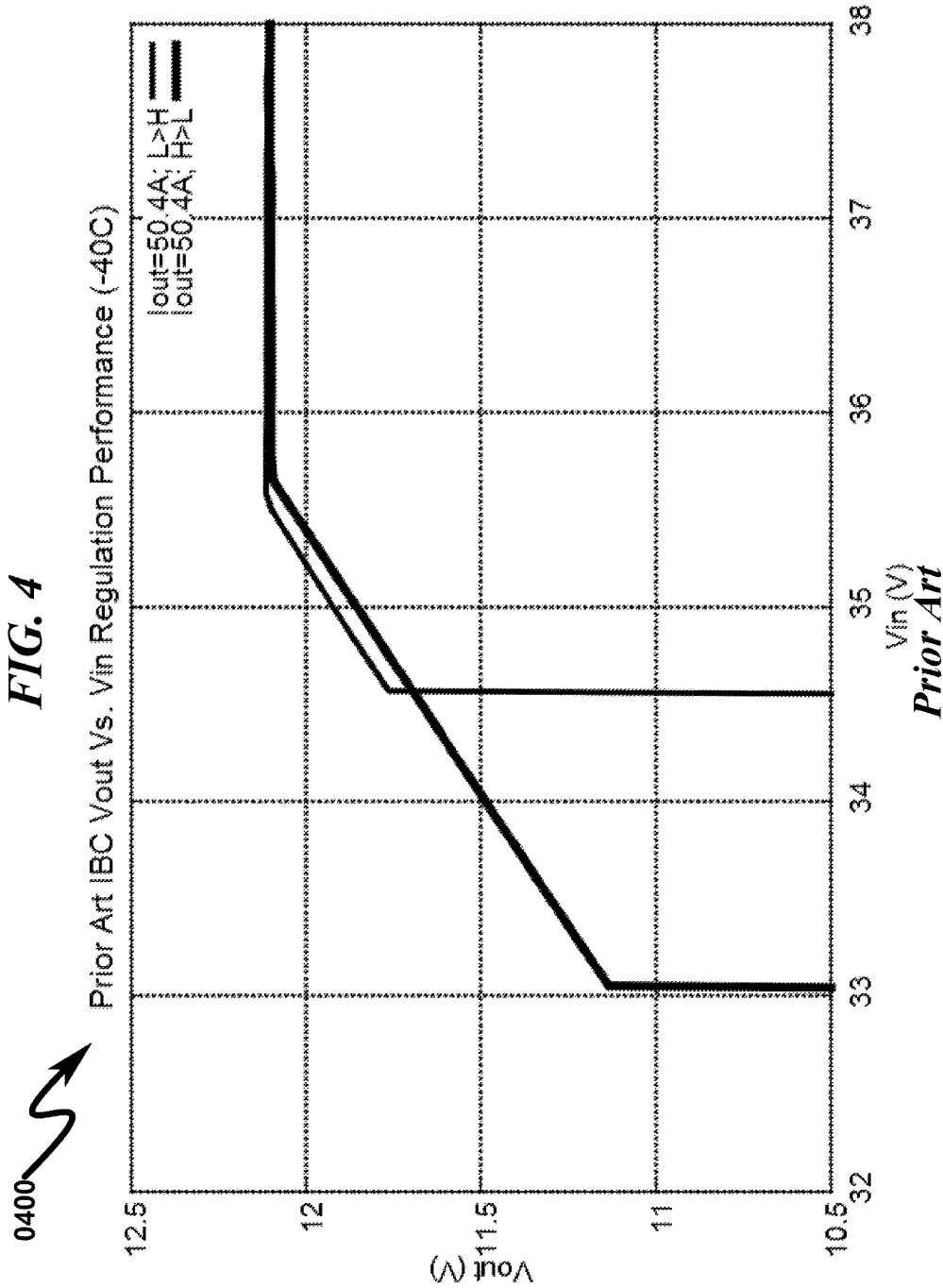
FIG. 4 illustrates a prior art intermediate bus converter (IBC) Vout vs. Vin regulation performance graph (−40° C., 50 A)
Figure 5:
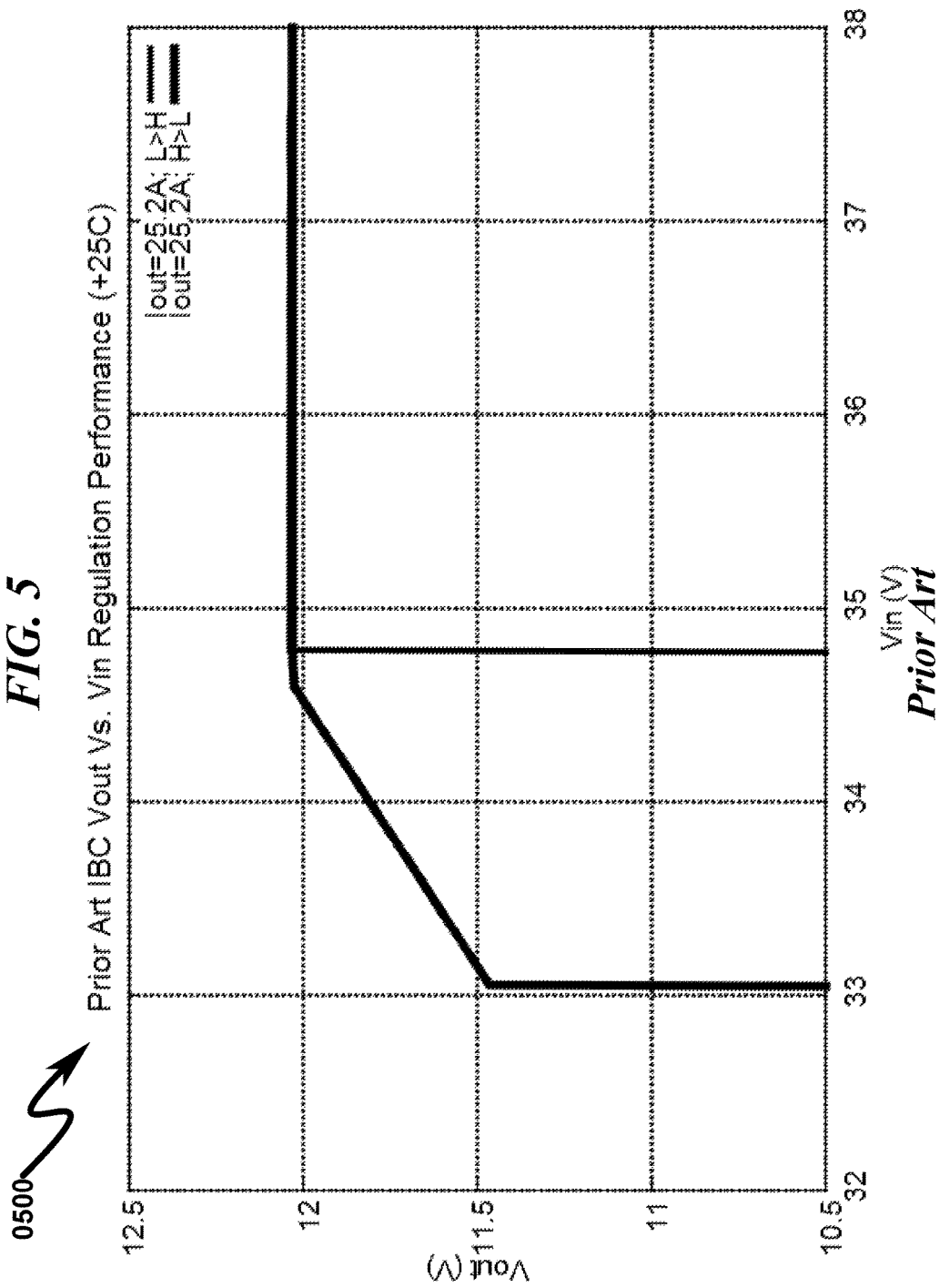
FIG. 5 illustrates a prior art intermediate bus converter (IBC) Vout vs. Vin regulation performance graph (+25° C., 25 A)
Figure 6:
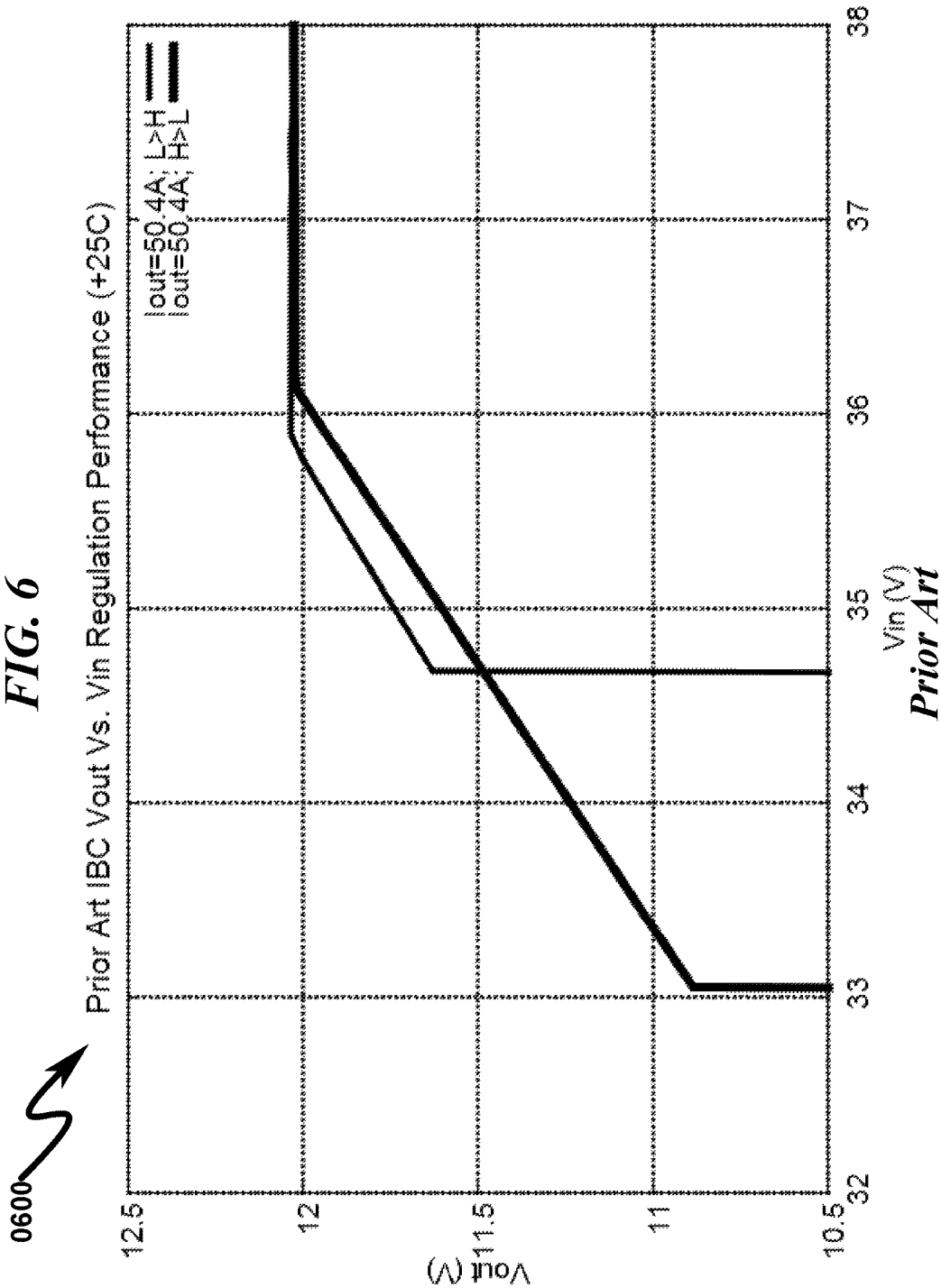
FIG. 6 illustrates a prior art intermediate bus converter (IBC) Vout vs. Vin regulation performance graph (+25° C., 50 A)
Figure 7:
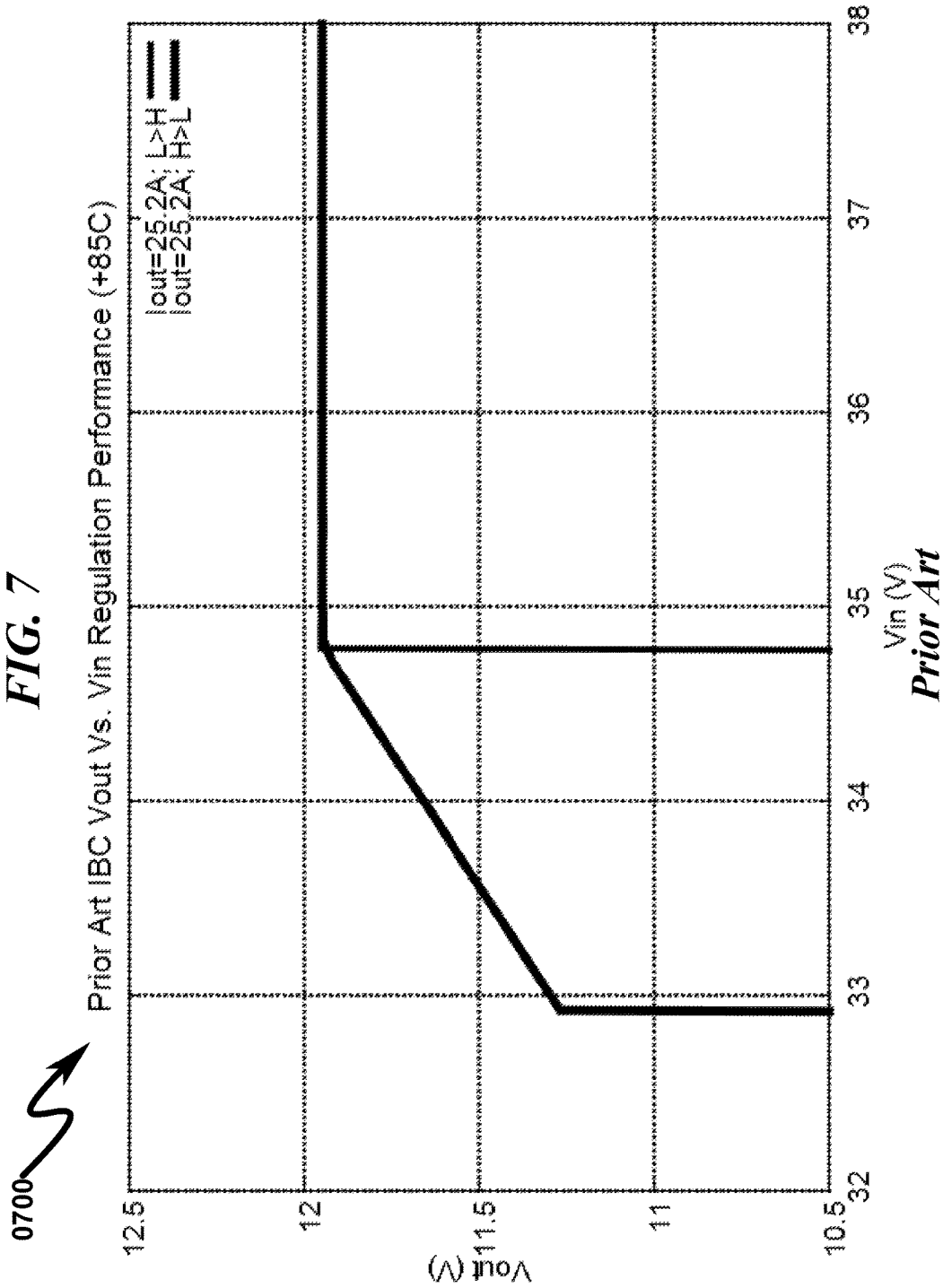
FIG. 7 illustrates a prior art intermediate bus converter (IBC) Vout vs. Vin regulation performance graph (±85° C., 25 A)
Figure 8:
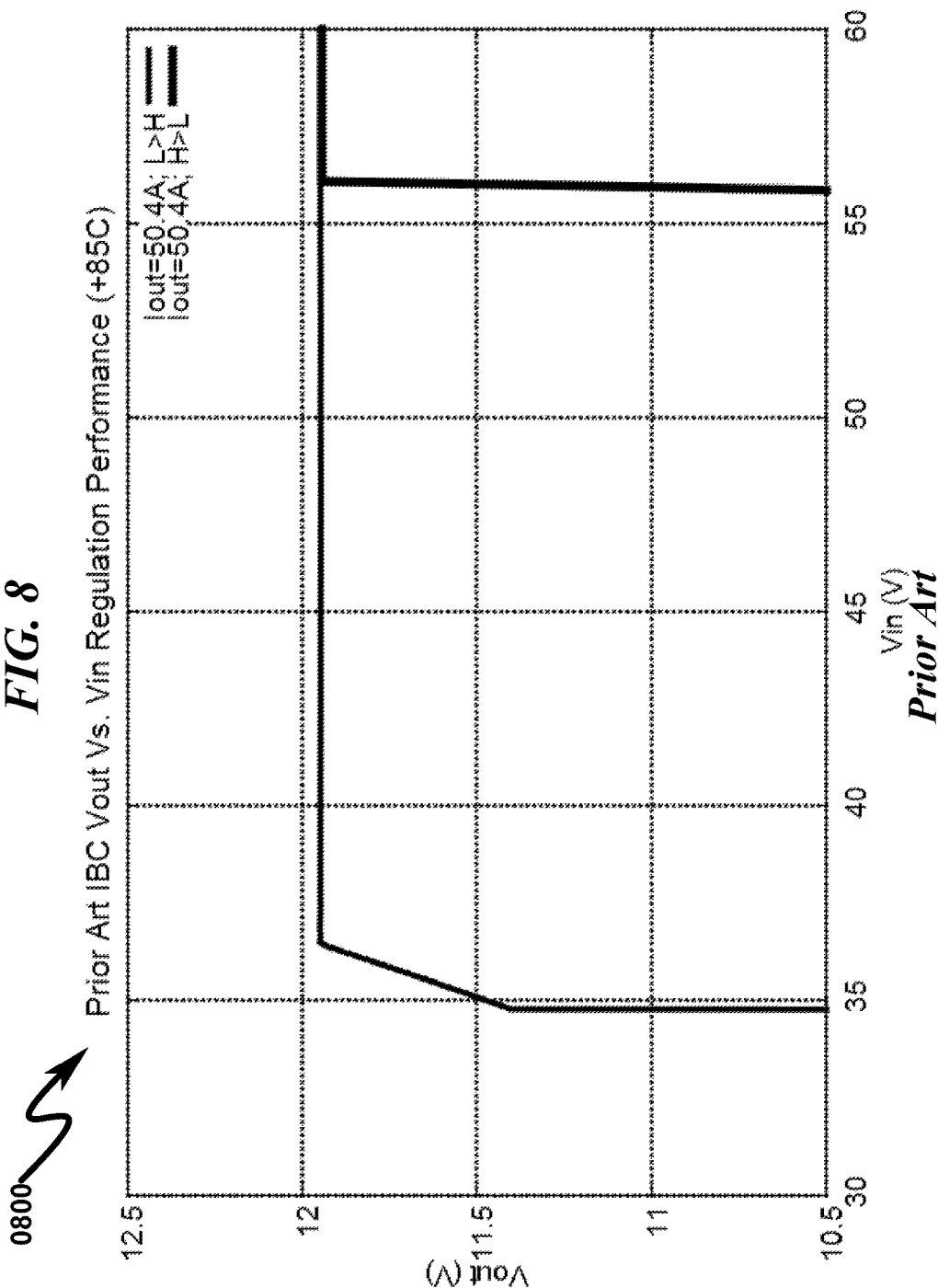
FIG. 8 illustrates a prior art intermediate bus converter (IBC) Vout vs. Vin regulation performance graph (+85° C., 50 A)

Based on the unpredictable IBC regulation characteristics depicted in FIG. 2 (0200)-FIG. 8 (0800) and specifically the unpredictable nature of the transition regions (0206) depicted in FIG. 2 (0200), what is needed in many datacomm/telecom applications is a regulation scheme that senses the output voltage and provides for voltage feedback to promote "flat-line" IBC output regulation. This approach to IBC output regulation takes advantage of POL converter capability to operating within wide input voltage ranges down to 4.5V (a typical scenario for many 12V POLs) while utilizing the largest possible fixed transformer turns ratio within the IBC converters to achieve best possible conversion efficiency and allow the battery backup datacomm/telecomm systems to remain operational longer when the AC power is unavailable.

Figure 9:
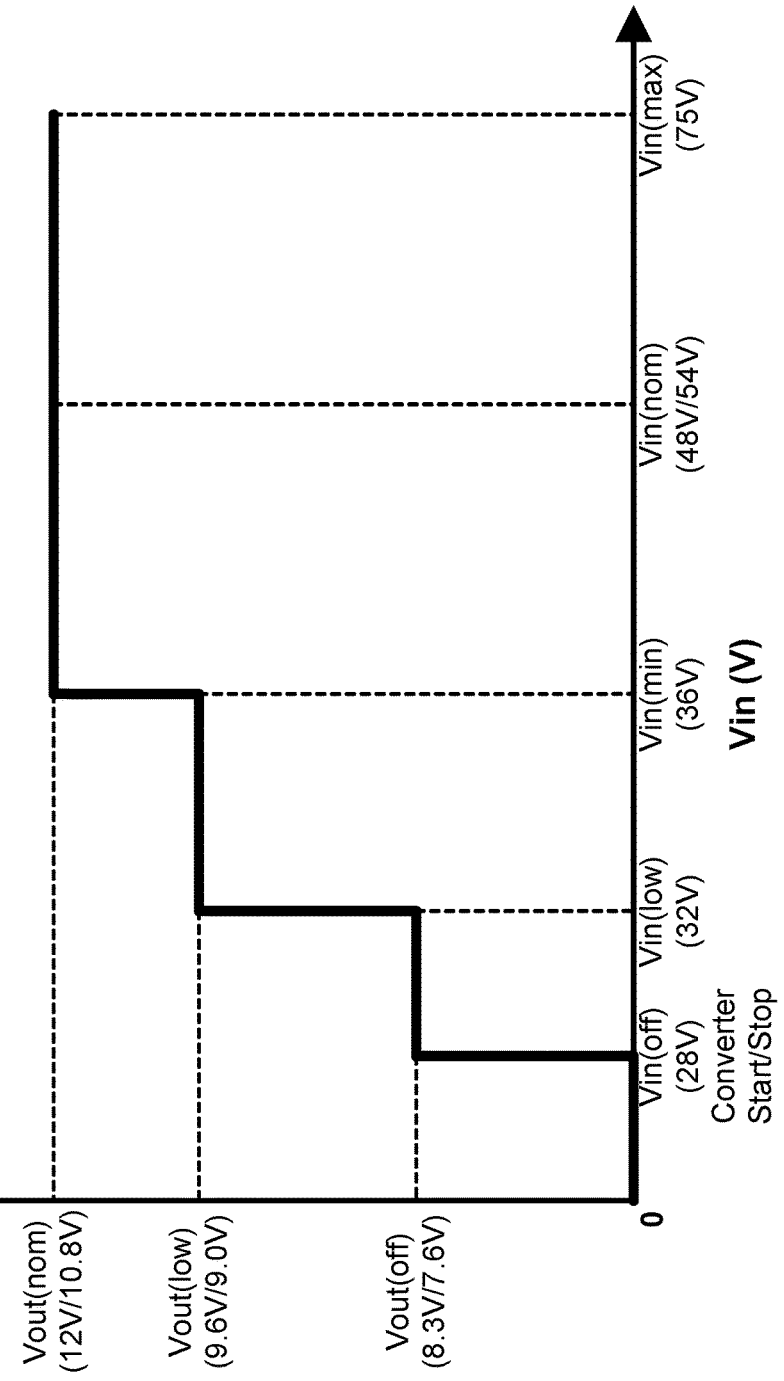
FIG. 9 illustrates an exemplary three-level IBC Vout vs. Vin regulation performance (without Vin hysteresis) characteristic as implemented in an exemplary embodiment of the present invention.

This new regulation scheme will be termed MULTI-LEVEL FLAT-LINE REGULATION and is provided as an example in FIG. 9 (0900) that depicts a typical IBC regulator output voltage (Vout) vs. input voltage (Vin) staircase regulation characteristic. During the normal operation, the IBC is powered from the upstream AC-DC rectifier (s) with well-regulated input voltage (i.e., −48V or −54V as nominally depicted in this graph). Usually, the regulation tolerance of the AC-DC rectifier(s) is from +/−10% of 48V (or 54V) bus to +/−5% of the 48V (or 54V) bus). When the AC power is unavailable, the backup battery bank starts to provide the power. Under these circumstances the normal operating IBC input voltage range is extended to an input range of 36V-75V. In this depicted example, Vin(min)=36V while Vin (max)=75V. The use of a 75V upper input voltage threshold may accommodate some European or foreign country power systems voltage rails while the 36V input range supports the battery allowed discharge voltage before reaching its low voltage disconnect set-point. Note that some voltage drops may occur in the power distribution cables, connectors, EMI filter circuit, etc.

One skilled in the art will recognize that while FIG. 9 (0900) provides several examples of various input voltage ranges used in a typical datacomm/telecomm system, the present concept of using fixed multi-level regulation levels applies to other similar power systems where Vin(min) and Vin(max) can be different.

Should the system operation below Vin(min) be required with or without load shed, then the proposed multi-level regulation scheme provides an acceptable solution. Otherwise, the IBC converter using a fixed transformer turns ratio that is optimized for best efficiency for the operation from Vin(min) to Vin(max) may no longer be able to provide the flat regulation since the design has reached maximum duty cycle or maximum capability) to provide the sufficient input voltage to sustain the output voltage flat-line regulation. As a result, the output voltage will start to drop proportional to the input voltage reduction. By reducing the output voltage regulation level or set-point from original fixed Vout(nom) (i.e., 12V or 10.8V, etc.) to a lower voltage level (such as 9.6V or 9V, etc.), the flat-line regulation characteristics can be maintained.

While FIG. 9 (0900) depicts a three (3) step or three levels staircase regulation, the number of steps of the multi-level regulation may vary based on design application. As the battery further discharges, a new, but lower step of the V(out) output voltage may be selected to maintain the flat-line regulation until it reaches the system shutdown point (Vin(off)).

Although the above discussion describes a battery backup system, the same concept may apply to other IBC systems where the battery is not used. This staircase multiple level flat-line regulation concept can be used to assist the POL load shed scheme to automatically cut off the loads based on the voltage level used providing each load has its own input under-voltage protection circuit.

Figure 10:
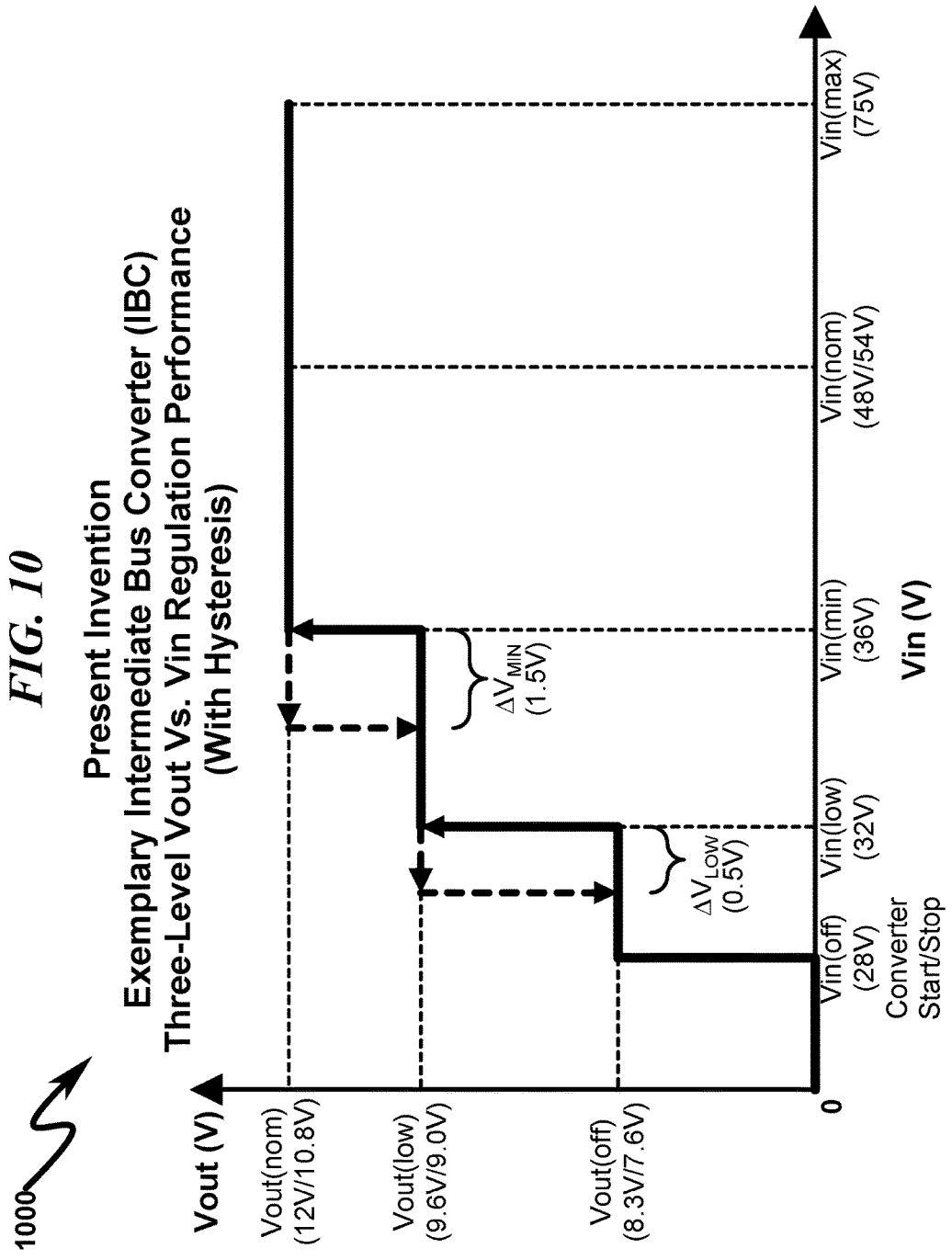
FIG. 10 illustrates an exemplary three-level IBC Vout vs. Vin regulation performance (with Vin hysteresis) characteristic as implemented in an exemplary embodiment of the present invention.

The general concept in FIG. 9 (0900) may be augmented with a variety of hysteresis characteristics as generally depicted in FIG. 10 (1000). FIG. 10 (1000) depicts a proposed staircase multi-level flat-line regulation scheme with an input voltage hysteresis feature so as to prevent the IBC and POL systems from oscillation due to small variation or disturbance in the input line voltage during the AC-DC rectifier start-up and power down transients under the presence of the input inrush control circuitry. This voltage hysteresis feature also helps to prevent the oscillation due to the noise of the sensed input voltage Vin. The required hysteresis level may typically range from 1V to 2V or higher depending on the IBC system application design parameters. It should be noted that at each level in the multi-level output, the transition to/from that level may have associated with it a different hysteresis value that in some cases may be programmable.

Exemplary Multi-Dimensional State Space Mapping (1100)

Figure 11:
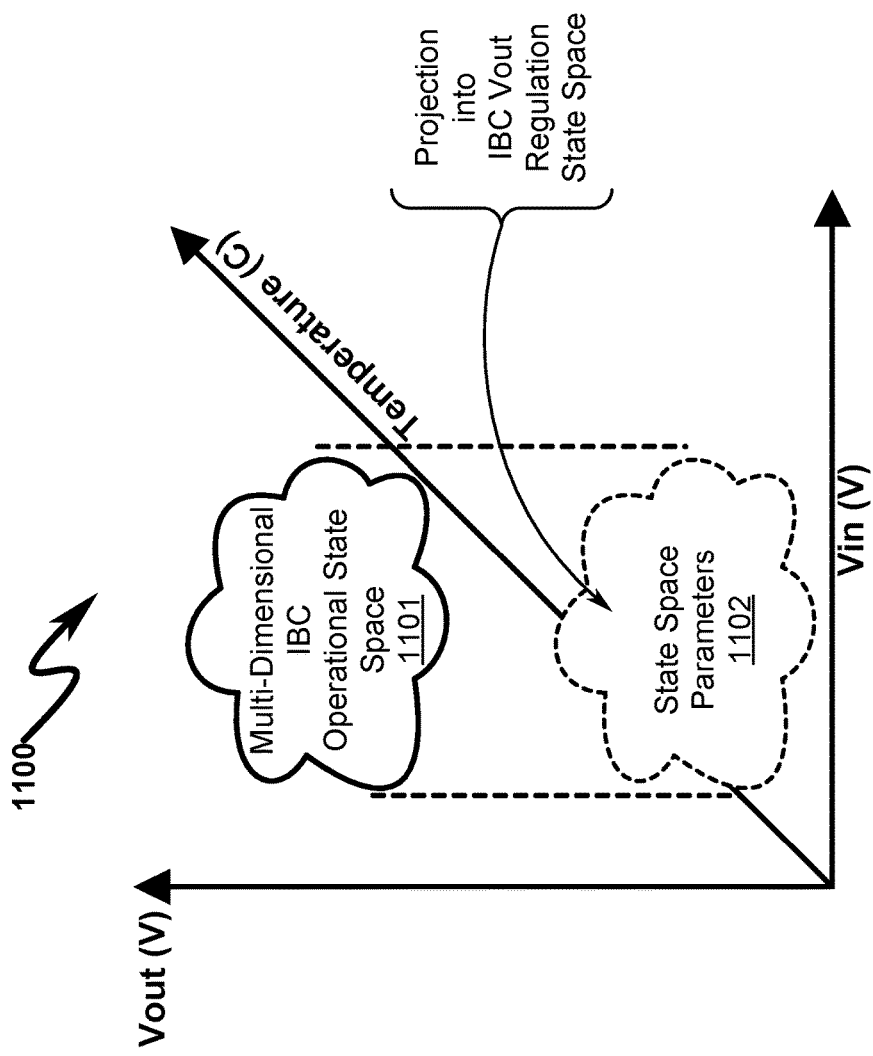
FIG. 11 illustrates an exemplary IBC regulation diagram illustrating IBC regulation tied to multi-dimensional IBC state space parameters.

As generally depicted in FIG. 11 (1100), the regulation methodology generally illustrated in FIG. 9 (0900) and FIG. 10 (1000) may be expanded to define an "envelope" of IBC Vout state space characteristics (1101) based on a number of multi-dimensional IBC state space variables (1102) such as IBC input/output voltage, temperature, IBC input/output load current, IBC input/output power transfer, IBC power dissipation, transformer flux density, time, environmental variables, etc. Thus, the IBC output voltage (Vout) may be regulated in a multi-level (staircase) fashion based on a wide variety of measured state variables within the IBC.

System Overview (1200)

Figure 12:
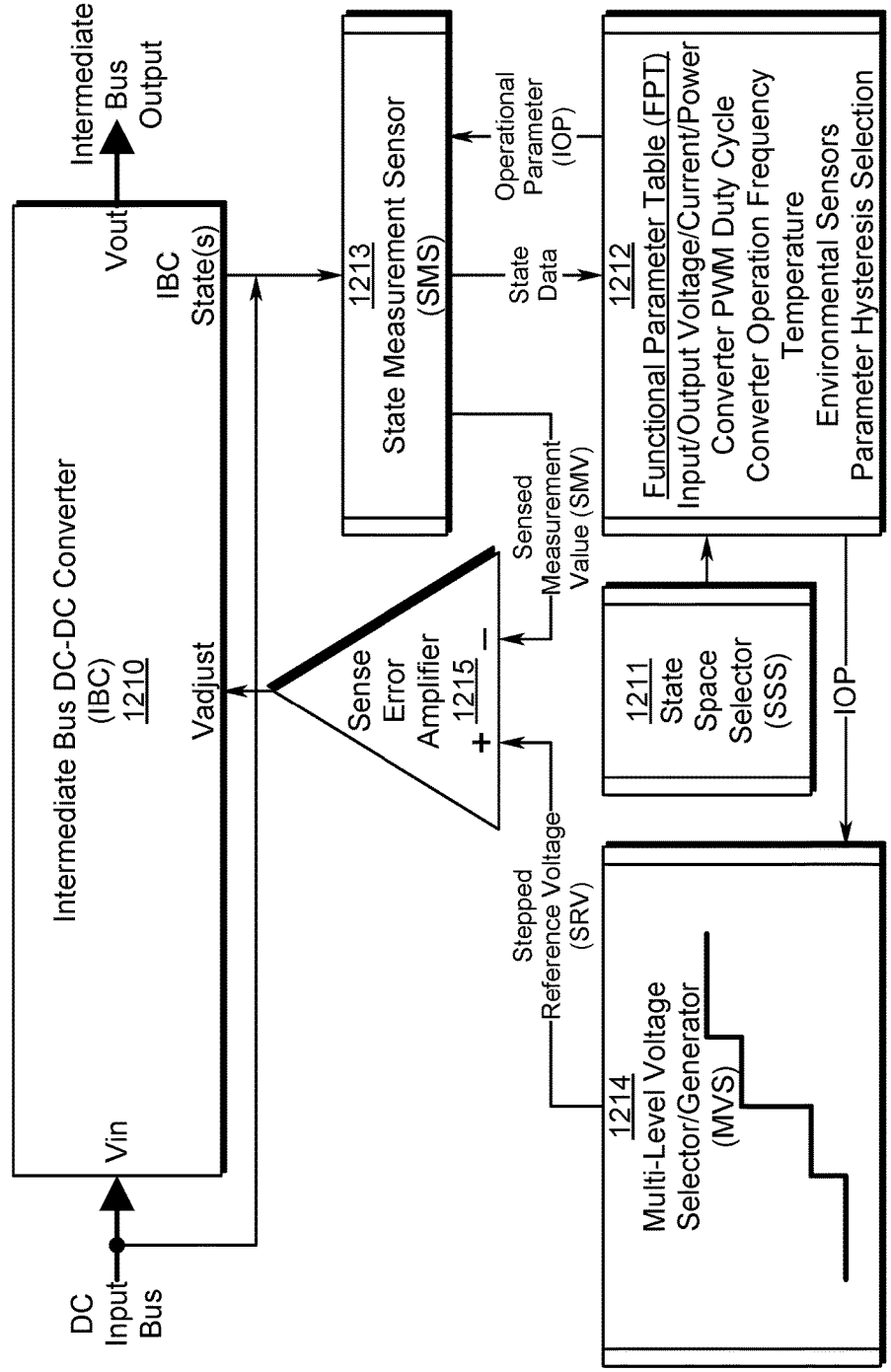
FIG. 12 illustrates a system block diagram depicting a preferred exemplary embodiment of the present invention.

A system block diagram of a preferred exemplary system embodiment is generally depicted in FIG. 12 (1200). Here the concept of IBC input voltage (Vin) monitoring is expanded to include a wide variety of IBC state variables that may be parameterized into functional form to determine the regulated IBC output voltage.

Within this architecture, a state space selector (SSS) (1211) may define a state of an IBC (1210) that is to be monitored as determined by a functional parameter table (FPT) (1212). These functional parameters may include such things as IBC (1210) input/output voltages/currents/power transfer, converter PWM duty cycle, converter operation frequency, input voltage ripple, output voltage ripple, temperature, transformer flux density; humidity, time, environmental state, and the like. This information is then used to control data capture of a state measurement sensor (SMS) (1213) that measures the selected parameter state from the IBC (1210). The FPT (1212) also defines information used by a multi-level voltage selector (MVS) (1214) that generates a reference voltage used as comparison to the state measurement value (SMV) generated by the SMS (1213). An error amplifier (1215) (or comparator) compares the SRV and SMV to generate a voltage adjustment signal that is then used by the IBC (1210) to regulate the intermediate bus output voltage based on the monitored IBC state (SMS) value and the current step (SRV) in the multi-level voltage reference (MVS).

As an example, the system as described may utilize such functional parameters as the Vin input voltage, PWM duty cycle, or other functional parameters to determine a step-up or step down in the output regulation voltage Vout. For example, if the duty cycle exceeded 0.45 (45%), then this could be used as an indication that Vin is getting low and the next (lower) Vout step should be defined as the regulation setpoint. Various other scenarios are possible in which temperature or other parameters may be coupled with modifications of other operational parameters such as converter frequency or PWM duty cycle to provide for optimal stability in IBC Vout voltage regulation characteristics.

This system block diagram (1200) may be considered as generalized and may integrate various system blocks into unitary structures in some application contexts. Specifically, it may be possible in some variations to monitor the IBC input voltage (DC input bus) and compare this with various known voltage levels to generate a SRV multi-step reference voltage signal that ensures that the measured intermediate bus output voltage (as measured by the SMV value) is set to known and predictable values based on the multi-level voltage selector (MVS) (1214) selections.

Multi-Step Vout Regulation Using Vin Measurement (1300)

Figure 13:
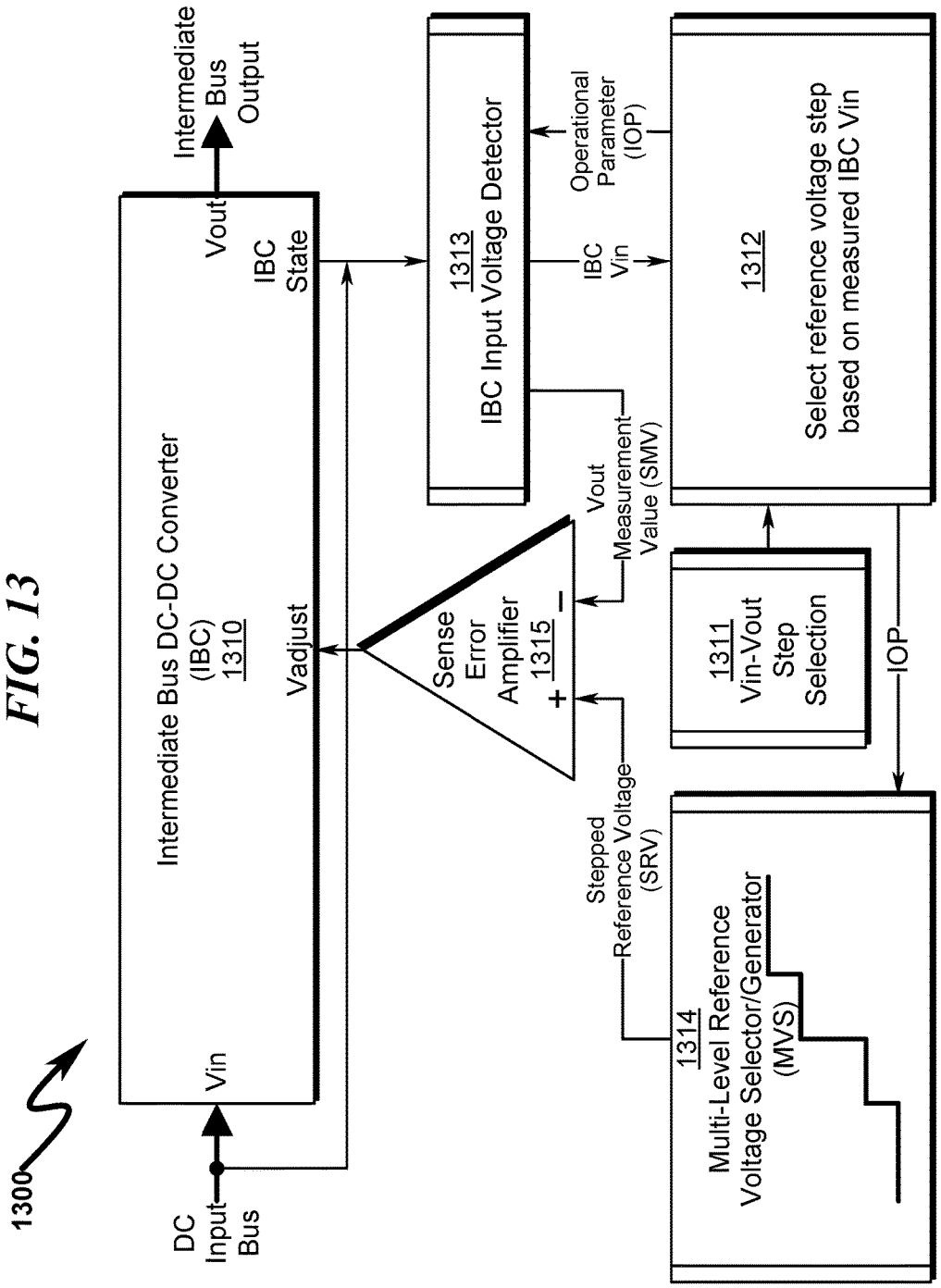
FIG. 13 illustrates a system block diagram depicting a preferred exemplary embodiment of the present invention implementing multi-step IBC Vout regulation based on IBC Vin voltage measurements.

The present invention may utilize a variety of IBC state variables to select a multi-level stair-stepped output voltage (Vout). An example of this is depicted in FIG. 13 (1300) wherein IBC input voltage (Vin) is used as the state selection criterion (1311) to determine the selected reference voltage step (1312) to be compared using the detected IBC input voltage (1313) and the appropriately selected multi-level reference voltage generator (1314).

This circuit operates as follows. The IBC input voltage is detected using the input voltage detector (1313) which is the used to modulate the multi-step reference voltage selector/generator (1314). This stepped reference voltage this then used as the input to the sense error amplifier (1315) along with the IBC Vout measurement value. The sense error amplifier (1315) then communicates with the IBC Vadjust port to drive the IBC output voltage (Vout) to match the SRV and the SMV as determined by the multi-level reference voltage selector/generator (1314). As the IBC input voltage (Vin) varies, the IBC output voltage (Vout) compliance value will vary based on the currently selected reference voltage step value selected by the MVS (1314). This ensures that the IBC output voltage (Vout) is maintained in a series of stair-steps that are well defined based on IBC input voltage (Vin) values.

Multi-Step Regulation Using IBC Vin Detector (1400)-(1600)

Generalized System (1400)

Figure 14:
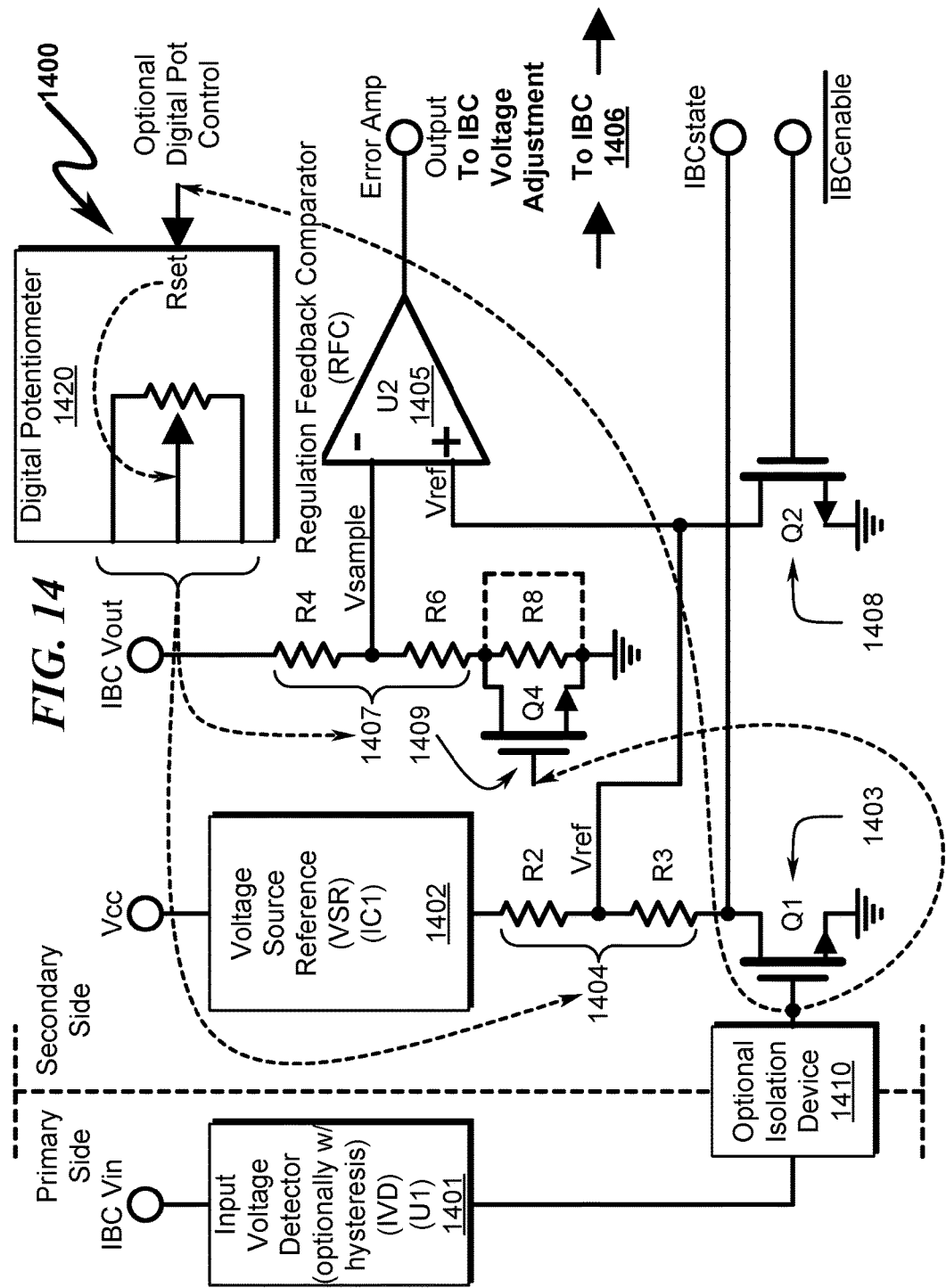
FIG. 14 illustrates an exemplary system block diagram of a multi-level voltage regulator utilizing IBC Vout regulation based on IBC Vin voltage measurements.

Many simple input voltage detection schemes using a window comparator can be used to realize the staircase multi-level flat-line regulation taught by the present invention. An exemplary system block diagram depicting an embodiment of this regulation methodology is generally depicted in FIG. 14 (1400). In this generalized embodiment, the IBC input voltage (Vin) is detected with U1 that incorporates hysteresis. If the detection threshold is activated, Q1 is enabled which reduces the IC1 voltage reference (Vref) output voltage via voltage divider R2 and R3. The normal/adjusted Vref reference voltage Vref is then used by U2 to compare a sampled IBC output voltage (Vout) Vsample that is derived using voltage divider R4 and R5. The output of U2 is then used to modulate the IBC voltage adjustment input port. Switch Q2 is used to enable/disable the IBC regulator by manipulating the voltage reference Vref to ground when the IBC output is to be disabled. One skilled in the art will recognize that the transistors Q1/Q2 depicted here may be replaced with a wide variety of equivalent switching elements without loss of generality in the present invention teachings.

The exemplary system as depicted in FIG. 14 (1400) may optionally incorporate an isolation device (1410) (such as an opto-isolator, etc.) if the input voltage detector (1401) is located on the primary side of the IBC isolation transformer and the remainder of the control circuitry is located on the secondary side of the IBC isolation transformer. While the present invention makes n restriction as to where these system components are located, this figure illustrates one scenario in which these elements are located on both sides of the IBC isolation transformer boundary.

Exemplary System Description (1400)

The above exemplary system embodiment may be generalized as depicted in FIG. 14 (1400) as a multi-level voltage regulator system comprising:
 (a) input voltage detector (IVD) (1401);
 (b) voltage source reference (VSR) (1402);
 (c) transconducting switch (TCW) (1403);
 (d) resistive voltage divider (RVD) (1404);
 (e) regulation feedback comparator (RFC) (1405); and
 (f) intermediate bus DC-DC converter (IBC) (1406);
 wherein
  the RVD comprises a reference node, internal node, and an adjustment node;

the TCW comprises a control node, a ground node, and a switch node;

the RFC comprises a positive input node, a negative input node, and a comparison output node;

IBC comprises a voltage bus input port (VBIP), voltage bus output port (VBOP), and voltage adjust input port (VAIP);

the IVD monitors the VBIP and generates an electrical signal responsive to the voltage detected at the VBIP;

the RVD reference node is electrically coupled to the voltage output of the VSR;

the RVD adjustment node is electrically coupled to the switch node;

the positive input node is electrically coupled to the VBOP;

the negative input node is electrically coupled to the internal node;

comparison node is electrically coupled to VAIP; and the IBC modulates the voltage at the VBOP in response to the voltage potential at the VAIP.

Here the transconducting switches (1403, 1408, 1409) may be any form of electrical switch (BJT, MOSFET, logic gate) and the illustrated IBC Vout voltage divider (1407) may be eliminated in some embodiments. The IBCenable signal and corresponding transconducting switch (1408) may be optional in some embodiments.

Reference Generation/Voltage Sensing Methodologies (1420)

As generally depicted in FIG. 14 (1400), the voltage divider R4/R6 (1407) is used to generate a proportional output voltage to the IBC Vout voltage to generate a Vsample voltage that is used to compare to the Vref signal generated from the voltage reference (1402) in conjunction with the Vref voltage divider (R2/R3) (1404). The present invention anticipates that the Vref and Vsample voltages may be generated in a wide variety of fashions, including but not limited to the following:

As illustrated, a transconducting switch Q1 (1403) may be used to modify a resistor divider (1404) associated with a voltage reference (1402) to modulate a Vref voltage presented to the comparator (1405) for the purposes of setting the IBC Vout regulation setpoint.

As illustrated, a transconducting switch Q4 (1409) may be used to modify a resistor divider (1407) comprising R4/R6/R8 to vary the Vsample IBC output voltage measurement in response to the output of the isolation device (1410). In many configurations R8 and Q4 may be absent with resistor R6 shorted to ground as indicated.

As illustrated, a digital potentiometer (1420) may be used to substitute for the Vref resistor divider (1404) illustrated in the schematic. Here the digital potentiometer (1420) is illustrated symbolically. These integrated circuit devices generally have as depicted an analog wiper contact and two analog resistor contacts with a digital Rset input port. The use of this digital potentiometer (1420) device may permit setting of the Vref signal by using the voltage reference (1402) as input to one of the analog resistor contacts, grounding the other analog resistor contact, and driving the Rset digital configuration from the isolation device (1410) output port, and using the analog wiper contact as output to the Vref signal non-inverting input to U2 (1405).

A similar configuration can be used to modulate the Vsample resistor divider (1407) wherein one analog resistor contact is connected to the IBC Vout voltage, the other analog resistor contact is grounded, and the analog wiper contact is connected to the inverting input of the comparator U2 (1405) as the Vsample voltage signal. Here the Rset digital input can be used to define the proportional value of Vout that is used to reference against the Vref signal for purposes of regulation the IBC Vout output voltage.

The input voltage detector (1401) an isolation device (1410) may comprise a serial digital control for the Rset input of one or more digital potentiometer (1420) used to control the Vref and/or Vsample voltage values. In this configuration a digital state machine driving the input voltage detector (1401) output based on IBC Vin input voltage measurements (either directly or indirectly) may be used to dynamically set the Vref and/or Vsample voltage levels provide to the comparator U2 (1405) for determination of the IBC Vout output regulation setpoint.

As illustrated in FIG. 14 (1400), the stepped reference voltage (SRV) that is generated by the input voltage detector (IVD) (1401) may be viewed as modulating the voltage source reference (VSR) (1402) Vref output or as modulating the IBC Vout output voltage sampled voltage Vsample as these signals are processed by the regulation feedback comparator (RFC) (1405). In either of these scenarios, the IVD (1401) SRV may be viewed as controlling the IBC Vout regulation characteristic in a multi-level manner.

The present invention anticipates that a plurality of stepped reference voltages (SRV) may be generated by the invention in regulating the IBC Vout output voltage in response to Vin and other IBC parameters. This may in some applications involve continuous modulation of the Vout voltage in response to measurement (either directly or indirectly) of the IBC Vin voltage. In the case of continuous control, the IVD may be configured to generate the SRV in a continuous fashion by generating the SRV as a continuous signal proportional to the monitored IBC Vin voltage.

One skilled in the art will recognize that this list is not exhaustive but rather illustrative of several preferred embodiment configurations.

Detailed Embodiment (1500)

Figure 15:
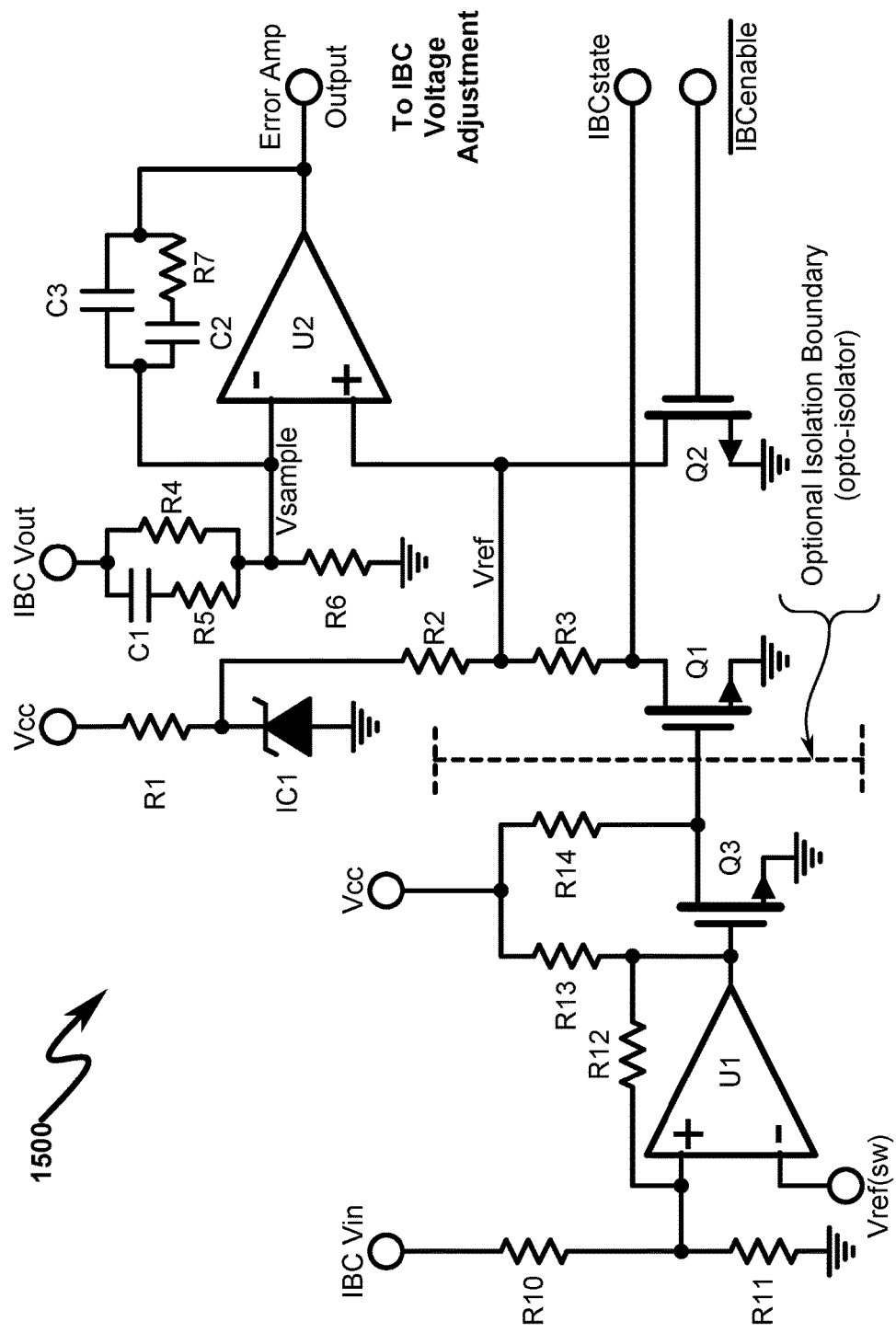
FIG. 15 illustrates an exemplary schematic of a multi-level voltage regulator utilizing IBC Vout regulation based on IBC Vin voltage measurements.

A more detailed example of a schematic implementation of the block diagram of FIG. 14 (1400) is generally depicted in FIG. 15 (1500) which illustrates a staircase two-level flat-line regulation circuit. An input voltage detection circuitry U1 with the hysteresis is used to detect Vin. The IBC Enable Signal is used to control Q2, which is connected in parallel with Vref line. When the Vin is below Vin(low) (or IBC(off) point for a two-level regulation circuit), the IBC is off, and the IBC Enable Signal will turn on Q2 to pull Vref line to zero volts. Note that this same enable signal may disable the PWM controller from generating any driving pulses (this feature is not shown in FIG. 16 (1600)). If Vin≥Vin(min) (or IBC Turn-on point), then the output of the input voltage detection circuit block U1 will be high to turn on Q3, and hence, disable Q1. When U1 is high, R12 connects to Vcc via R13, which adds a small current to R11 to rise its voltage at non-inverting terminal of U1. In order for U1 to change the status to low, IBC Vin voltage will need to be lower than Vin(min). Therefore, R12 (together with R13) helps to create a positive hysteresis. Generally speaking, the R12 value is usually much larger than R13. With Q1 disabled, the Vref reference node voltage will be at the same level as the voltage reference chip, IC1 (e.g., 1.225V or 2.5V). The voltage regulation loop (consisting of R4, R5, R6, R7, U2, C1, C2, and C3) will regulate the output voltage at nominal level (e.g. 12V or 10.8V, or whatever is desired) determined by the IBC converter transformer turns ratio.

When Vin<(Vin(min)−ΔV), the detection comparator U1, will change its status to low, which turns off Q3, and allows Q1 to turn on. As a result, the resistive divider consisting of R2 and R3 will lower the Vref reference node voltage from original IC1 level to a lower pre-set level, thus forcing the voltage loop to regulate the output voltage at lower level, Vout(low) (e.g. 9.6V or 9V or lower).

The examples provided in FIG. 14 (1400) and FIG. 15 (1500) also illustrate the possibility of extracting the IBC multi-level state (IBCstate) from the Q1/R3 node to provide an IBC state output status that may be inspected by downstream POL devices and/or computer controls. This information may be used to automatically initiate load-shedding in response to degraded IBC input voltage Vin sensing and corresponding reduced Vout voltage step regulation. One skilled in the art will recognize that this multi-level state information may take the form of a multi-bit parallel interface and/or the use of a serial bus for interrogation such as I$^2$C, SPI, USB, etc.

Performance Characteristic (1600)

Figure 16:
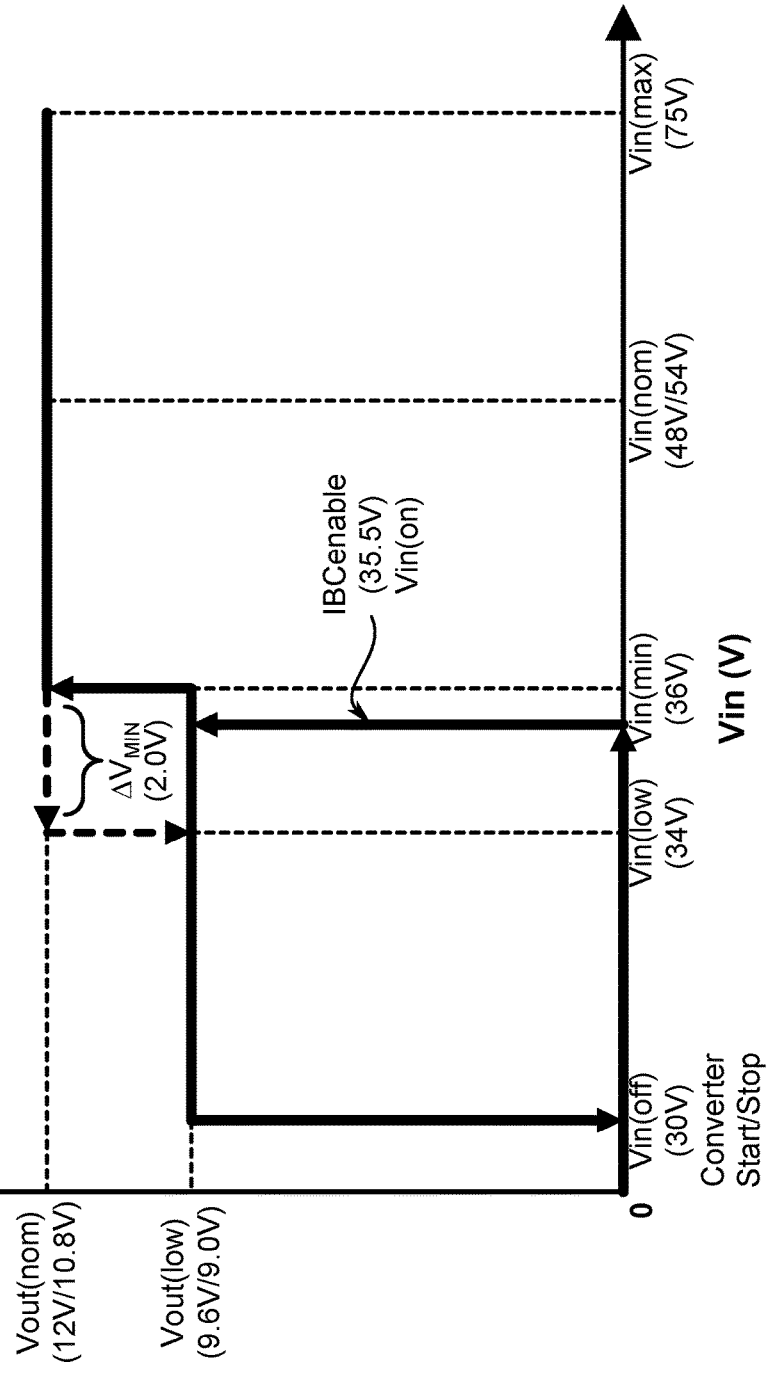
FIG. 16 illustrates an exemplary two-level IBC Vout vs. Vin regulation performance (with Vin hysteresis) characteristic as implemented in an exemplary embodiment of the present invention.

A typical performance characteristic of the exemplary invention embodiment depicted in FIG. 14 (1400) and FIG. 15 (1500) is illustrated in FIG. 16 (1600). The voltage trip points illustrated in this graph are exemplary and may vary widely based on application context.

System Generalizations

For a three-level or more level flat-line stair-stepped regulation circuit, the complexity of the input detection circuit will be increased somewhat. Utilizing a digital control scheme, various Vref reference voltage values may be set by software based on IBC Vin detection circuit inputs. This is well within the capabilities of one of ordinary skill in the art.

The same operation principle can be applied to the other DC-DC converter circuits or input voltage ranges with very minor design changes. Those of ordinary skill in the art will appreciate that the same staircase multi-level flat-line regulation scheme can be extended easily to the other converter circuits or topologies without deviation from the spirit and scope of the inventive concepts proposed herein.

Integration of Multi-Level Voltage Regulation within IBC (1700)

Figure 17:
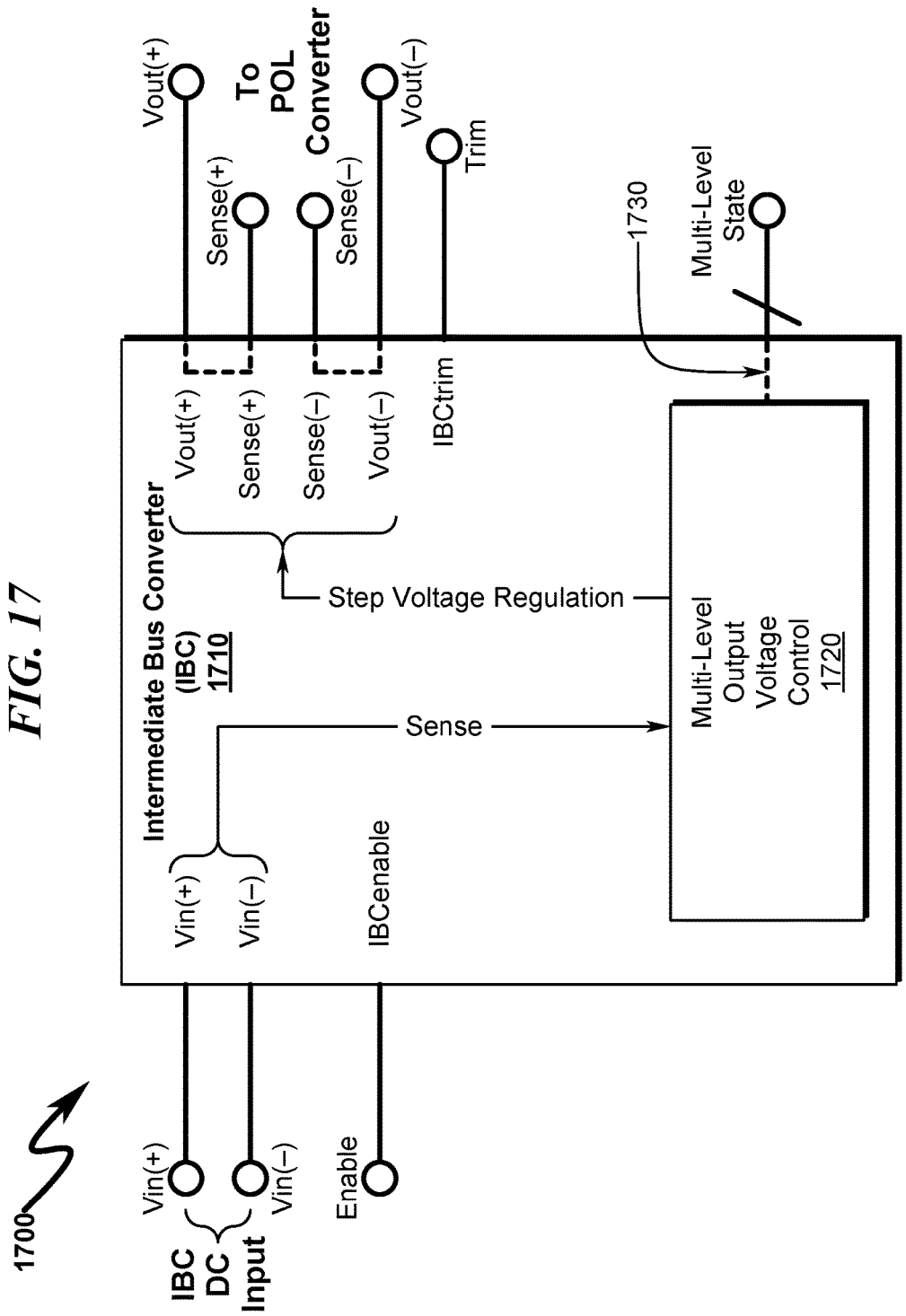
FIG. 17 illustrates integration of multi-step voltage regulation in the context of a typical IBC industry standard regulation system.

The present invention anticipates that the multi-level voltage control system/method described herein may be integrated within a conventional IBC regulator system as depicted in FIG. 17 (1700). Here an industry standard IBC regulator system (1710) is depicted that incorporates conventional 5-pin configurations (Vin(+), Vin(−), Vout(+), Vout(−), and IBCenable controls) or in some circumstances may be augmented as 6-pin/8-pin configuration further comprising an output TRIM pin (up or down) and/or two remote SENSE(+/−) pins. Within this context the multi-level voltage regulation system (1720) may be incorporated to control the IBC output (Vout(+), Vout(−)) in a regulated stair-stepped fashion based on the IBC input (Vin(+), Vin (−)).

As indicated in this diagram, the Multi-Level Output. Voltage Control unit (1720) may provide one or more status lines (1730) that may be interrogated external to the IBC (1710) to determine the multi-level status of the system (i.e. the voltage step level at which the system is currently operating). This permits external devices or system components to perform intelligent load shedding (or controlled shutdown) based on the stepped output voltage level of the system that is tied to the IBC voltage input (Vin) and/or other IBC operational parameters.

Multi-Level Control Communication Interface (1800)

Figure 18:
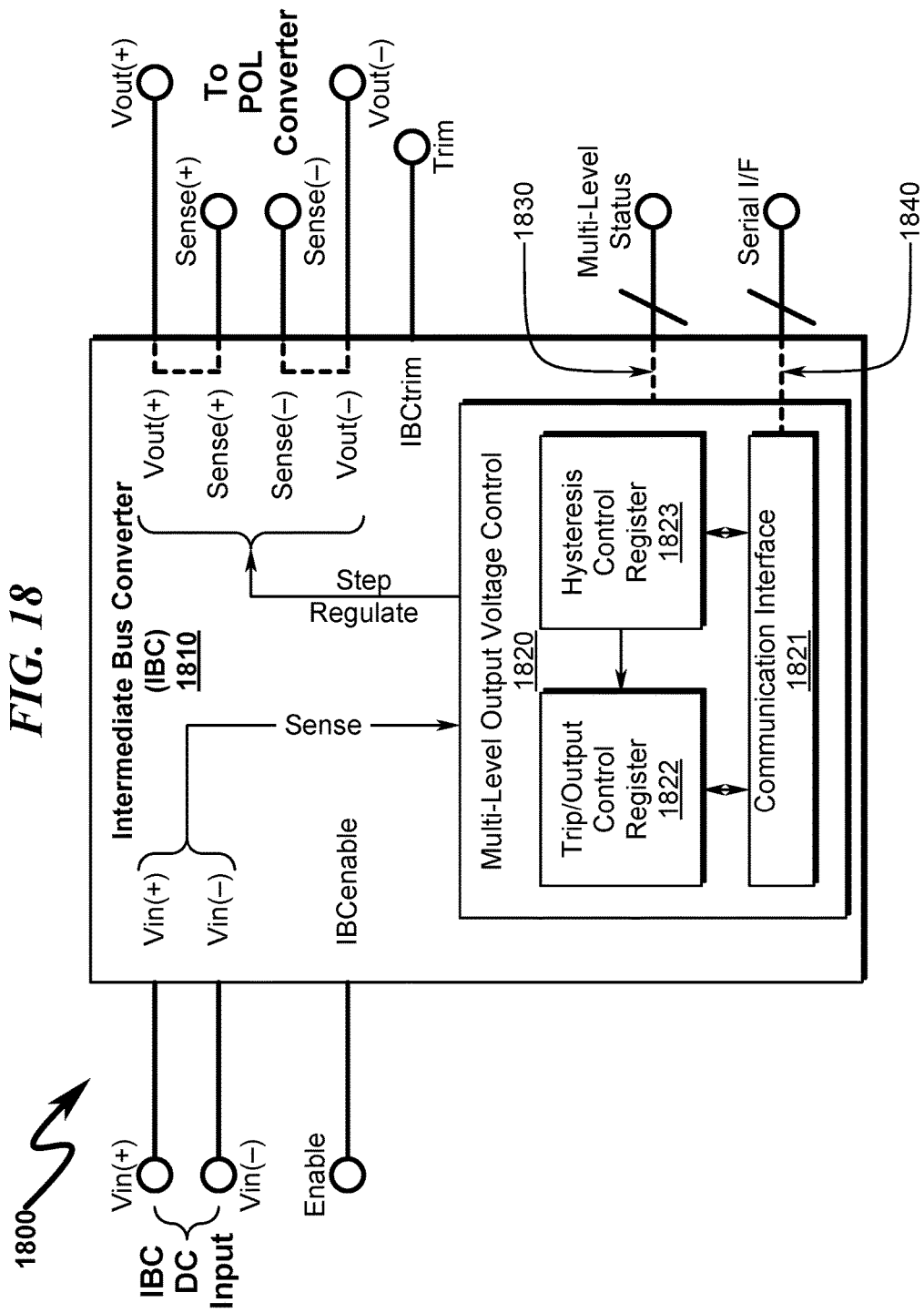
FIG. 18 illustrates integration of multi-step voltage regulation in the context of a typical IBC industry standard regulation system incorporating a serial communication interface to allow configuration of multi-level input trip voltages, input hysteresis values, and output regulation voltage step values.

The present invention anticipates that in some preferred embodiments the multi-level output voltage control integrated within the IBC as depicted in FIG. 17 (1700) may incorporate a communication interface (1821) as depicted in FIG. 18 (1800) permitting communication with a serial interface (1840) (I$^2$C, SPI, USE, etc.). In these configurations the serial interface (1840) can interrogate and/or write via the communication interface (1821) the trip point/output step voltage values within a trip point register (1822) and/or control hysteresis values within a hysteresis control register (1823). The serial communication interface (1821) may be configured to permit configuration of the trip point register (1822) and/or hysteresis control register (1823) within the context of factory-defined settings and/or field-defined settings that are application specific in nature. Thus, the communication interface (1821) may permit a single IBC module (1810) to be configured for a multiplicity of trip point/hysteresis configurations for both factory defined modules or variants that are configured in the field as the system operates.

Temporal-Based Hysteresis (1900)

The present invention may be implemented utilizing a wide variety of hysteresis functions to determine the multi-step output voltage level that is the set-point for the IBC regulator. Some preferred invention embodiments may utilize temporal-based hysteresis in which time delays are associated with the multi-level IBC output voltage transitions. This incorporation of time within the hysteresis function may prevent instabilities in IBC/POL operation due to "chattering" of the IBC input bus voltage that may occur during hot-swap operations and other events that may create IBC input bus voltage transients.

Figure 19:
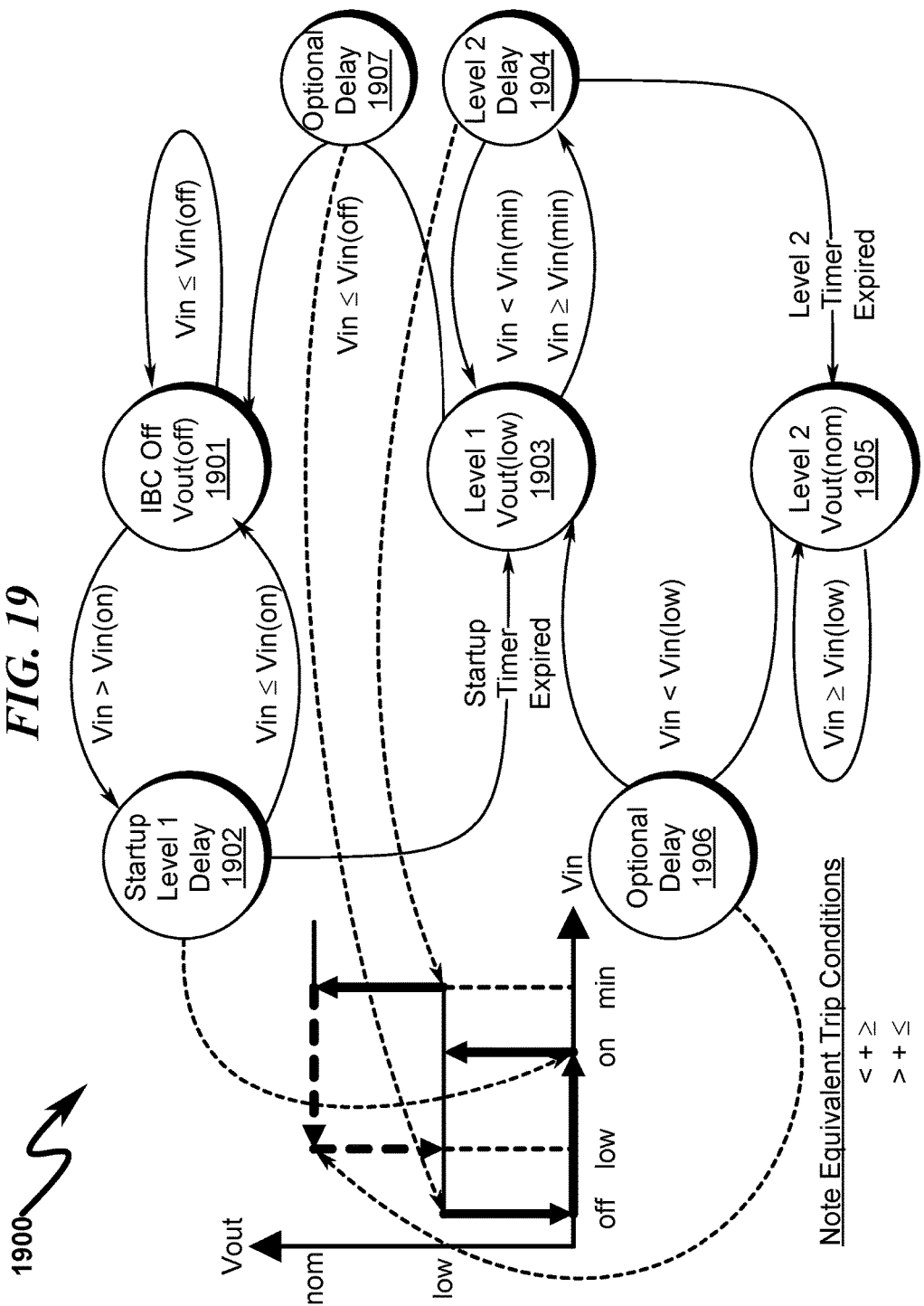
FIG. 19 illustrates an exemplary two-level state diagram depicting temporal-based hysteresis.

An exemplary state diagram illustrating this concept is provided in FIG. 19 (1900), wherein a two-state hysteresis function is implemented using temporal delays. The initial system state (1901) is invoked when power is first supplied to the IBC, as inrush current limiters may ramp up the IBC input voltage (Vin) from zero to an operational voltage level. This may be accompanied by a variety of Vin bus transients that should be avoided before the IBC is configured for operation.

After the Vin voltage has stabilized to a value greater than the IBC enable Vin(on) voltage, a startup Level 1 delay (1902) is activated to ensure that the IBC input voltage is maintained at this level for a set time period. If it fails to maintain this level, the OFF state (1901) is reentered.

Once the input voltage is stabilized at the Vin(on) value and the startup Level 1 delay timer (1902) has elapsed, the Level 1 state (1903) is entered in which the IBC is enabled at the Vout(low) voltage level. This state is maintained unless the input voltage drops below Vin(off) at which point the OFF state (1901) is entered, or unless the voltage increases to the Vin(min) level, at which point a Level 2 delay (1904) is entered. The Level 2 delay (1904) waits to ensure that the input voltage Vin is maintained at minimum input voltage levels Vin(min) for a set period of time before transitioning to the Level 2 state (1905) at which point the IBC output is forced to a Vout(nom) voltage level. Transitions back to Level 1 (1903) occur when the input voltage Vin drops below Vin(low).

It should be noted that the state transitions from Level 1 (1903) to the OFF state (1901) and from the Level 2 state (1905) to the Level 1 state (1903) may be accompanied by additional optional intervening delay states (1906, 1907) similar in function to the startup Level 1 (1902) and Level 2 (1904) delays. The present invention anticipates that in some preferred embodiments the state delays may be individually programmable across some/all of the trip point transitions.

One skilled in the art will readily be able to expand the above-described state transition diagram to situations in which a plurality of multi-level regulation states are to be maintained in the IBC voltage regulator. As described elsewhere herein, the present invention anticipates that these temporal delays as well as trip point and hysteresis values may be configured and/or inspected via a communication interface to a computer system executing software read from a computer readable medium via the use of a serial and/or parallel data port.

Digital Multi-Level Control (2000)

Figure 20:
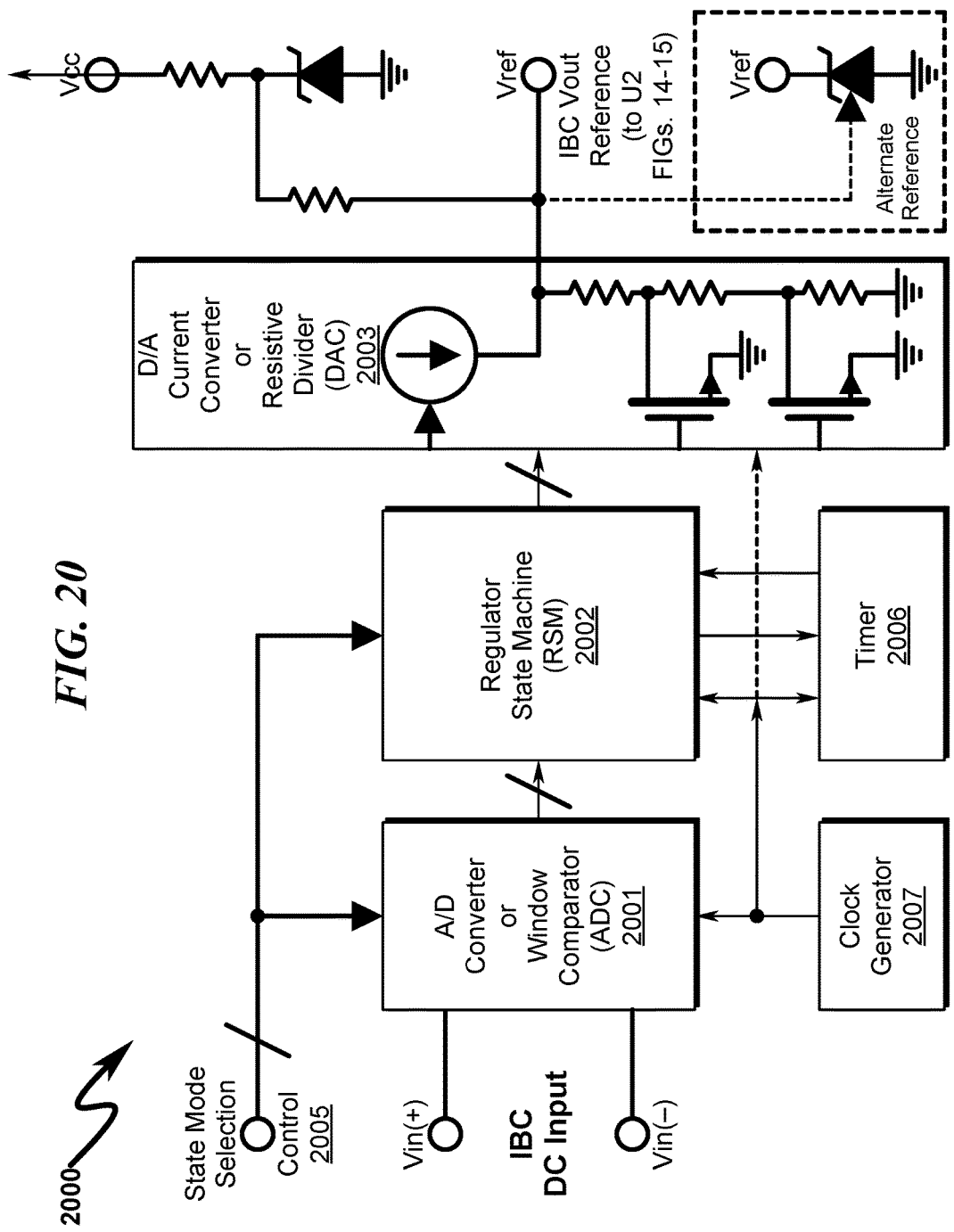
FIG. 20 illustrates an exemplary digital control system block diagram that may be used to implement multi-level IBC output voltage control used on IBC input voltage in conjunction with temporal hysteresis as described in FIG. 19.

Some preferred invention embodiments may employ a digital control system to implement the multi-level IBC output control in response to variations in IBC input voltage (Vin). As generally illustrated in FIG. 20 (2000), an exemplary embodiment of this type of control may employ an A/D converter (2001) (or other voltage level detection circuitry such as a window comparator) to inspect the voltage level of the IBC DC input (Vin) and use the digitized result of this function block to drive a state machine (2002). The state machine (2002) responds to the digitized Vin information to drive a D/A converter (2003) to modulate the Vref voltage that is used by the IBC to regulate its output voltage. The D/A converter may take many forms with a current converter and digitally selected resistor divider being two options depicted in this figure.

The state machine (2002) may be responsive to state mode inputs (2005) which dictate the Vin input voltage threshold levels at which the IBC output levels will be tripped and the IBC output voltage levels (Vout) that are to be associated with the selected Vin input voltage levels. A timer (2006) may be utilized with the state machine to implement time-based hysteresis as described generally in FIG. 19 (1900). Depending on the particular state transition being anticipated, the timer (2006) may delay transition into the potential state based on fixed and/or variable delays associated with individual hysteresis trip point characteristics.

A clock generator (2007) will typically be supporting the A/D converter (2001), state machine (2002), and timer (2006) circuitry to ensure synchronous operation of the system. In some circumstances the clock generator (2007) may also support the D/A converter (2003) to ensure that the Vref signal is stable during trip point transitions.

The precision voltage reference as stylized in this diagram may take many forms. A two-terminal device is depicted, but many implementations may use a three-terminal device (shown as an alternate reference configuration) having a reference node input that can be used in conjunction with the D/A converter to provide a suitable Vref signal for IBC output regulation purposes.

Table-Based Regulation System (2100)

Figure 21:
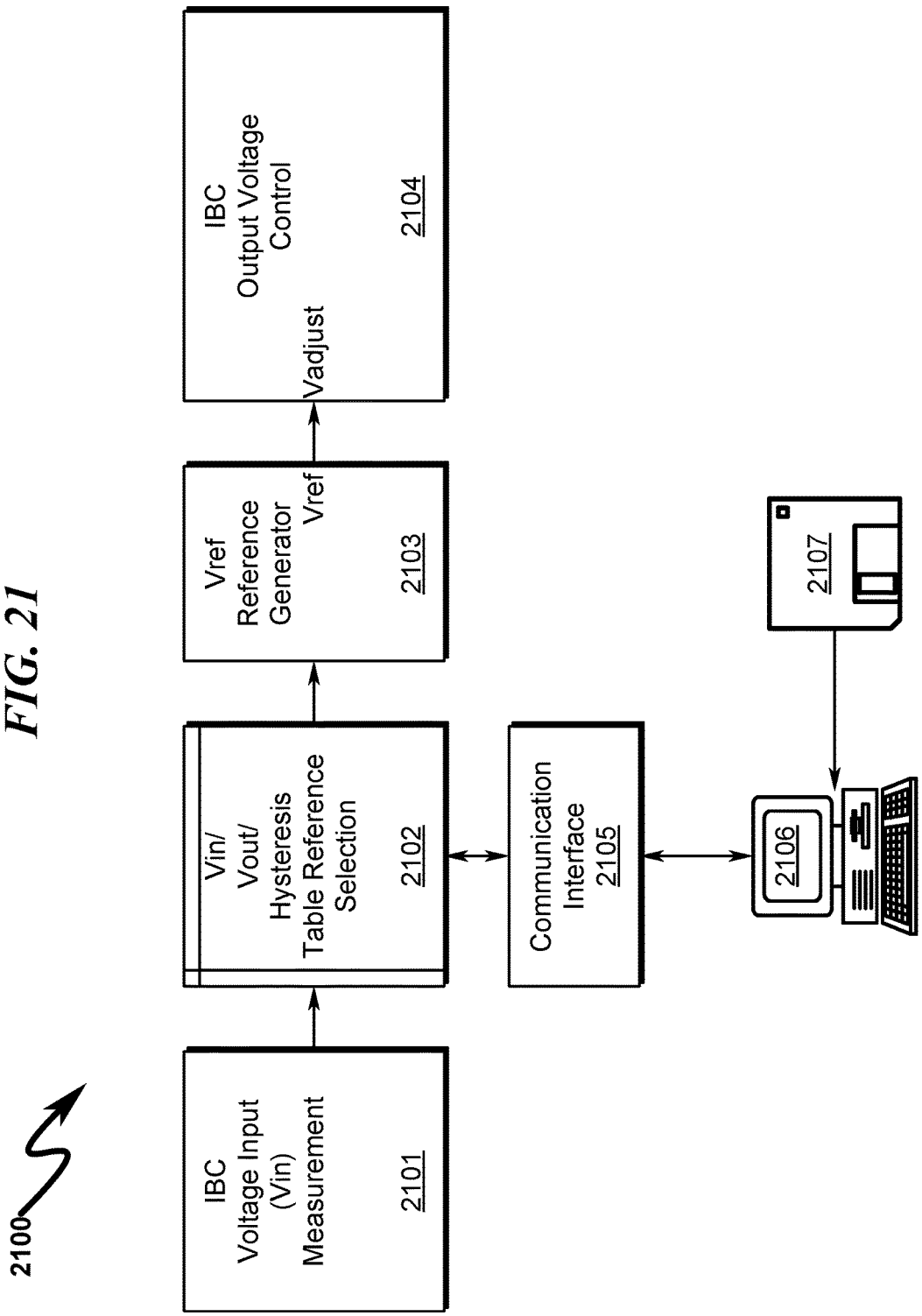
FIG. 21 illustrates an exemplary system block diagram of a table-based multi-level output regulation methodology useful in some preferred invention embodiments.

In some preferred invention embodiments a table-based multi-level regulation methodology may be utilized. As generally depicted in FIG. 21 (2100), this system begins by first measuring the IBC input voltage (Vin) (2101) and then using this information to perform a table lookup of Vin-to-Vout voltages (2102). The desired Vout voltage that is derived from this lookup table (2102) can then be used in conjunction with a voltage reference generator (2103) to generate an adjustment voltage for the IBC output voltage control circuitry (2104). The lookup table (2102) may interact with a communications interface (2105) that allows a computer system (2106) to inspect/modify/define the Vin-to-Vout lookup characteristics in the table (2102) via a serial interface or other communication mechanism under control of software read from a computer readable medium (2107). In this manner the Vin-Vout trip points and associated hysteresis behavior of the multi-level output regulation performed by the IBC regulator (2104) may be defined by software at the factory and/or during operation of the IBC regulator system (2104).

Prima Vs. Secondary Side IBC Vin Sensing (2200)- (2500)

Generalized Secondary Side Indirect Vin Sensing (2200)- (2300)

Figure 22:
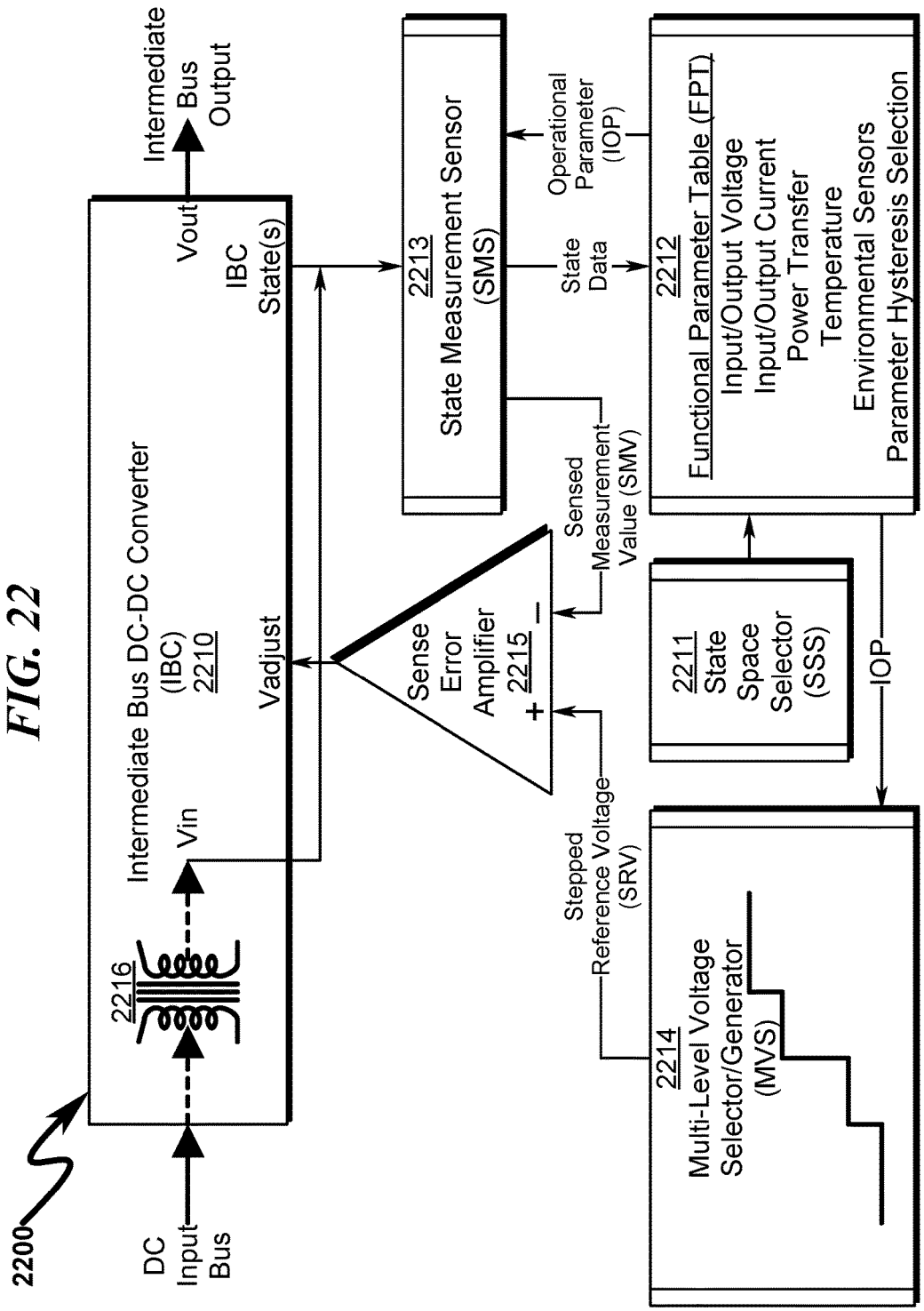
FIG. 22 illustrates an exemplary system block diagram of a multi-level voltage regulator utilizing IBC Vout regulation based on IBC Vin voltage measurements derived from the secondary of the IBC isolation transformer.
Figure 23:
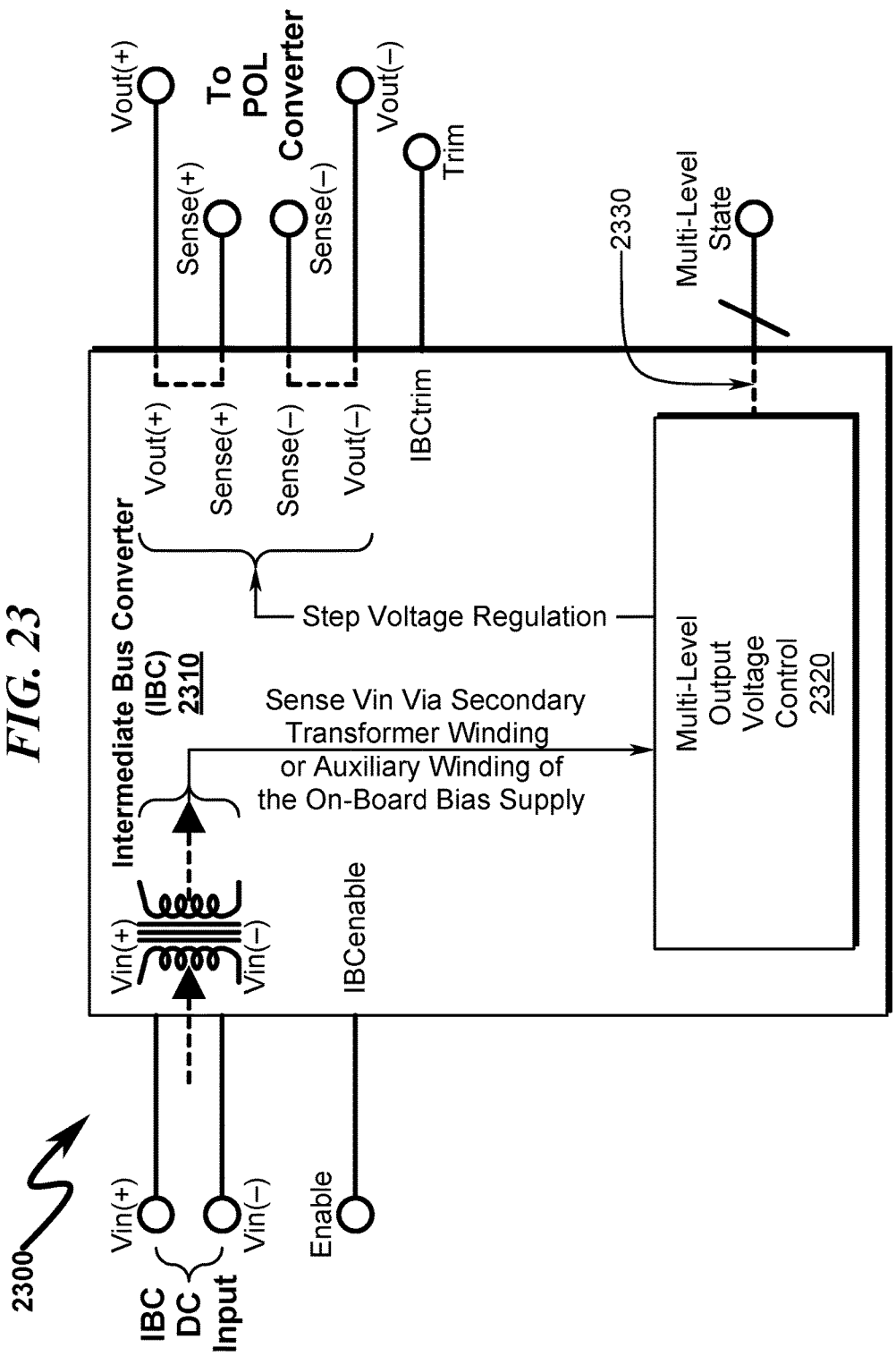
FIG. 23 illustrates integration of multi-step voltage regulation in the context of a typical IBC industry standard regulation system wherein IBC Vin voltage measurements are derived from the secondary of the IBC isolation transformer.

Generally speaking the sensing of the IBC input bus voltage Vin has been discussed in terms of direct measurement of the Vin voltage as presented to the primary side of the IBC isolation transformer. This is generally depicted in FIG. 12 (1200), FIG. 13 (1300), FIG. 17 (1700) and FIG. 18 (1800) as the Vin voltage to the primary based IBC regulator. However, the input voltage sensing does not have to be sensed at the input side of IBC, especially when the IBC controller (regulator) is located in the secondary side of the main IBC transformer, even though the Vin direct sensing in the primary side is generally preferred. As generally illustrated in FIG. 22 (2200) and FIG. 23 (2300), the IBC Vin voltage can also be indirectly sensed from the secondary side of IBC by sensing the transformer secondary side winding waveform to capture the information of input voltage variation. This configuration may be a bit more involved since the Vin information from the transformer secondary tertiary winding may also be distorted or the operation can depend on the IBC primary side switch actions. The advantage for this secondary side sensing is that it may save the Vin range (change) signal across the primary/secondary isolation boundary/barrier without requiring a dedicated opto-coupler or digital isolator. Of course, if the controller is located in the primary side, then it is not an issue since Vin is at the primary side.

Primary/Secondary Isolation

It should be noted that FIG. 14 (1400) and FIG. 15 (1500) generally do not consider the voltage isolation boundary assuming the controller is in the primary side. Given that these are just exemplary embodiments, if the controller is located in the secondary side, the Vin sensing at the primary side, then an opto-isolator (opto-coupler) (1410) as depicted in FIG. 14 (1400) may be needed to interface Q3 output and Q1 gate within FIG. 15 (1500). If the controller is located at the secondary side (along with the reference chip IC1, error amplifier, U2, etc.), then an isolation device such as digital isolator, opto-coupler, and/or signal isolation transformer may be incorporated to communicate Vin range signal.

Exemplary Alternate Vin Sensing Methodologies (2400)-(2500)

Figure 24:
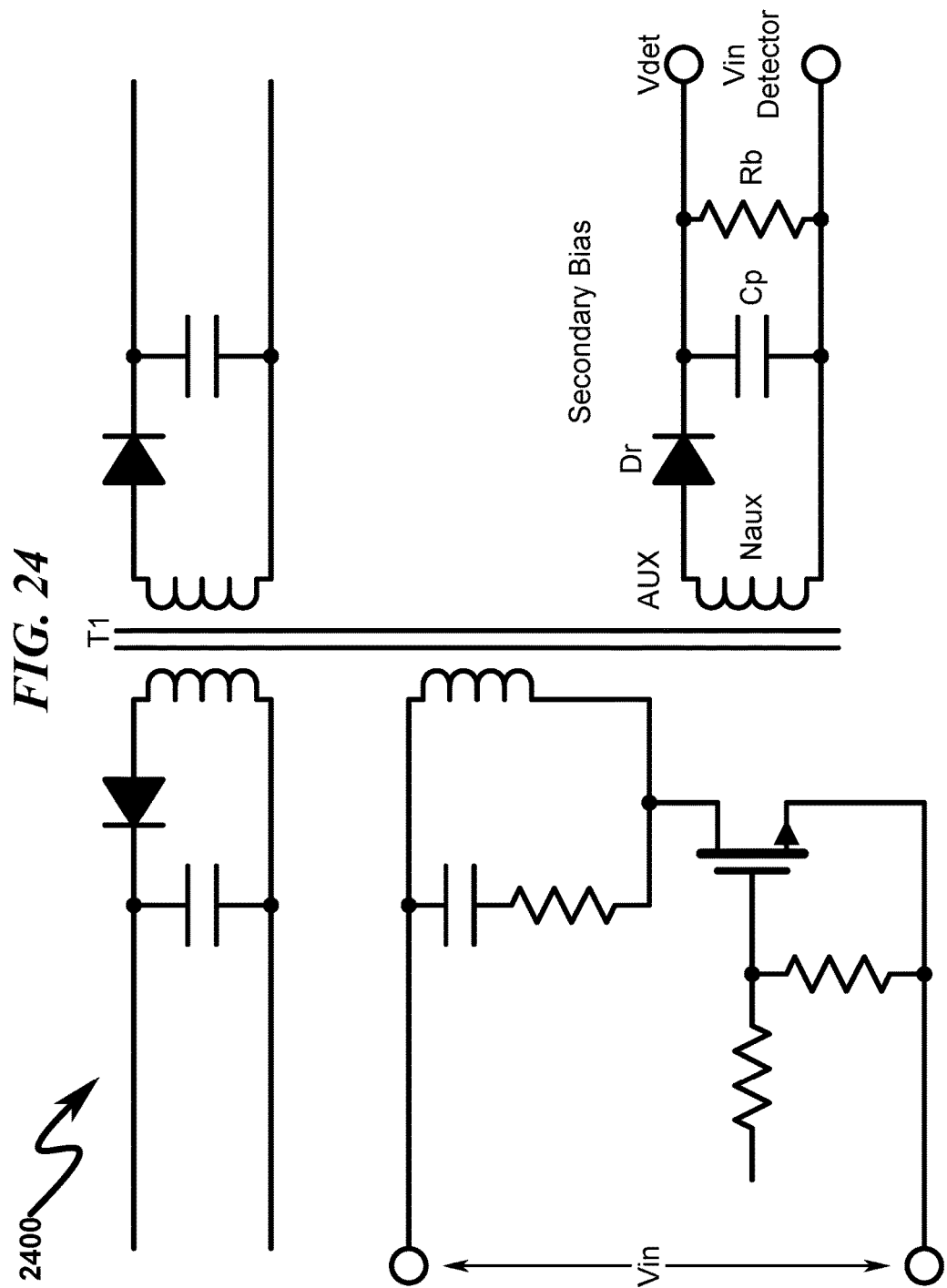
FIG. 24 illustrates an alternate indirect Vin sensing methodology useful in some preferred invention embodiments.
Figure 25:
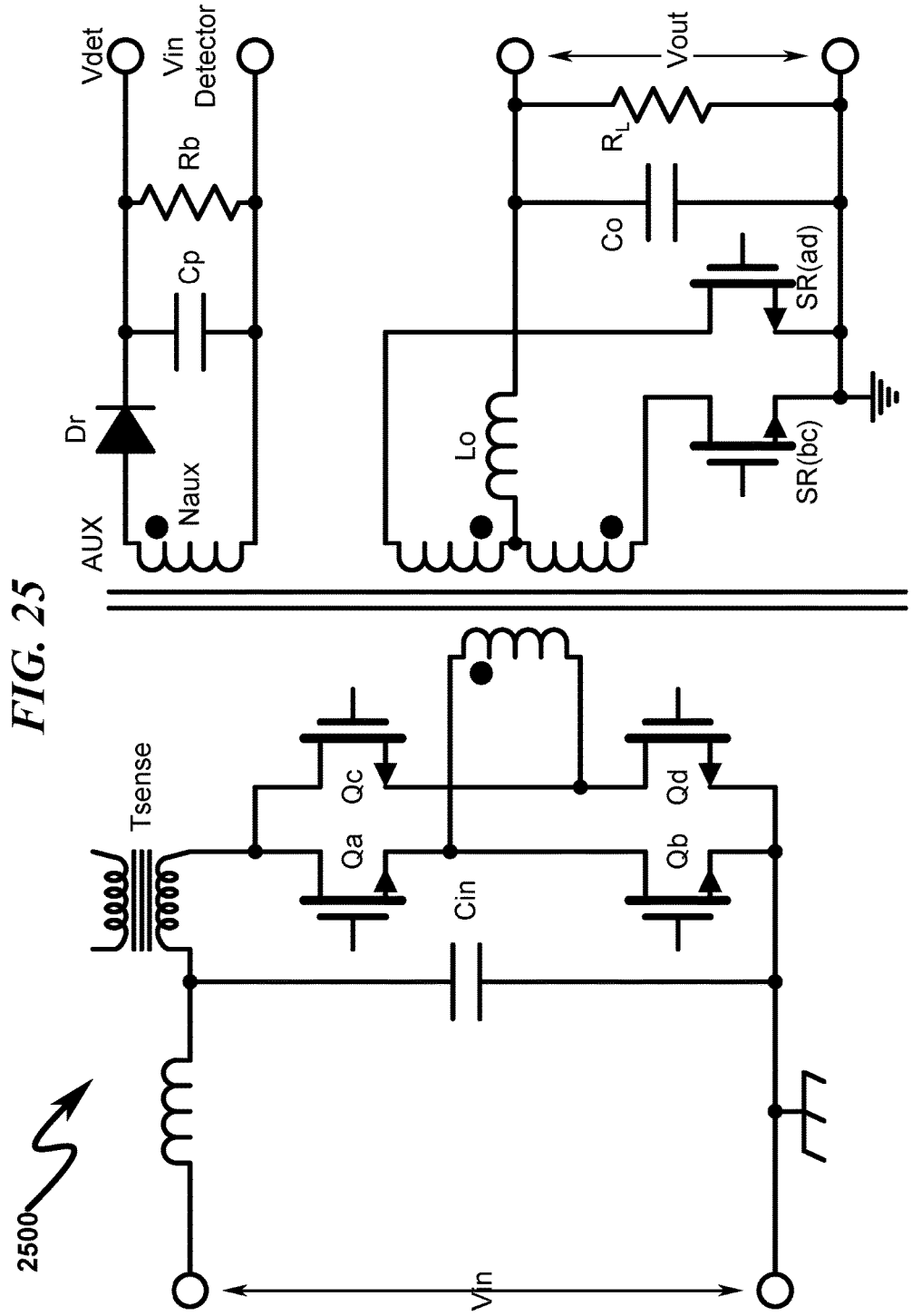
FIG. 25 illustrates an alternate indirect Vin sensing methodology useful in some preferred invention embodiments.

Several examples of alternate Vin sensing methodologies are depicted in FIG. 24 (2400)-FIG. 25 (2500). Referencing FIG. 24 (2400), an auxiliary winding/circuit may be used in the independent bias power supply (house-keeping) when it is available. Otherwise, the same AUX winding circuit can be coupled through the main power transformer (T1) to provide the Vin information/variation. Since Vin is not sensed directly, it is an indirect Vin detection method.

In the configuration of FIG. 24 (2400) the diode Dr rectifies the sensed voltage as provided by Vin. The detected voltage Vdet is the product of in multiplied by (the inverse of transformer turns ratio, 1/n) multiplied by the PWM duty cycle ratio (D/(1-D)) in the primary. The capacitor Cp is peak charged by the AUX winding via diode Dr. Resistor Rb is used to charge the capacitor Cp. This diode-resistor-capacitor (D-R-C) forms a lossy integrator, and can be designed such that it takes several cycles (typically 10-20 cycles) to discharge the capacitor. Within one switching cycle the capacitor Cp does not discharge to a significant degree. Therefore, each switching cycle the stored capacitor energy is replenished (recharged). When Vin decreases, the voltage across the capacitor Cp will also decrease and hence the detection signal Vdet as well. The IBC multi-step regulator can then utilize Vdet to force the IBC output voltage Vout regulation state accordingly.

Referencing FIG. 25 (2500), the AUX winding coupled with the main transformer can also perform Vin detection. This configuration may also need the IBC Vout information to make the correct decision when Vin reaches a high value and no load is presented (load dump). The controller may skip a few cycles in this scenario. Therefore, Rb should be selected as a large resistance to prevent capacitor Cp from discharging during this skipped pulse period. IBC Vout may then be used to help make the correct judgment if Vout is nor reduced in value. When Vin drops, the IBC may have difficulty in maintaining full (or flat) regulation. In this load dump scenario Vout is flat and there is no output regulation difficulty.

Exemplary Primary Side Control with Secondary-Side Vin Sensing (2600)-(2700)

Figure 26:
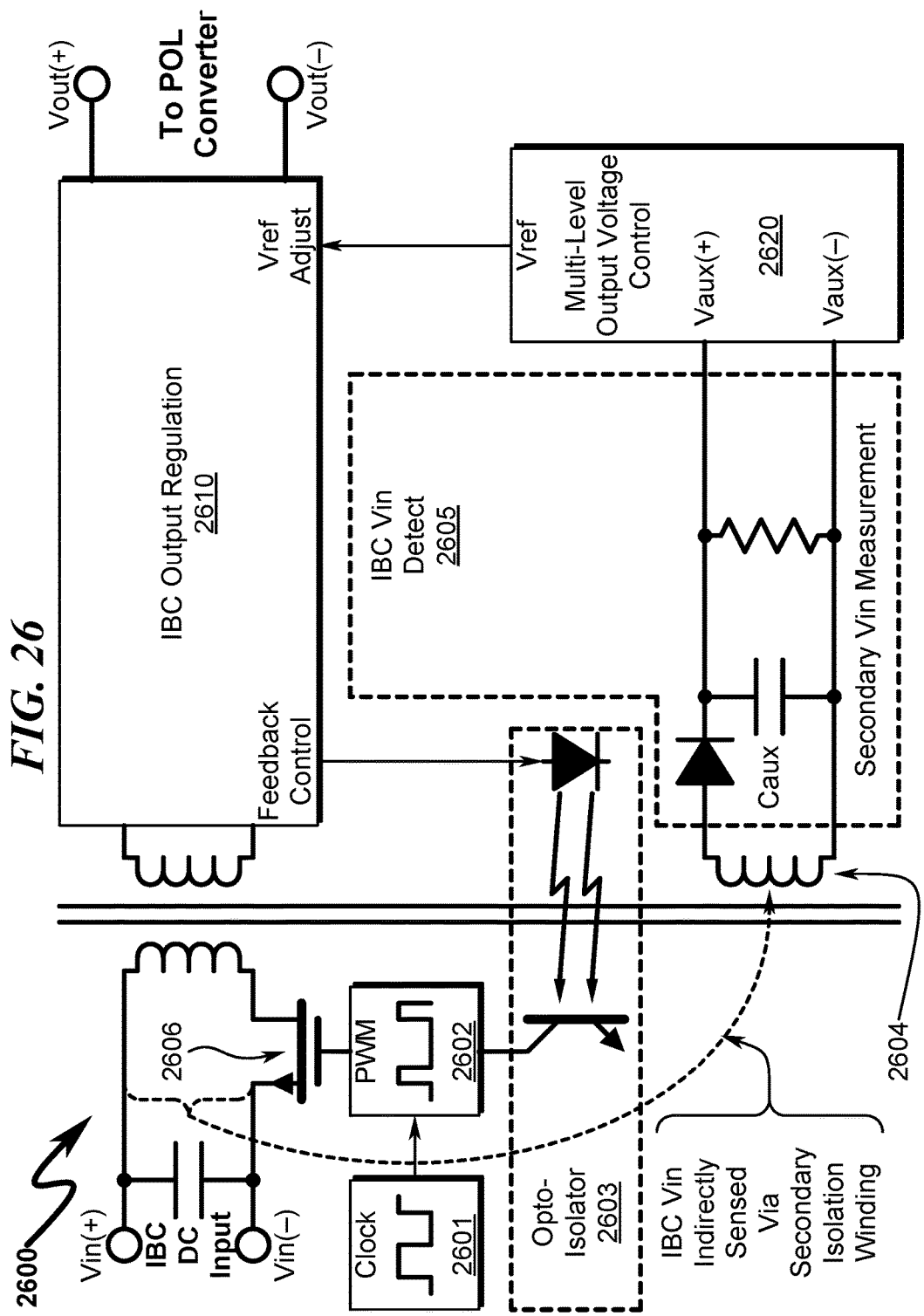
FIG. 26 illustrates an exemplary secondary side indirect Vin detection methodology useful in some preferred invention embodiments.

One exemplary methodology of indirectly sensing the IBC in voltage on the secondary side of the isolation transformer is generally depicted in FIG. 26 (2600) (only one switch (2606) is symbolically depicted here to represent various switch-mode DC-DC converters such as half bridge, full bridge, or push-pull converters, etc.) as an exemplary architecture application context.

In this configuration a clock generator (2601) modulates a PWM generator (2602) in response to opto-isolator input (2603) from the secondary side IBC regulator (2610). This configuration is augmented with an auxiliary winding (2604) from the on-board bias transformer (flyback converter). This auxiliary winding feeds an IBC Vin detector (2605) that incorporates a rectifier diode and capacitor across the auxiliary winding. A bleeding resistor may be connected across the capacitor. This auxiliary winding is referenced to the secondary side of the IBC isolation transformer. Any Vin changes that occur as a result of the IBC DC input will reflect a similar change to the Vaux detector voltage due to fixed turns ratio in the bias transformer and magnetic coupling, which can then be used for the purpose of indirect detection of Vin by the multi-level regulator control module (2620). Since the bias FETs switch all the time (and generally switch independently from the IBC main switches), and are independent of the IBC output load, the voltage across the auxiliary capacitor (Vaux) will track the IBC Vin voltage quite well.

Figure 27:
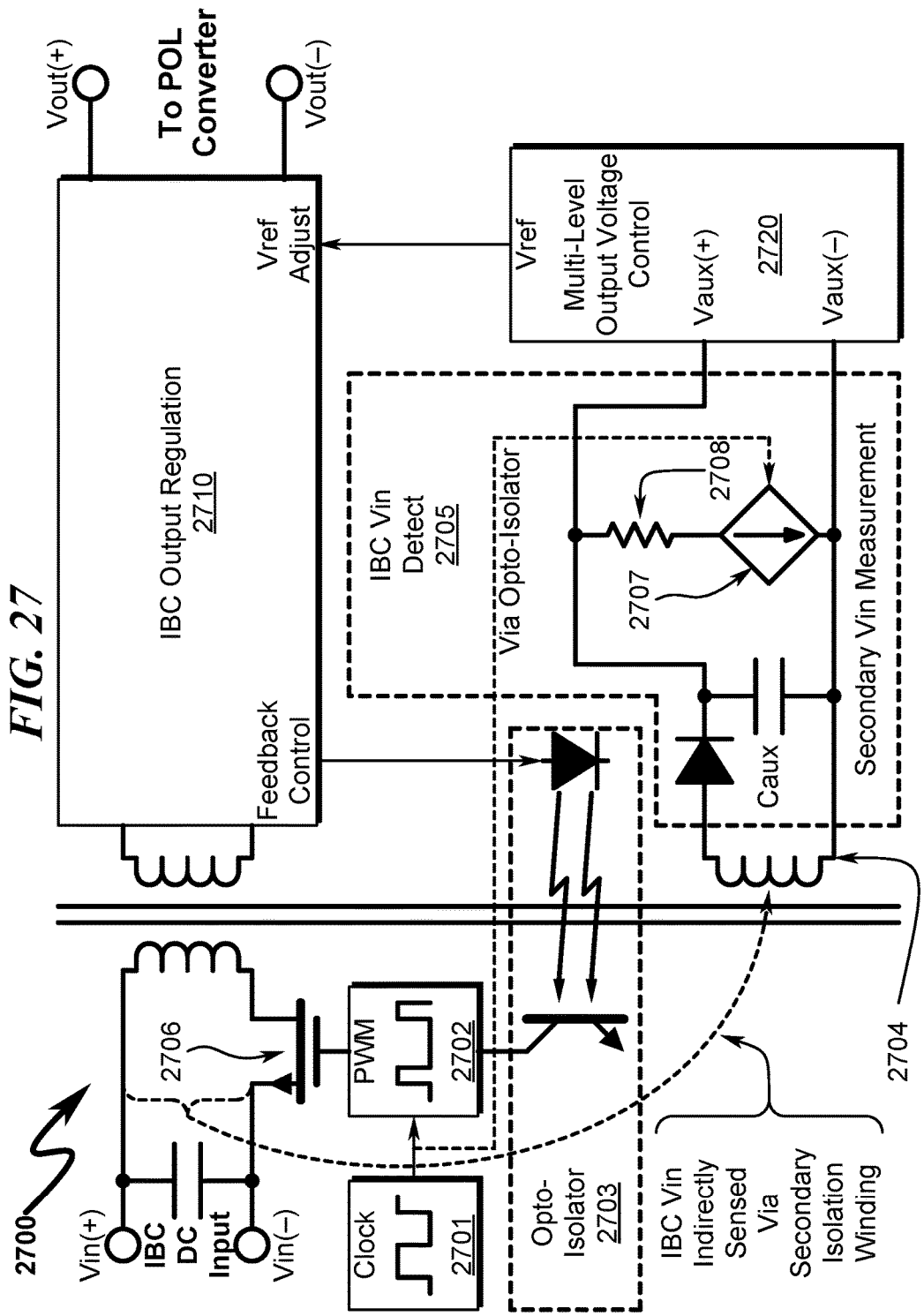
FIG. 27 illustrates an exemplary secondary side indirect Vin detection methodology incorporating peak charging detection that may be useful in some preferred invention embodiments.

As generally depicted in FIG. 27 (2700), a peak charging method may also be utilized to indirectly detect the IBC Vin voltage. In this configuration the bleeding resistor can also be replaced by a controlled current source (MOSFET, BJT, etc.) (2707) in series with an optional resistor that is controlled by a fixed duty cycle signal from the primary side of the IBC isolation transformer. This signal can be either in sync with the primary side main switching transistors (2706) or the on-board bias supply switch (shown in FIG. 28 (2800) and FIG. 29 (2900)), and will be generally transported across the IBC isolation transformer isolation barrier via an opto-isolator (not shown) or other equivalent isolation methodology. Dashed control lines are generally isolated.

One skilled in the art will recognize that the exemplary schematics of FIG. 26 (2600) and FIG. 27 (2700) may be modified as dictated by application context to affect a wide variety of secondary-side indirect Vin detection methodologies.

Exemplary Secondary Side Regulation (2800)-(2900)

Figure 28:
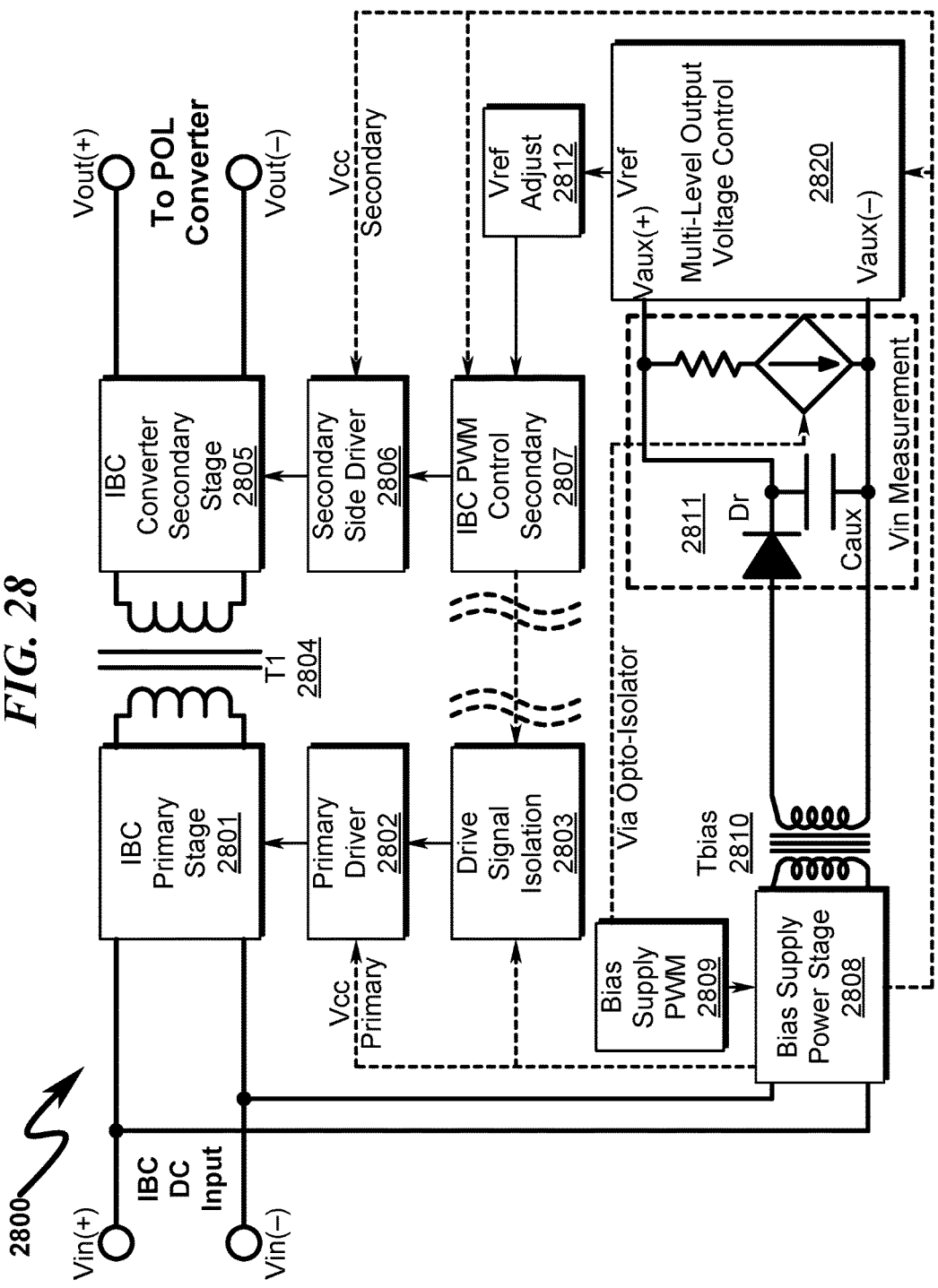
FIG. 28 illustrates a preferred exemplary invention embodiment utilizing secondary converter control and a bias supply to indirectly detect IBC Vin voltage across the secondary of the IBC transformer.
Figure 29:
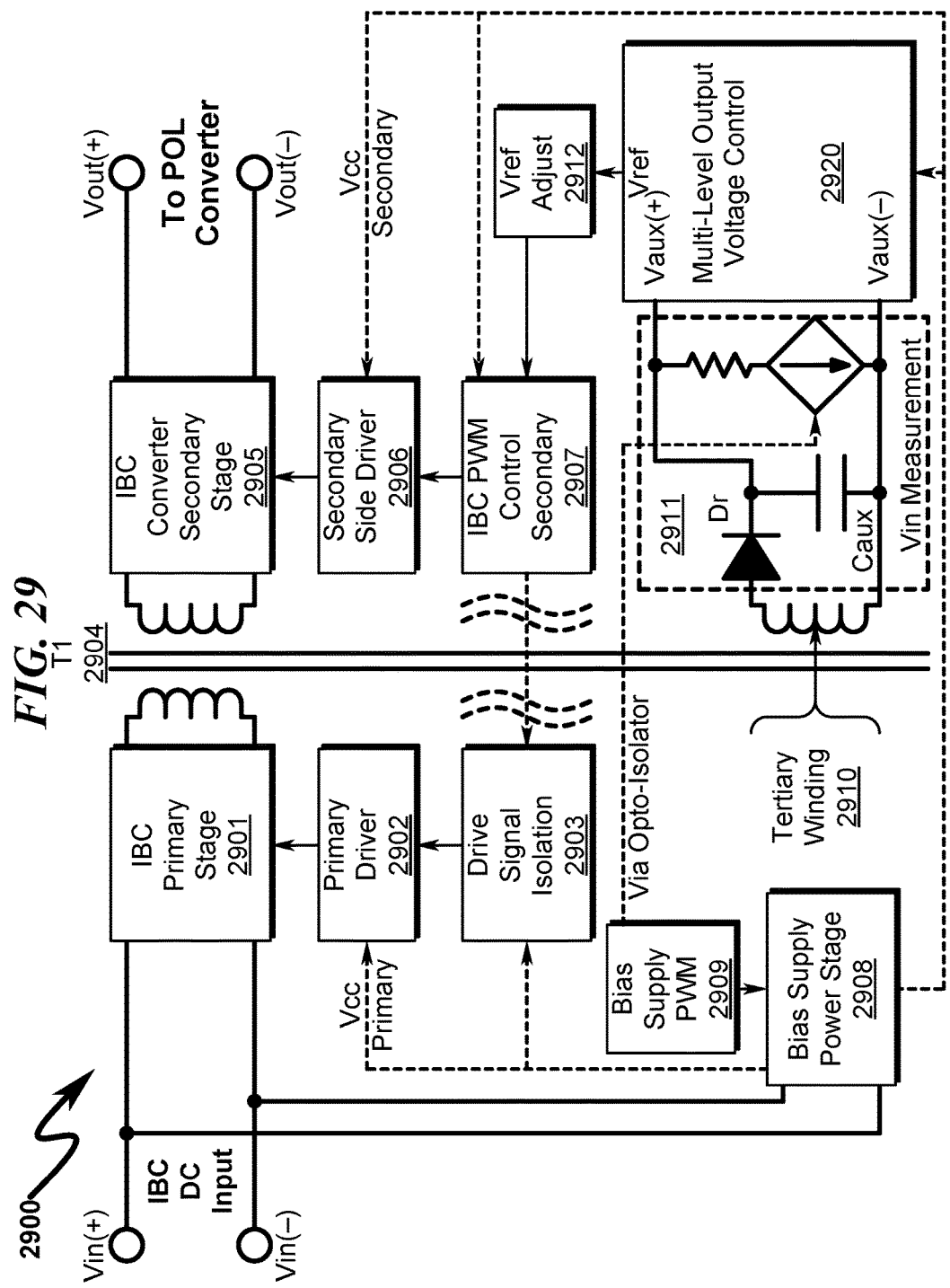
FIG. 29 illustrates a preferred exemplary invention embodiment utilizing secondary converter control and a tertiary transformer winding to indirectly detect IBC Vin voltage across the secondary of the IBC transformer.

While many preferred embodiments of the present invention employ primary side converter regulation, the present invention may also be utilized in situations where secondary side regulation is configured, as depicted generally in FIG. 28 (2800) and FIG. 29 (2900).

Bias Supply Transformer Vin Sensing (2800)

Referencing FIG. 28 (2800), a DC-DC converter employing a primary stage (2801) with primary side drivers (2802) (typically a MOS bridge) and drive signal(s) isolation device (2803) are isolated via transformer T1 (2804) from a secondary side converter (2805) having secondary drivers (2806) and power control circuitry (2807). A bias supply power stage (2808) including the isolation bias transformer driven by PWM control (2809) provides isolated supply voltages for the operation of the primary and secondary sides of the system. A separate bias supply transformer auxiliary winding (2810) provides input to the secondary indirect Vin measurement circuitry (2811) that indirectly measures the IBC Vin voltage for use as the Vaux potential for the multi-level output voltage control system (2820) to generate a Vref signal used to adjust the compliance Vref adjustment (2812) for the secondary power controller (2807). As generally illustrated in this diagram, the majority of the regulation/control circuitry is located on the secondary side of the transformer (2804) with primary side Vin voltage sensing performed indirectly via a bias supply transformer auxiliary winding (2810) coupled to the primary side Vin input.

Tertiary Transformer Vin Sensing (2900)

As generally illustrated in FIG. 29 (2900), the bias isolation transformer (2810) may be replaced with a tertiary winding (2910) on the main transformer (2904) as illustrated to provide an equivalent indirect methodology of sensing the Vin voltage provided to the IBC. One skilled in the art will recognize that this configuration and that depicted in FIG. 28 (2800) are only exemplary of the concept that the present invention anticipates that either primary or secondary control may be used in conjunction with indirect sensing of the IBC Vin input voltage to determine the Vref adjustment that is applied as the reference voltage to achieve multi-level IBC Vout output regulation.

Vin Sensing Summary

One skilled in the art will recognize that from the above discussion the present invention makes no limitation on HOW the IBC Vin voltage is detected. This voltage sensing may occur on the primary side of the IBC transformer, indirectly on the secondary side of the IBC transformer, or via a bias supply. Additionally, the IBC regulation control may occur either on the primary side of the IBC isolation transformer, the secondary side of the IBC isolation transformer, or in some circumstances on both sides of the IBC isolation transformer.

Multi-Level Voltage Regulator Control Method (3000)

Figure 30:
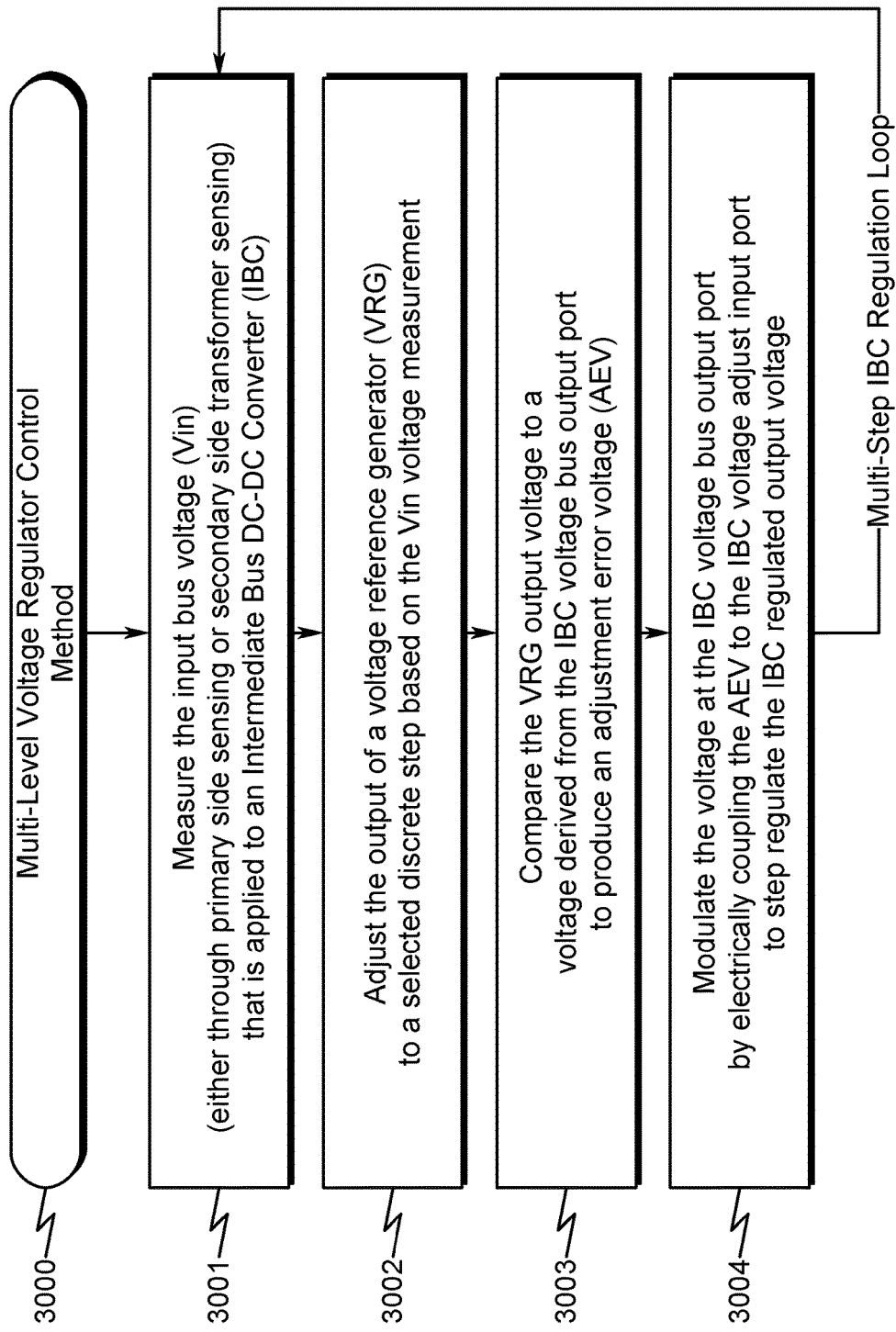
FIG. 30 illustrates an exemplary flowchart depicting a multi-level voltage regulator control method useful in some preferred invention embodiments.

The present invention method anticipates a wide variety of variations in the basic theme of implementation, but may in some preferred embodiments be implemented as depicted in FIG. 30 (3000) to mimic the functionality in FIG. 14 (1400) as a multi-level voltage regulator method comprising:
- (1) Measuring the input bus voltage (Vin) (either through primary side sensing or secondary side transformer sensing) that is applied to an Intermediate Bus DC-DC Converter (IBC) that further comprises a voltage bus input port (VBIP), voltage bus output port (VBOP), and voltage adjust input port (VAIP) (3001);
- (2) Adjusting the output of a voltage reference generator (VRG) to a selected discrete step based on the Vin voltage measurement (3002);
- (3) Comparing the VRG output voltage to a voltage derived from the VBOP to produce an adjustment error voltage (AEV) (3003);
- (4) Modulating the voltage at the VBOP by electrically coupling the AEV to the VAIP to step regulate the IBC regulated output voltage (3004); and
- (5) Proceeding to step (1);

One skilled in the art will recognize that this method maps the signal flow in FIG. 14 (1400) and may be represented as a continuous analog control system that may be implemented in a wide variety of technologies. The key features of this system are (1) use of yin to determine regulated Vout characteristics (either via direct primary input measurement or via a secondary transformer measurement of the Vin voltage); and (2) the use of defined multi-level output voltage regulation steps that are associated with ranges of Vin monitored voltage.

Primary Multi-Level Regulation Table Lookup Method (3100)

Figure 31:
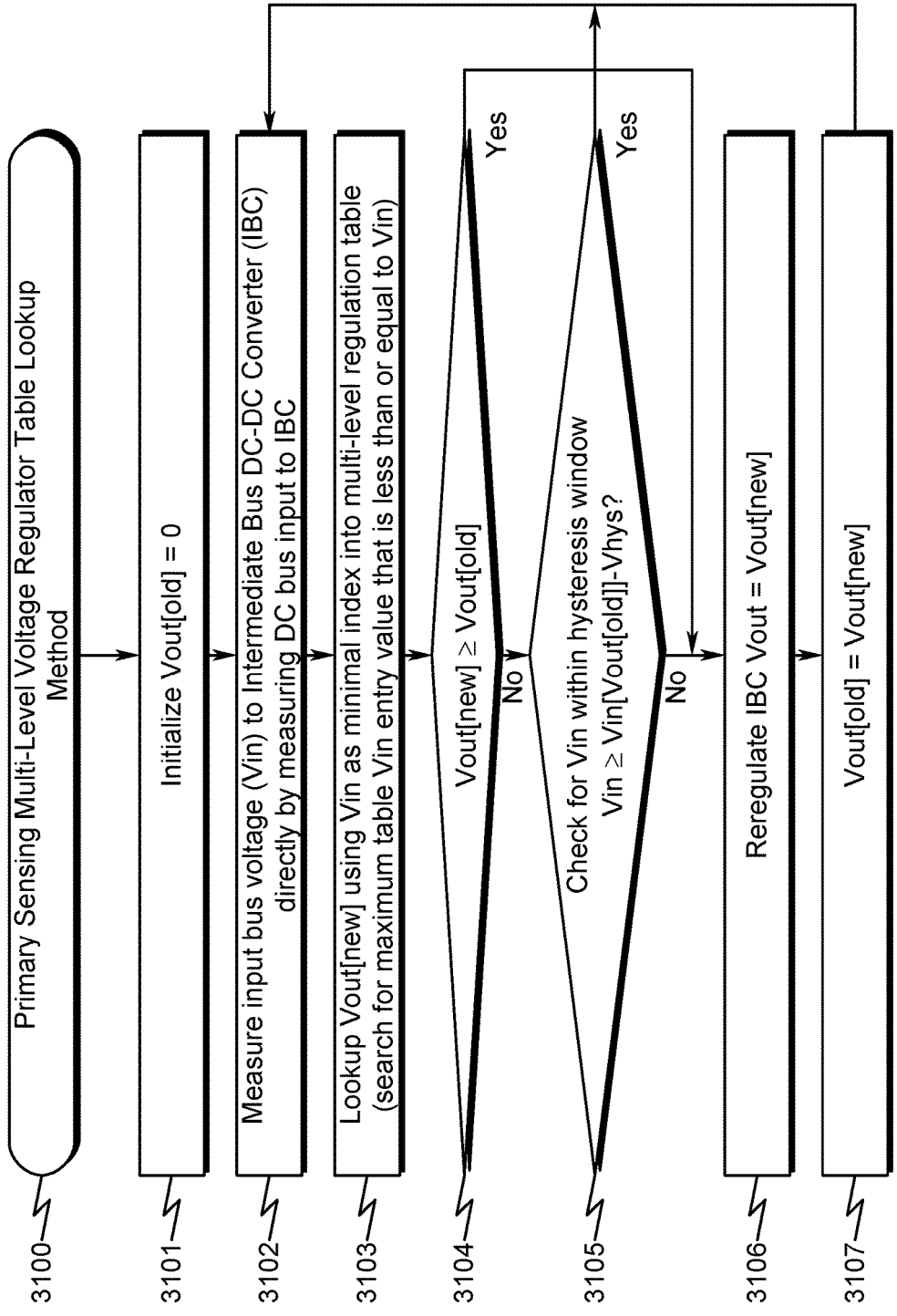
FIG. 31 illustrates an exemplary flowchart depicting a primary sensing multi-level voltage regulator table lookup method useful in some preferred invention embodiments.

The present invention system incorporating primary side input voltage sensing with a table lookup multi-level regulation methodology described above may be utilized in conjunction with a method as generally described in the flowchart illustrated in FIG. 31 (3100). The steps in this multi-level voltage regulator table lookup method generally comprise:
- (1) Initializing a previous Vout[old] voltage reference value (3101);
- (2) Measuring the input bus voltage (Vin) applied to an Intermediate Bus DC-DC Converter (IBC) directly by measuring the DC bus input to the IBC (3102);
- (3) Minimally indexing the Vin voltage within a multi-level IBC voltage regulation table to obtain a Vout [new] target output regulation value (by minimally indexing, it is meant that assuming the table values are monotonic, searching for the maximum table Vin value that is less than or equal to the Vin voltage) (3103);
- (4) Determining if the Vout[new] target regulation value is at or above the previous Vout[old] regulation value, and if so, proceeding to step (6) (3104);
- (5) Determining if the IBC input voltage Vin is greater than or equal to the difference of the previous in voltage associated with the previous Vout[old] reference point minus the hysteresis voltage associated with the previous Vin voltage, and if so, proceeding to step (2) (this step determines whether Vin is within the hysteresis window for the current set point and ensures that the IBC output voltage will not be down-regulated unless the Vin value is below the hysteresis threshold below the Vout[old] set point) (3105);
- (6) Reregulating the IBC output voltage by adjusting a reference voltage used by the IBC to regulate the IBC output voltage to Vout[new] (3106); and
- (7) Resetting Vout[old] value to the new Vout[new] IBC output regulation set point and proceeding to step (2) (3107).

The hysteresis calculation in step (5) may be configured to have hysteresis values that vary by input voltage Vin and also by the set point Vout values.

A typical table lookup methodology using this above method may look as follows:

| Vin | Vout | Vhysteresis |
|-----|------|-------------|
| 0   | 0    | 0           |
| 28  | 8.3  | 0.5         |
| 32  | 9.6  | 0.5         |
| 36  | 12   | 1.5         |

This table may be used as follows. For example, if Vin=30V, the lookup table would search past Vin=28V and indicate that Vout=8.3V, since the next table entry is indexed at Vin=32V. Thus, Vin can increase beyond 28V up to 32V without any Vout transitioning occurring. Once Vin equals 32V, the Vout output regulation is shifted to 9.6V. Once the 9.6V regulation point is achieved, a drop in Vin below 32V will not trigger a transition to the 8.3V regulation point until the hysteresis threshold of (32V−0.5V=31.5V) is reached, at which point regulation is shifted down to the 8.6V set point associated with Vin=28V. Similar methodologies are applied to any number of other trip points and regulation points in the table. Note that since this lookup incorporates the Vin, Vout, and Vhysteresis values, it may be utilized in either analog or digital systems embodying the multi-step regulation technique. Some preferred invention embodiments may also incorporate a hybrid analog/digital approach to achieve this stair-stepped regulation technique. As mentioned elsewhere in this document this lookup table may in some circumstances be programmable via a communication interface from a computer system executing software read from a computer readable medium. This may permit factor and/or end-user programming of the trip point/regulation characteristics of the IBC.

One skilled in the art will recognize that these table values are only exemplary and are not limitive of the present invention. Additionally, while a three-step regulation methodology is depicted, the number of levels in the multi-level regulation scheme is not limited by the present invention teachings and is anticipated to encompass two or more levels.

Secondary Multi-Level Regulation Table Lookup Method (3200)

Figure 32:
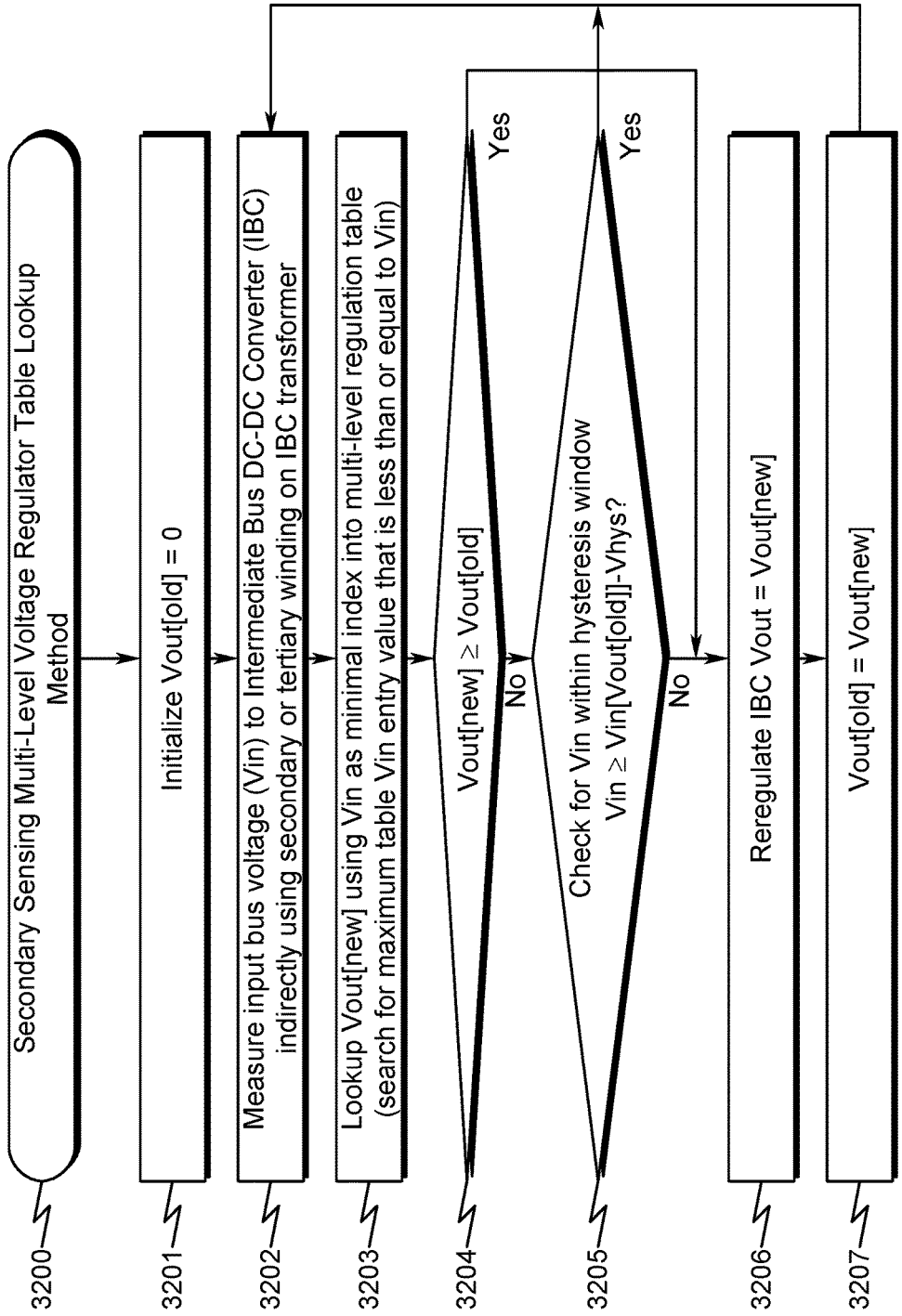
FIG. 32 illustrates an exemplary flowchart depicting a secondary sensing multi-level voltage regulator table lookup method useful in some preferred invention embodiments.

The present invention system incorporating secondary side indirect input voltage sensing with a table lookup multi-level regulation methodology described above may be utilized in conjunction with a method as generally described in the flowchart illustrated in FIG. 32 (3200). The steps in this multi-level voltage regulator table lookup method generally comprise:

(1) initializing a previous Vout[old] voltage reference value (3201);
(2) Measuring the input bus voltage (Vin) applied to an Intermediate Bus DC-DC Converter (IBC) indirectly using secondary winding on IBC transformer (3202);
(3) Minimally indexing the Vin voltage within a multi-level IBC voltage regulation table to obtain a Vout[new] target output regulation value (by minimally indexing, it is meant that assuming the table values are monotonic, searching for the maximum table Vin value that is less than equal to the Vin voltage) (3203);
(4) Determining if the Vout[new] target regulation value is at or above the previous Vout[old] regulation value, and if so, proceeding to step (6) (3204);
(5) Determining if the IBC input voltage Vin is greater than or equal to the difference of the previous Vin voltage associated with the previous Vout[old] reference point minus the hysteresis voltage associated with the previous Vin voltage, and if so, proceeding to step (2) (this step determines whether Vin is within the hysteresis window for the current set point and ensures that the IBC output voltage will not be down-regulated unless the Vin value is below the hysteresis threshold below the Vout[old] set point) (3205);
(6) Reregulating the IBC output voltage by adjusting a reference voltage used by the IBC to regulate the IBC output voltage to Vout[new] (3206); and
(7) Resetting the Vout[old] value to the new Vout[new] IBC output regulation set point and proceeding to step (2) (3207).

The hysteresis calculation in step (5) may be configured to have hysteresis values that vary by input voltage Vin and also by the set point Vout values.

This method differs from that depicted in FIG. 31 (3100) in that step (2) measures the IBC input voltage indirectly by measuring a voltage present on a secondary or tertiary winding of the IBC isolation transformer. This methodology may be useful in some circumstances where direct measurement of the IBC DC input bus voltage (Vin) is not possible and/or practical. Above discussions of the table definition associated with FIG. 31 (3100) are also applicable to this methodology.

Generalized Method Overview (3300)

Figure 33:
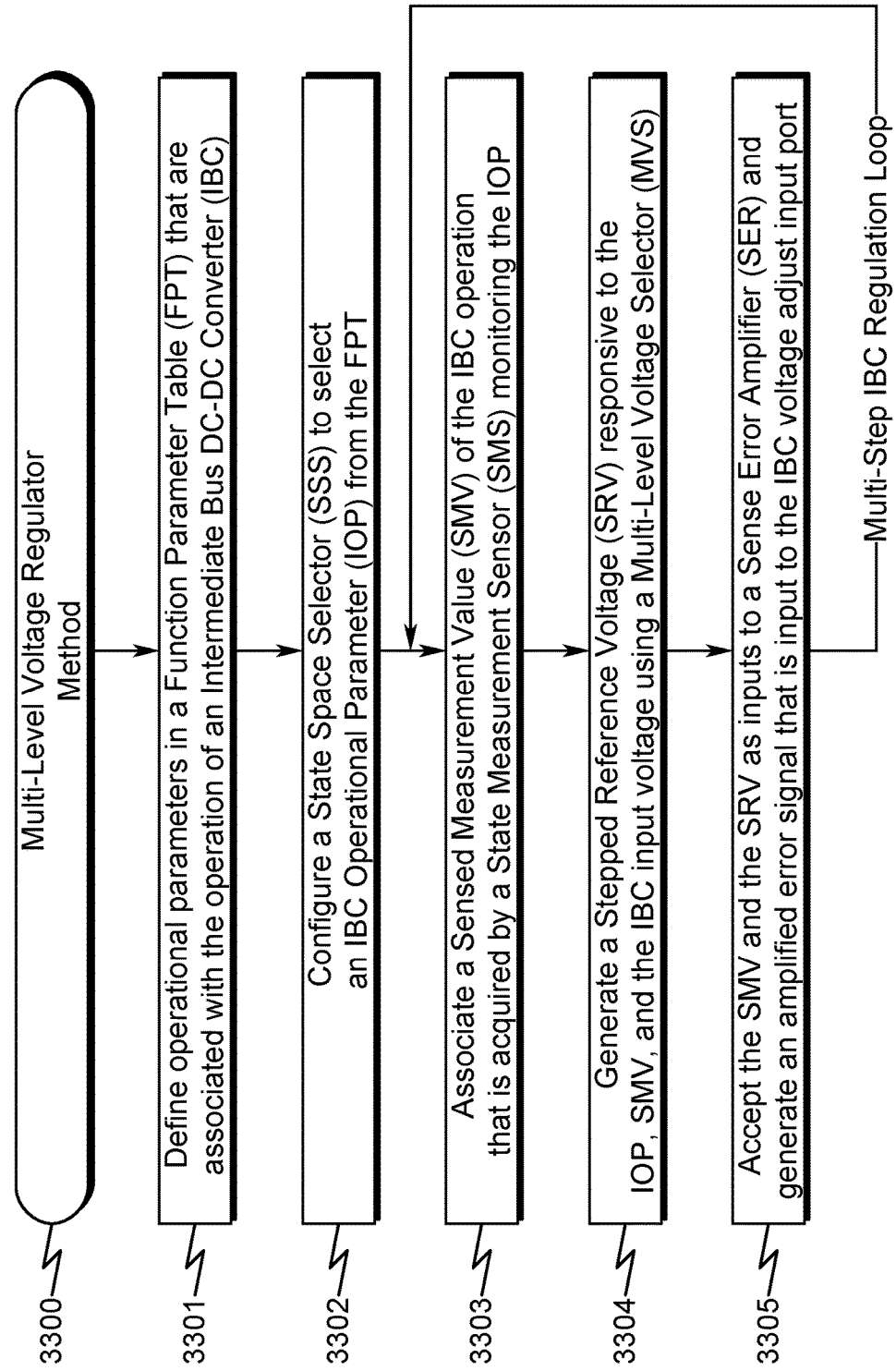
FIG. 33 illustrates a flowchart depicting an exemplary multi-level voltage regulator method.

The present invention system described above may be utilized in conjunction with a method as generally described in the flowchart illustrated in FIG. 33 (3300). The steps in this multi-level voltage regulator method generally comprise:

(1) defining operational parameters in a Function Parameter Table (FPT) that are associated with the operation of an Intermediate Bus DC-DC. Converter (IBC) comprising a voltage bus input port (VBIP), voltage bus output port (VBOP), and voltage adjust input port (VAIP) (3301);
(2) configuring a State Space Selector (SSS) to select an IBC Operational Parameter (IOP) from the FPT (3302);
(3) associating a Sensed Measurement Value (SMV) of the IBC operation that is acquired by a State Measurement Sensor (SMS) monitoring the IOP (3303);
(4) generating a Stepped Reference Voltage (SRV) responsive to the IOP and the SMV using a Multi-Level Voltage Selector (MVS) (3304); and
(5) accepting the SMV and the SRV as inputs to a Sense Error Amplifier (SER) and generating an amplified error signal that is electrically coupled to the VAIP (3305).

The control loop comprising steps (3) through (5) may be repeated as necessary to maintain. Vout compliance with the SRV generated by the MVS.

This general method may be modified heavily ending on a number of factors, with rearrangement and/or addition/deletion of steps anticipated by the scope of the present invention. Integration of this and other preferred exemplary embodiment methods in conjunction with a variety preferred exemplary embodiment systems described herein is anticipated the overall scope of the present invention.

Three-Level Non-Hysteresis Regulation Method (3400)-(3500)

Figure 34:
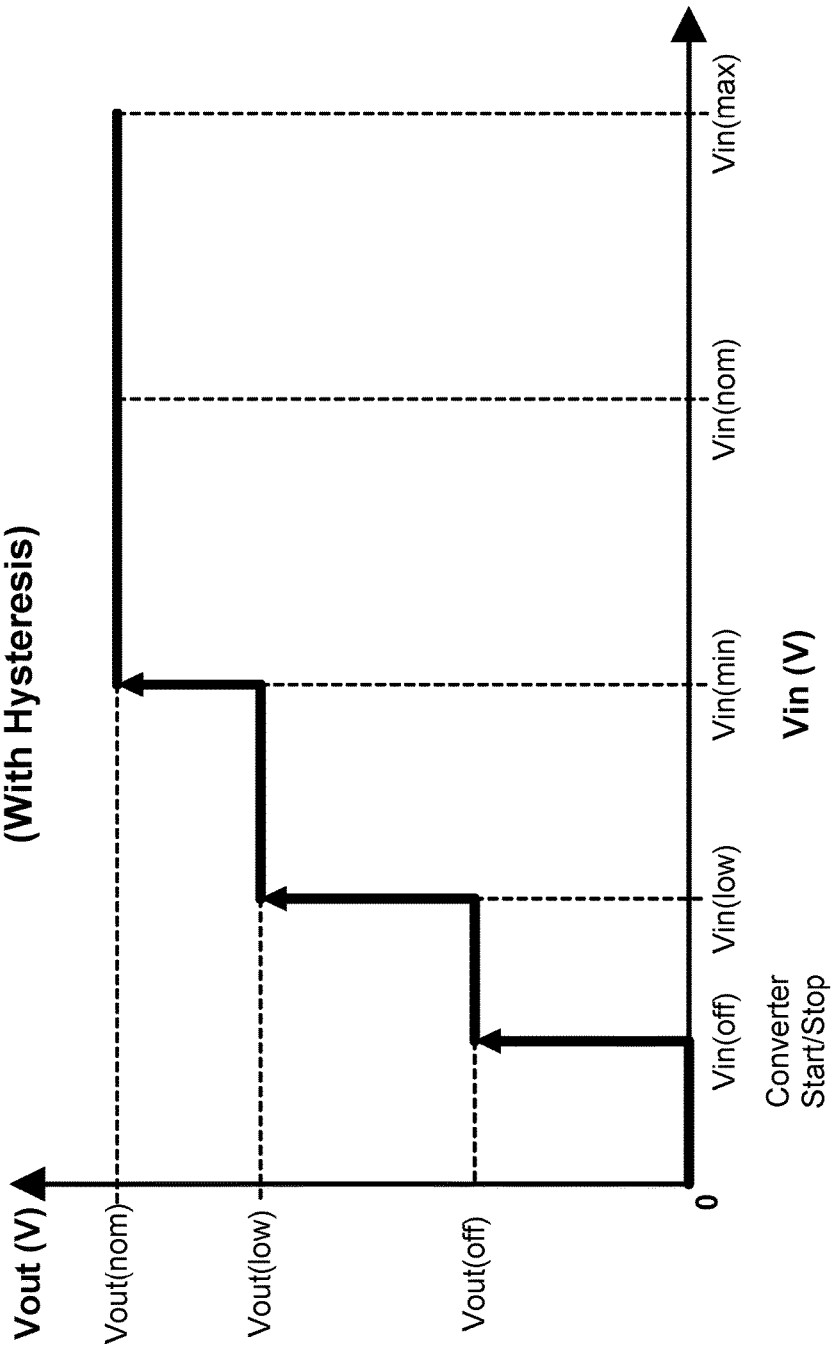
FIG. 34 illustrates an exemplary three-level voltage regulation transfer characteristic without input hysteresis.
Figure 35:
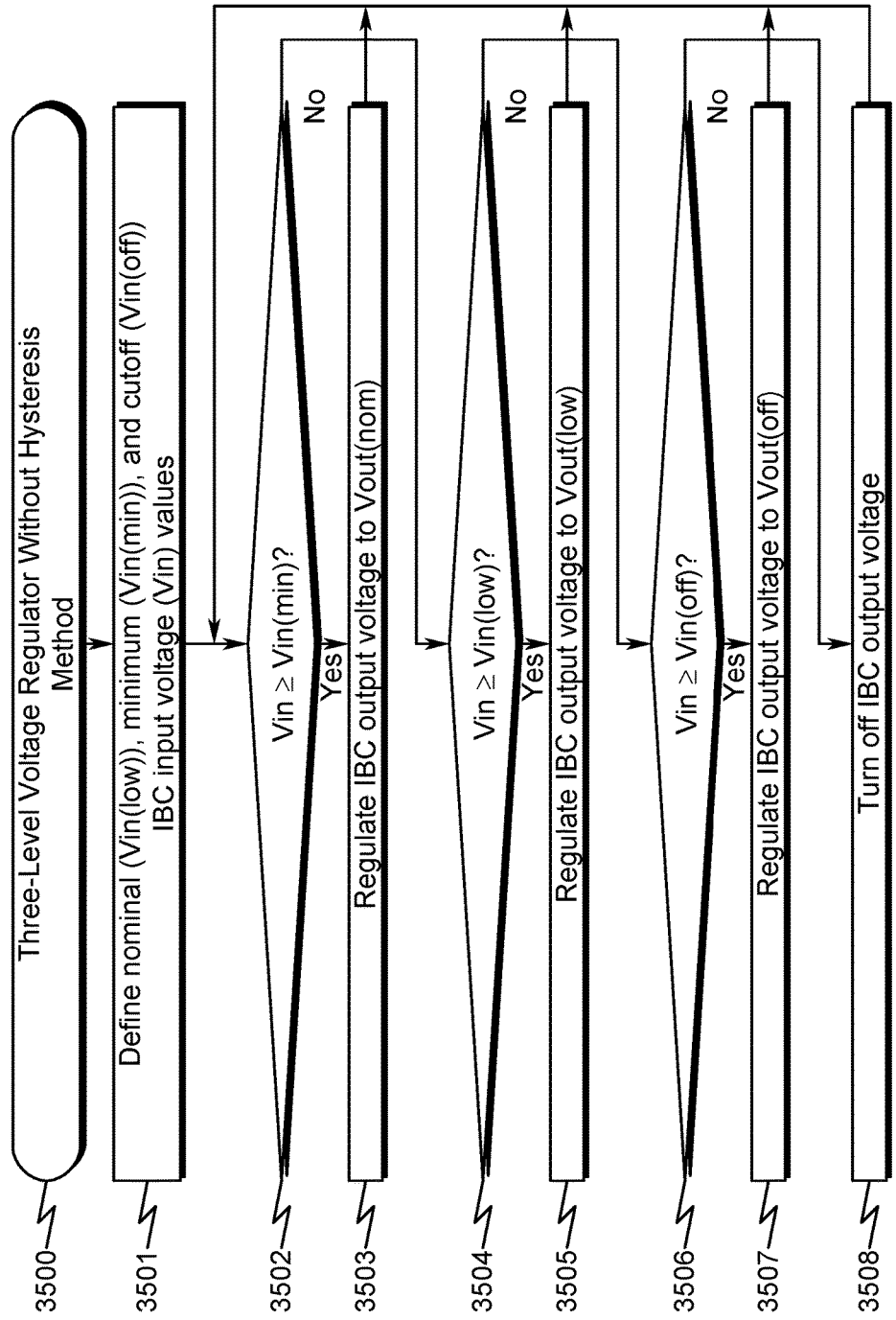
FIG. 35 illustrates a flowchart depicting an exemplary three-level voltage regulator without hysteresis method.

The present invention system described above may be utilized in conjunction with a three-level regulation method (without considering hysteresis) as generally described in the exemplary transfer characteristic depicted in FIG. 34 (3400) and the flowchart illustrated in FIG. 35 (3500). The steps in this three-level voltage regulator method generally comprise:

(1) defining cutoff (Vin(off)), minimum (Vin(low)), nominal (Vin(min)) IBC input voltage (Vin) values (3501);
(2) determining if Vin is greater than or equal to Vin(min), and if not, proceeding to step (4) (3502);
(3) regulating the IBC output voltage to Vout(nom) and proceeding to step (2) (3503);
(4) determining if Vin greater than or equal to Vin(low) and if not, proceeding to step (6) (3504);
(5) regulating the IBC output voltage to Vout(low) and proceeding to (2) (3505);
(6) determining if Vin is greater than or equal to Vin(off), and if not, proceeding to step (8) (3506);
(7) regulating the IBC output voltage to Vout(off) and proceeding to step (2) (3507); and
(8) turning off the IBC output voltage (Vout) and proceeding to step (2) (3508).

In some circumstances step (8) may be replaced to allow the IBC output voltage to attempt compliance as best as possible without forcing a direct shutoff of the IBC regulator. Additionally, steps (6) to (8) may be replaced by an independent input voltage turn-on and turn-off circuitry outside the voltage regulation loop.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Three-Level Hysteresis Regulation Method (3600)-(3800)

Figure 36:
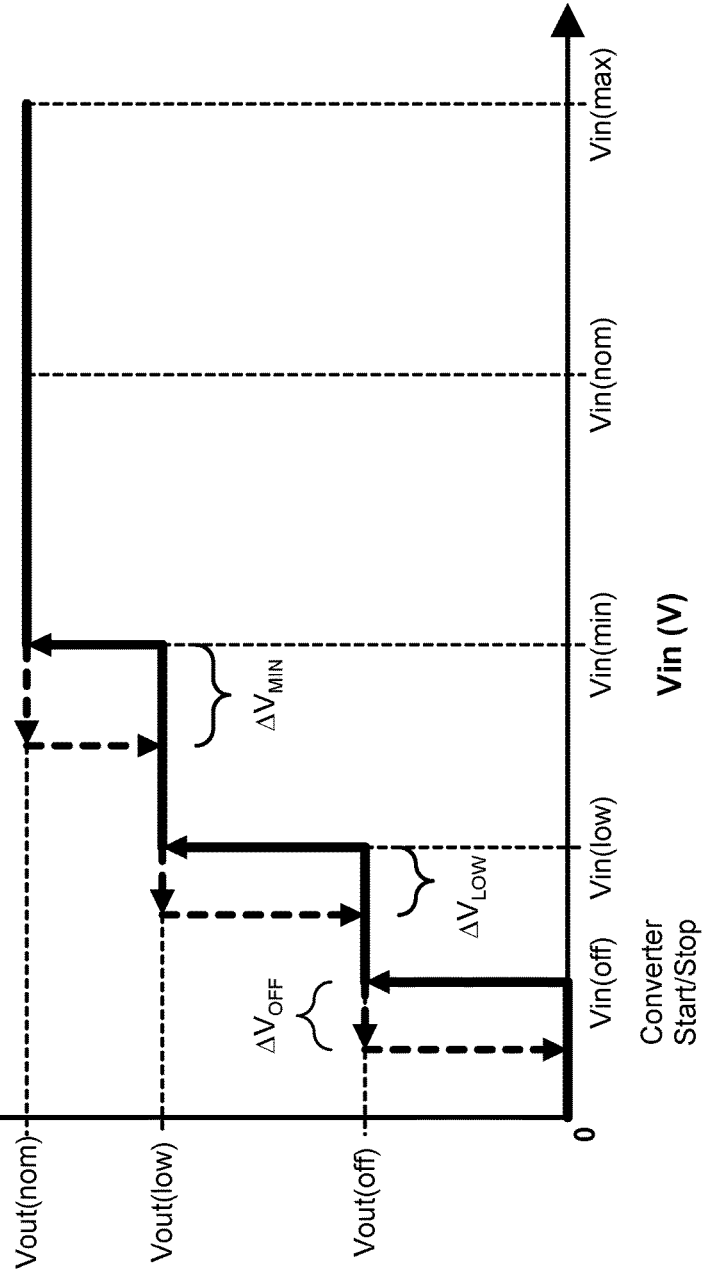
FIG. 36 illustrates an exemplary three-level voltage regulation transfer characteristic with input hysteresis.
Figure 37:
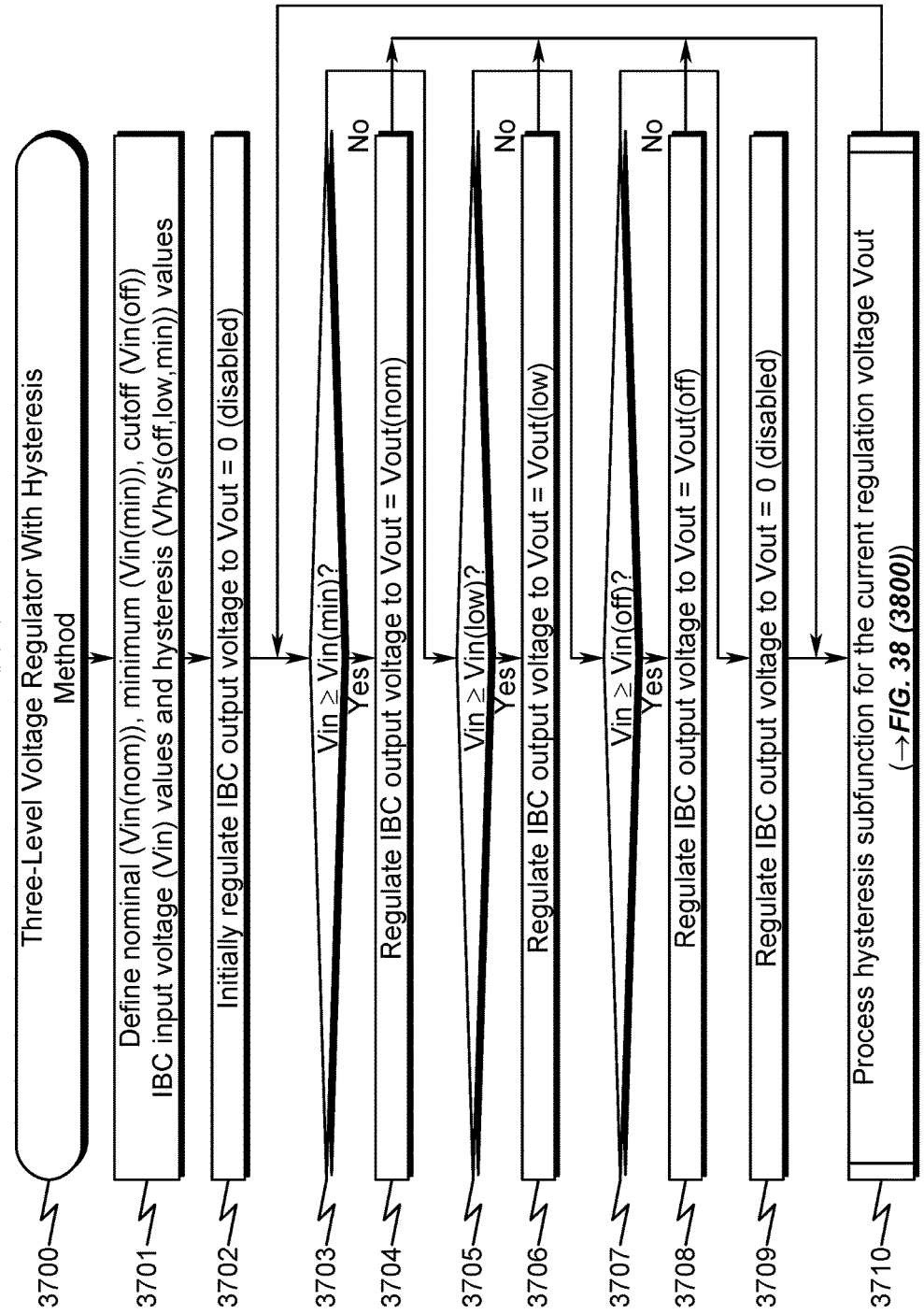
FIG. 37 illustrates a flowchart (part 1/2) depicting an exemplary three-level voltage regulator with hysteresis method.
Figure 38:
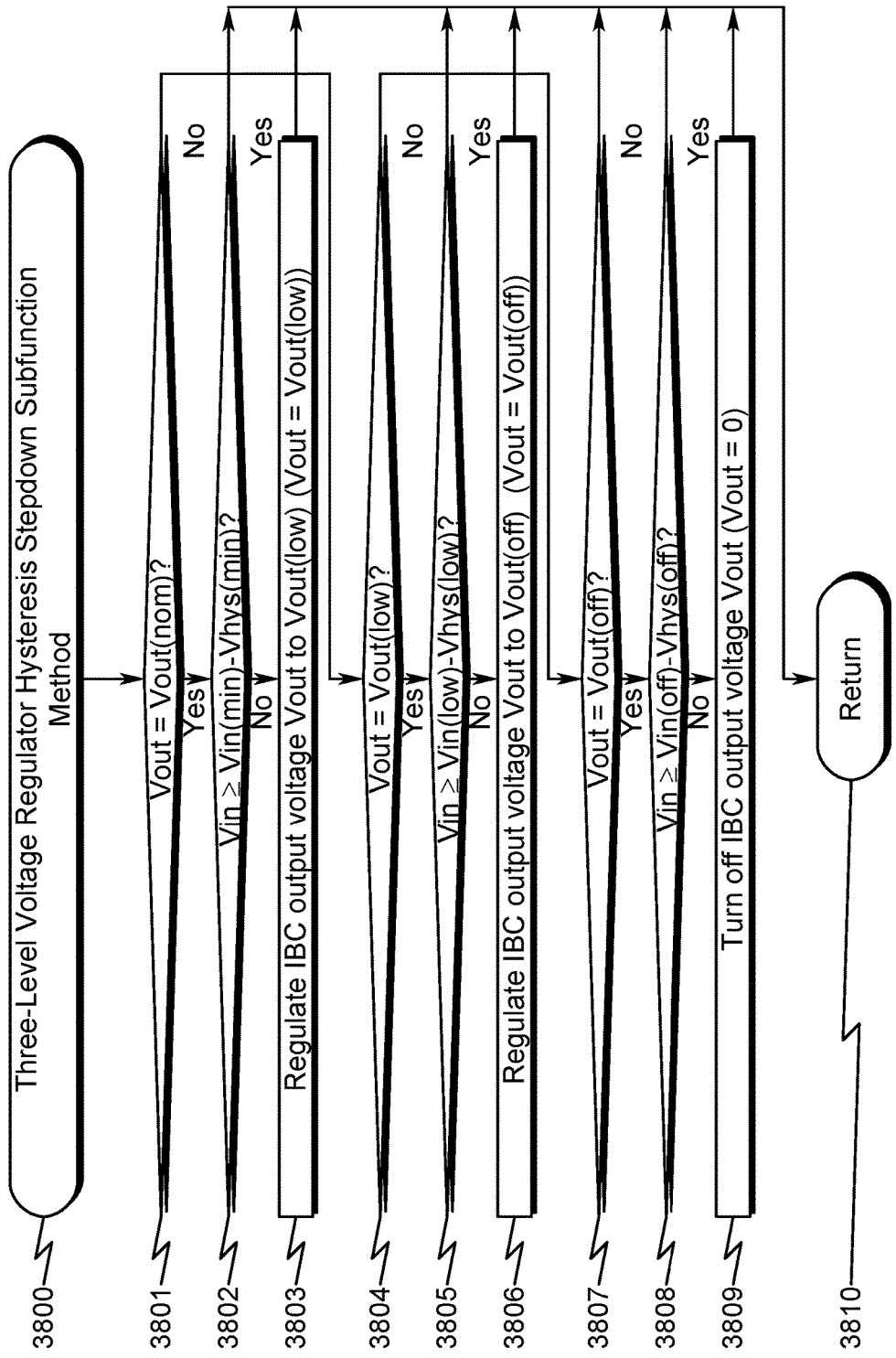
FIG. 38 illustrates a flowchart (part 2/2) depicting an exemplary three-level voltage regulator with hysteresis method.

The present invention system described above may be utilized in conjunction with a three-level regulation method (with hysteresis) as generally described in the exemplary transfer characteristic of FIG. 36 (3600) and flowcharts illustrated in FIG. 37 (3700)-FIG. 38 (3800).

Regulation Method (3700)

The steps in this three-level voltage regulator method generally comprise:
(1) defining cutoff (Vin(off)), minimum (Vin(low)), nominal (Vin(min)) IBC input voltage (Vin) values and corresponding Vhys (off,low,min) hysteresis voltage values (3701);
(2) initially regulating the IBC output voltage Vout to zero (disable) (3702);
(3) determining if Vin is greater than or equal to Vin(min), and if not, proceeding to step (5) (3703);
(4) regulating the IBC output voltage to Vout(nom) and proceeding to step (10) (3704);
(5) determining if Vin is greater than or equal to Vin(low), and if not, proceeding to step (7) (3705);
(6) regulating the IBC output voltage to Vout(low) and proceeding to step (10) (3706);
(7) determining if Vin is greater than or equal to Vin(off), and if not, proceeding to step (9) (3707);
(8) regulating the IBC output voltage to Vout(off) and proceeding to step (10) (3708);
(9) turning off the IBC output voltage (Vout) (3709); and
(10) processing a hysteresis subfunction (FIG. 38 (3800)) for the current IBC output regulation voltage Vout state value and proceeding to step (3) (3710).

In some circumstances steps (2) and/or (9) may be replaced to allow the IBC output voltage to attempt compliance as best as possible without forcing a direct shutoff of the IBC regulator. Additionally, steps (7) to (9) may be replaced by an independent input voltage turn-on and turn-off circuitry outside the voltage regulation loop.

Hysteresis Stepdown Subfunction (3800)

In conjunction with the above main Vout regulation control routine a hysteresis control subroutine function as generally illustrated in FIG. 38 (3800) may be implemented to stepdown the Vout regulation in response to Vin voltages that are below individual hysteresis voltage values (Vhys) associated with the Vin(off,low,min) thresholds. A typical subfunction to implement the hysteresis function may contain the following steps for three-level hysteresis:
(1) determining if the current Vout regulation point is set to Vout(nom) and if not proceeding to step (4) (3801);
(2) determining if Vin is greater than or equal to Vin (min)-Vhys(min), and if so, proceeding to step (10) (3802);
(3) regulating the IBC output voltage to Vout(low) and proceeding to step (10) (3803);
(4) determining if the current Vout regulation point is set to Vout(low) and if not, proceeding to step (7) (3804);
(5) determining if Vin is greater than or equal to Vin(low)-Vhys(low), and if so, proceeding to step (10) (3805);
(6) regulating the IBC output voltage to Vout(off) and proceeding to step (10) (3806);
(7) determining if the current Vout regulation point is set to Vout(off) and if not, proceeding to step (10) (3807);
(8) determining if Vin is greater than or equal to Vin(off)-Vhys(off), and if so, proceeding to step (10) (3808);
(9) turning off the IBC output voltage (Vout) (3809); and
(10) returning to the calling procedure (3810).

In this three-level example each transition point has an associated Vhys hysteresis voltage that may be independently adjusted to adjust the hysteresis windows associated with each Vout transition point. One skilled in the art will quickly realize that this three-level example can be expanded to any number of regulated Vout levels ranging from integer values greater than unity.

Generalized Multi-Level Regulation with Hysteresis (3900)-(4000)

Figure 39:
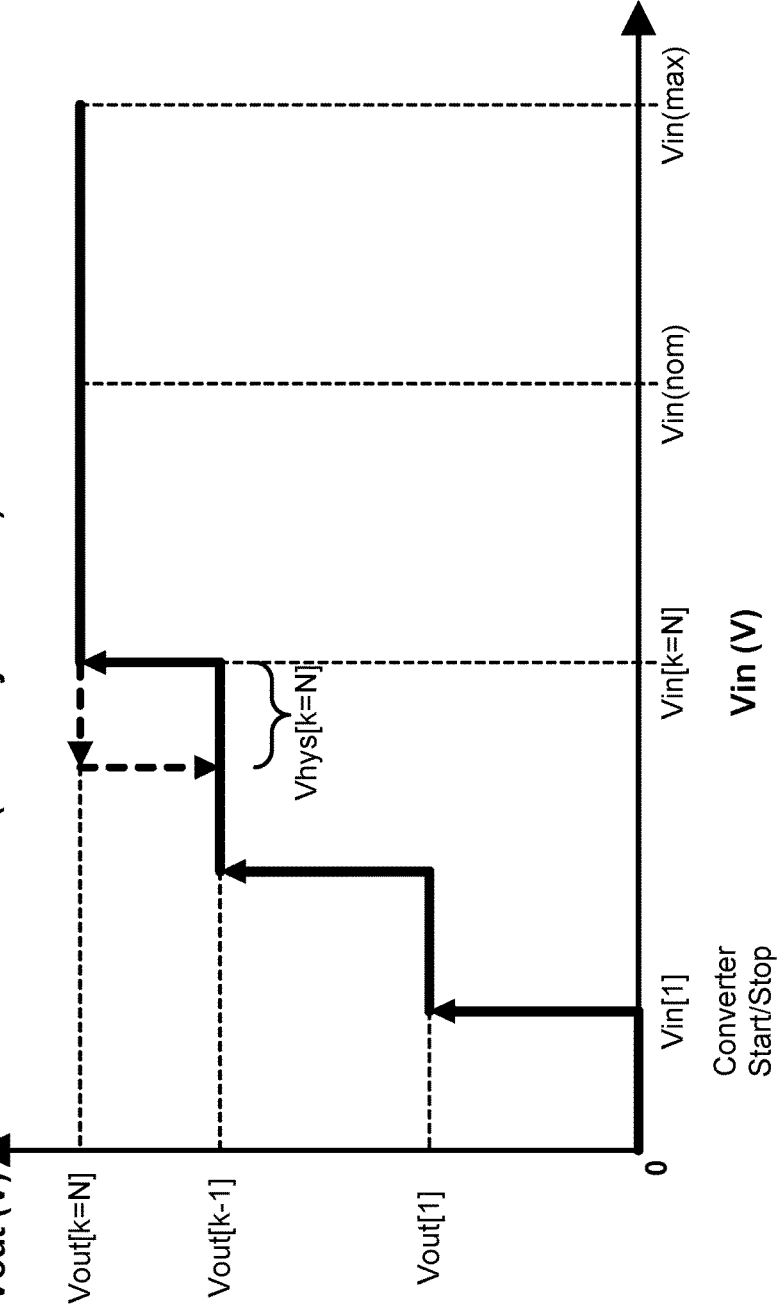
FIG. 39 illustrates an exemplary generalized multi-level voltage regulation transfer characteristic.

The three-level voltage regulation methodologies depicted in FIG. 34 (3400)-FIG. 38 (3800) can be generalized by the present invention teachings as a multi-level voltage regulation methodology as depicted by the transfer characteristic illustrated in FIG. 39 (3900). Here a tabular list (or vector) of Vin[ ] IBC input voltages, Vout[ ] IBC regulation voltages, and Vhys[ ] IBC input hysteresis voltages can be used to fully describe the multi-level regulation characteristic for N regulation levels.

Figure 40:
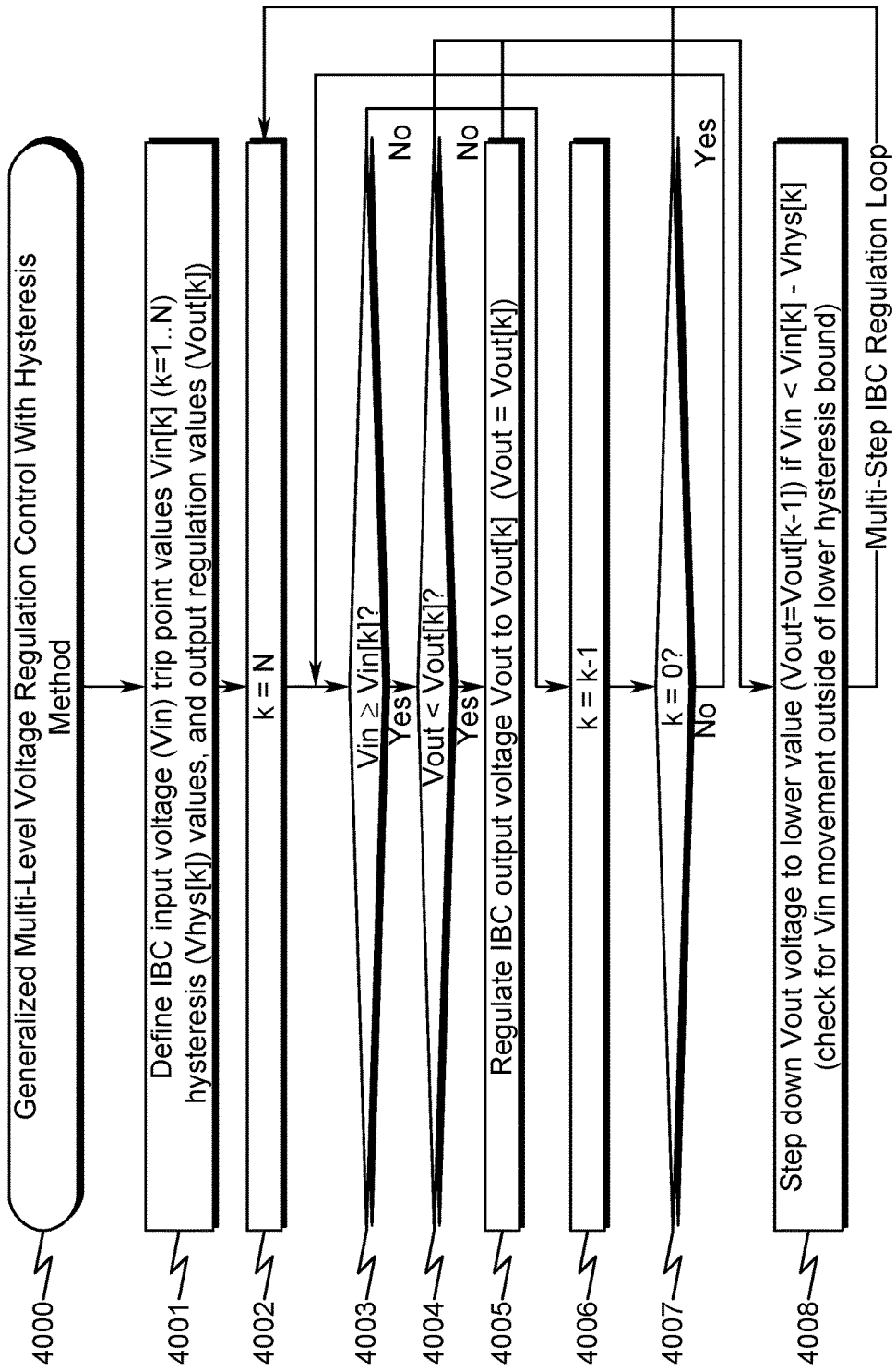
FIG. 40 illustrates a flowchart depicting an exemplary generalized multi-level voltage regulator with hysteresis method.

Implementation of this generalized method is described in the flowchart illustrated in FIG. 40 (4000). The steps in this generalized multi-level voltage regulator method generally comprise:
(1) defining IBC input voltage (Vin) trip point values Vin[k], IBC input hysteresis voltages (Vhys[k]), and output regulation values (Vout[k]) for k=1 to N IBC output regulation points (4001);
(2) initializing an index counter k=N (4002);
(3) determining either directly or indirectly whether the IBC Vin voltage greater than or equal to Vin[k], and if not, proceeding to step (6) (4003);
(4) determining the IBC Vout regulation Voltage is less than Vout[k], and if not, proceeding to step (8) (4004);
(5) regulating the IBC output voltage Vout to Vout[k] (Vout=Vout[k]) and proceeding to step (8) (4005);
(6) decrementing the index counter k (4006);
(7) determining if the index counter k is zero, and if so, proceeding to step (2), otherwise proceeding to step (3) (4007); and
(8) stepping down the IBC Vout voltage to a lower regulation voltage value (Vout=Vout[k−1]) if the IBC Vin voltage is less than Vin[k]−Vhys[k] and then proceeding to step (2) (4008).

The method as described above allows for any integer value of N as the number of steps in the multi-step IBC regulation output. Note also that in the case where individual Vhys[ ] table entries are zero, this method defaults to regulation method without hysteresis.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Generalized Control System Summary

The present invention system anticipates a wide variety of variations in the basic theme of construction, but can be generalized in the control realm as a multi-level voltage regulator system comprising:
(a) input voltage detector (IVD);
(b) voltage source reference (VSR);
(c) regulation feedback comparator (RFC); and
(d) intermediate bus DC-DC converter (IBC);

wherein
the RFC comprises a positive input node, a negative input node, and a comparison output node;
the IBC comprises a voltage bus input port (VBIP), voltage bus output port (VBOP), and voltage adjust input port (VAIP);
the RFC positive input node is electrically coupled to the VSR;
the RFC negative input node is electrically coupled to the VBOP;
the RFC comparison output node is electrically coupled to the VAIP;
the IVD is configured to monitor the VBIP and generate a stepped reference voltage (SRV) to the voltage detected at the VBIP;
the SRV modulates the comparison behavior of the RFC by adjusting the voltage at the positive input node or the voltage at the negative input node; and
the IBC is configured to modulate the voltage at the VBOP in response to the voltage at the VAIP.

This general system summary may be augmented by the various elements described herein to produce a wide variety of invention embodiments consistent with this overall design description.

Analog System Summary

The present invention system anticipates a wide variety of variations in the basic theme of construction, but can be generalized in the analog realm as a multi-level voltage regulator system comprising:
(a) input voltage detector (IVD);
(b) voltage source reference (VSR);
(c) transconducting switch (TCW);
(d) resistive voltage divider (RVD);
(e) regulation feedback comparator (RFC); and
(f) intermediate bus DC-DC converter (IBC);
wherein
the RVD comprises a reference node, internal node, and an adjustment node;
the TCW comprises a control node, a ground node, and a switch node;
the RFC comprises a positive input node, a negative input node, and a comparison output node;
the IBC comprises a voltage bus input port (VBIP), voltage bus output port (VBOP), and voltage adjust input port (VAIP);
the IVD monitors the VBIP and generates an electrical signal responsive to the voltage detected at the VBIP;
the RVD reference node is electrically coupled to the voltage output of the VSR;
the RVD adjustment node is electrically coupled to the switch node;
the positive input node is electrically coupled to the VBOP;
the negative input node is electrically coupled to the internal node;
the comparison node is electrically coupled to VAIP; and
the IBC modulates the voltage at the VBOP in response to the voltage potential at the VAIP.

This general system summary may be augmented by the various elements described herein to produce a wide variety of invention embodiments consistent with this overall design description.

Analog Method Summary

The present invention method anticipates a wide variety of variations in the basic theme of implementation, but can be generalized in the analog realm as a multi-level voltage regulator method, the method operating in conjunction with a multi-level voltage regulator system comprising:
(1) Measuring the input bus voltage (Vin) (either through primary side sensing or secondary side transformer tertiary winding sensing) that is applied to an Intermediate Bus DC-DC Converter (IBC) that further comprises a voltage bus input port (VBIP), voltage bus output port (VBOP), and voltage adjust input port (VAIP);
(2) Adjusting the output of a voltage reference generator (VRG) to a selected discrete step based on the Vin voltage measurement;
(3) Comparing the VRG output voltage to a voltage derived from the VBOP to produce an adjustment error voltage (AEV);
(4) Modulating the voltage at the VBOP by electrically coupling the AEV to the VAIP; and
(5) Proceeding to step (1);

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Digital System Summary

The present invention system anticipates a wide variety of variations in the basic theme of construction, but can be generalized in the digital realm as a multi-level voltage regulator system comprising:
(a) A/D converter (ADC);
(b) Regulator state machine (RSM);
(c) D/A converter (DAC);
(d) Reference voltage generator (RVG); and
(e) Intermediate Bus DC-DC Converter (IBC);
wherein
the ADC comprises an analog input port and a digital output port;
IBC comprises a voltage bus input port (VBIP), voltage bus output port (VBOP), and voltage adjust input port (VAIP);
the ADC analog input port is electrically coupled to the VBIP;
the RSM is configured to accept a digitized input from the ADC digital output port that is responsive to the voltage potential at the VBIP and determine a reference voltage selection (RVS) digital output;
the RVS is electrically coupled to the input of the DAC;
the DAC is configured to generate a Stepped Reference Voltage (SRV) VREF in response to the RVS;
the VREF is electrically coupled to the VAIP; and
the IBC modulates the voltage at the VBOP in response to the voltage potential at the VAIP.

This general system summary may be augmented by the various elements described herein to produce a wide variety of invention embodiments consistent with this overall design description.

Digital Method Summary

The present invention method anticipates a wide variety of variations in the basic theme of implementation, but can be generalized in the digital realm as a multi-level voltage regulator method, the method operating in conjunction with a multi-level voltage regulator system comprising:
(1) Initializing a previous Vout[old] voltage reference value;
(2) Measuring the input bus voltage (Vin) applied to an Intermediate Bus DC-DC Converter (IBC);
(3) Minimally indexing the Vin voltage within a multi-level IBC voltage regulation table to obtain a Vout [new] target output regulation value;
(4) Determining if the Vout[new] target regulation value is at or above the previous Vout[old] regulation value, and if so, proceeding to step (6);
(5) Determining if the IBC input voltage Vin is greater than or equal to the difference of the previous Vin voltage associated with the previous Vout[old] reference point minus the hysteresis voltage associated with the previous Vin voltage, and if so, proceeding to step (2);
(6) Reregulating the output voltage of the IBC by adjusting a reference voltage used by the IBC to regulate the IBC output voltage to Vout[new]; and
(7) Resetting the previous Vout[old] value to the Vout [new] IBC output regulation set point and proceeding to step (2).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated the overall scope of the present invention.

Alternate System Summary

An alternate invention system embodiment anticipates a wide variety of variations in the basic theme of construction, but can be generalized as a multi-level voltage regulator system comprising:
(a) State Space Selector (SSS);
(b) Function Parameter Table (FPT);
(c) State Measurement Sensor (SMS);
(d) Multi-Level Voltage Selector (MVS); and
(e) Sense Error Amplifier (SER);
wherein
the FPT comprises operational parameters associated with the operation of an Intermediate Bus DC-DC Converter (IBC) comprising a voltage bus input port (VBIP), voltage bus output port (VBOP), and voltage adjust input port (VAIP);
the SSS is configured to select an IBC Operational Parameter (IOP) from the FPT;
the IOP is associated with a Sensed Measurement Value (SMV) of the IBC operation that is acquired by the SMS;
the MVS is configured to generate a Stepped Reference Voltage (SRV) responsive to the IOP, the SMV, and the voltage potential at the VBIP; and
the SER is configured to accept the SMV and the SRV as inputs and generate an amplified error signal that is electrically coupled to the VAIP.

This general system summary may be augmented by the various elements described herein to produce a wide variety of invention embodiments consistent with this overall design description.

Alternate Method Summary

An alternate invention method embodiment anticipates a wide variety of variations in the basic theme of implementation, but can be generalized as a multi-level voltage regulator method, the method, operating in conjunction with a multi-level voltage regulator system comprising:
(1) defining operational parameters in a Function Parameter Table (FPT) that are associated with the operation of an Intermediate Bus DC-DC Converter (IBC) comprising a voltage bus input port (VBIP), voltage bus output port (VBOP), and voltage adjust input port (VAIP);
(2) configuring a State Space Selector (SSS) to select an IBC Operational Parameter (IOP) from the FPT;
(3) associating a Sensed Measurement Value (SMV) of the IBC operation that is acquired by a State Measurement Sensor (SMS) monitoring the IOP;
(4) generating a Stepped Reference Voltage (SRV) responsive to the IOP, the SMV, and the voltage potential at the VBIP using a Multi-Level Voltage Selector (MVS); and
(5) accepting the SMV and the SRV as inputs to a Sense Error Amplifier (SER) and generating an amplified error signal that is electrically coupled to the VAIP.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
An embodiment wherein the IVD further comprises an input voltage hysteresis characteristic.
An embodiment wherein the IVD is configured to generate a plurality of the SRV voltage levels.
An embodiment wherein the IVD is configured to generate the SRV voltage levels in a continuous fashion by generating the SRV as a continuous signal proportional to the monitored VBIP voltage.
An embodiment wherein the positive input node is electrically coupled to the VSR via a midpoint of a resistive divider that has terminal resistor nodes electrically coupled to the VSR and a transconducting switch controlled by the IVD.
An embodiment wherein the positive input node is electrically coupled to the VSR via a resistive divider electrically shunted by a transconducting switch controlled by the IVD.
An embodiment wherein the positive input node is electrically coupled to the VSR via a digital potentiometer that is controlled by the IVD.
An embodiment wherein the negative input node is electrically coupled to the VBOP via a resistive divider.
An embodiment wherin the negative input node is electrically coupled to the VBOP via a resistive divider electrically shunted by a transconducting switch controlled by the IVD.

An embodiment wherein the negative input node is electrically coupled to the VBOP through a digital potentiometer that is controlled by the IVD.

An embodiment wherein the IBC Vin voltage is sensed using the secondary of a bias supply transformer.

An embodiment wherein the IBC Vin voltage is sensed using a tertiary winding of the IBC isolation transformer.

An embodiment wherein the IBC Vin voltage sensing is used to modulate a stepped reference voltage that is then used to generate an IBC Vout error signal that controls the IBC power converter.

An embodiment wherein the IBC Vin voltage is indirectly sensed using a diode-resistor-capacitor (D-R-C) lossy integrator.

An embodiment wherein the IVD further comprises an input voltage hysteresis characteristic.

An embodiment wherein the VSR further comprises a three-terminal precision voltage reference.

An embodiment wherein the transconducting switch further comprises a MOSFET.

An embodiment wherein the negative input node is electrically coupled to the VBOP via a resistive divider electrically coupled to the VBOP.

An embodiment further comprising applying a hysteresis characteristic to the Vin voltage.

An embodiment wherein the VRG further comprises a three-terminal precision voltage reference.

An embodiment wherein the adjusting the output of a voltage reference generator (VRG) is accomplished by shunting one or more resistors in a resistor divider is accomplished by shunting one or more resistors in a resistor divider.

An embodiment wherein the voltage derived from the VBOP is derived from a resistive divider electrically coupled to the VBOP.

An embodiment further comprising a timer responsive to input from the RSM that is configured to delay RSM state transitions.

An embodiment wherein the DAC is configured to generate a plurality of the SRV VREF values.

An embodiment further comprising a clock generator electrically coupled to the ADC and the RSM that is configured to synchronize the operation of the ADC and the RSM.

An embodiment wherein the RSM triggers state transitions based on the digitized input and hysteresis parameters associated with trip points associated with voltage potentials at the VBIP.

An embodiment wherein the multi-level IBC voltage regulation table is configured to generate a plethora of Vout[new] target regulation values.

An embodiment wherein the IBC reregulation configured to occur after a hysteresis time delay An embodiment wherein the IBC reregulation configured to occur after a hysteresis time delay if the Vout[new] target regulation value is at or above the previous Vout[old] regulation value.

An embodiment wherein the IBC reregulation is configured to occur after a hysteresis time delay if the Vout[new] target regulation value is below the previous Vout[old] regulation value.

An embodiment wherein the FPT comprises a parameter selected from a group consisting of: IBC input voltage; IBC output voltage; IBC input current; IBC output current; IBC input power transfer; IBC output power transfer; IBC power dissipation; IBC voltage ripple; IBC output voltage ripple; IBC temperature; IBC transformer flux density; IBC humidity; time; and IBC environmental state.

An embodiment wherein the MVS is configured to generate a plethora of Stepped Reference Voltage (SRV) values.

An embodiment wherein the SSS is configured to select IBC input voltage; the SMS is configured to measure IBC input voltage; and the MVS is configured to generate a stepped reference voltage based on the IBC input voltage.

An embodiment wherein the FPT further comprises hysteresis parameters associated with the operational parameters.

An embodiment wherein the FPT further comprises IBC input voltage parameters and hysteresis parameters associated with the IBC input voltage parameters.

An embodiment wherein the MVS is configured to generate the SRV by modulating the reference node of a precision voltage reference using the IOP.

An embodiment wherein the SSS is configured to select a plurality of IBC Operational Parameters (IOP) from the FPT for use in determining the SRV defined by the MVS.

An embodiment wherein the SSS further comprises a data communication interface configured to allow communication with a computing device, the communication configured to enable selection of an IBC Operational Parameter (IOP) from the FPT by the computing device.

An embodiment wherein the SSS further comprises a data communication interface configured to allow communication with a computing device, the communication configured to enable configuration of the FPT by the computing device.

One skilled in the art will recognize that other embodiments are possible based on combinations of elements taught within the above invention description.

State Machine Embodiments

The present invention anticipates that in some preferred embodiments the present invention may embodied using programmable logic to implement some state machine functionality. This programmable logic may permit factory and/or field reprogramming to modify the multi-step regulation characteristics of the invention, including but not limited to input voltage trip points, output voltage regulation values, and hysteresis associated with IBC input and/or output voltage transitions.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., ROMs and CDROM read-only memory devices); (b) information alterably stored on writeable storage media (e.g., hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments may incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to *In re Beauregard*, 35 USPQ2d 1383 (U.S. Pat. No. 5,710, 578), the present invention anticipates and includes this type of computer readable media within the scope of the invention. Pursuant to *In re Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

A multi-level voltage regulator system/method providing for discrete regulation of a DC-DC intermediate bus converter (IBC) voltage output has been disclosed. The disclosed system/method allows the IBC output voltage to be regulated in discrete steps during periods where the IBC input voltage falls below nominal operating values. Rather than shutting down or degrading IBC output voltage in an unpredictable non-linear fashion based on IBC input/loading, the IBC fixes the output voltage regulation in discrete steps, allowing IBC-connected point-of-load (POL) converters to obtain stable power input that is well-defined over IBC input voltages. IBC operating parameters may define multi-dimensional operational state spaces of IBC output regulation that ensure optimum power flow to attached POLs while maintaining operational stability within the IBC regulator. Instabilities in IBC/POL performance across variations in IBC input voltage, load transients, POL loading, and environmental variables may be prevented using voltage step hysteresis.

What is claimed is:

1. A multi-level voltage regulator system comprising:
   (a) State Space Selector (SSS);
   (b) Function Parameter Table (FPT);
   (c) State Measurement Sensor (SMS);
   (d) Multi-Level Voltage Selector (MVS); and
   (e) Sense Error Amplifier (SER);
   wherein:
   said FPT comprises operational parameters associated with the operation of an isolated Intermediate Bus DC-DC Converter (IBC) comprising a voltage bus input port (VBIP), voltage bus output port (VBOP), and voltage adjust input port (VAIP);
   said SSS is configured to select an IBC Operational Parameter (IOP) from said FPT;
   said IOP is associated with a Sensed Measurement Value (SMV) of said IBC operation that is acquired by said SMS;
   said MVS is configured to generate a Stepped Reference Voltage (SRV) responsive to said IOP, said SMV, and the voltage potential at said VBIP; and
   said SER is configured to accept said SMV and said SRV as inputs and generate an amplified error signal that is electrically coupled to said VAIP.

2. The multi-level voltage regulator system of claim 1 wherein said FPT comprises a parameter selected from a group consisting of: IBC input voltage; IBC output voltage; IBC input current; IBC output current; IBC input power transfer; IBC output power transfer; IBC power dissipation; IBC converter PWM duty cycle; IBC converter operation frequency; IBC input voltage ripple; IBC output voltage ripple; IBC temperature; IBC transformer flux density; IBC humidity; time; and IBC environmental state.

3. The multi-level voltage regulator system of claim 1 wherein said MVS is configured to generate a plethora of Stepped Reference Voltage (SRV) values.

4. The multi-level voltage regulator system of claim 1 wherein said SSS is configured to select IBC input voltage; said SMS is configured to measure IBC input voltage; and said MVS is configured to generate a stepped reference voltage based on said IBC input voltage.

5. The multi-level voltage regulator system of claim 1 wherein said FPT further comprises hysteresis parameters associated with said operational parameters.

6. The multi-level voltage regulator system of claim 1 wherein said FPT further comprises IBC input voltage parameters and hysteresis parameters associated with said IBC input voltage parameters.

7. The multi-level voltage regulator system of claim 1 wherein said MVS is configured to generate said SRV by modulating the reference node of a precision voltage reference using said IOP.

8. The multi-level voltage regulator system of claim 1 wherein said SSS is configured to select a plurality of IBC Operational Parameters (IOP) from said FPT for use in determining the SRV defined by said MVS.

9. The multi-level voltage regulator system of claim 1 wherein said SSS further comprises a data communication interface configured to allow communication with a computing device, said communication configured to enable selection of an IBC Operational Parameter (IOP) from said FPT by said computing device.

10. The multi-level voltage regulator system of claim 1 wherein said SSS further comprises a data communication interface configured to allow communication with a computing device, said communication configured to enable configuration of said FPT by said computing device.

11. A multi-level voltage regulator method comprising:
   (1) defining operational parameters in a Function Parameter Table (FPT) that are associated with the operation of an isolated Intermediate Bus DC-DC Converter (IBC) comprising a voltage bus input port (VBIP), voltage bus output port (VBOP), and voltage adjust input port (VAIP);
   (2) configuring a State Space Selector (SSS) to select an IBC Operational Parameter (IOP) from said FPT;
   (3) associating a Sensed Measurement Value (SMV) of said IBC operation that is acquired by a State Measurement Sensor (SMS) monitoring said IOP;
   (4) generating a Stepped Reference Voltage (SRV) responsive to said IOP, said SMV, and the voltage potential at said VBIP using a Multi-Level Voltage Selector (MVS); and
   (5) accepting said SMV and said SRV as inputs to a Sense Error Amplifier (SER) and generating an amplified error signal that is electrically coupled to said VAIP.

12. The multi-level voltage regulator method of claim 11 wherein said FPT comprises a parameter selected from a group consisting of: IBC input voltage; IBC output voltage; IBC input current; IBC output current; IBC input power transfer; IBC output power transfer, IBC power dissipation; IBC converter PWM duty cycle; IBC converter operation frequency; IBC input voltage ripple; IBC output voltage ripple; IBC temperature; IBC transformer flux density; IBC humidity; time; and IBC environmental state.

13. The multi-level voltage regulator method of claim 11 wherein said MVS is configured to generate a plethora of Stepped Reference Voltage (SRV) values.

14. The multi-level voltage regulator method of claim 11 wherein said SSS is configured to select IBC input voltage; said SMS is configured to measure IBC input voltage; and said MVS is configured to generate a stepped reference voltage based on said IBC input voltage.

15. The multi-level voltage regulator method of claim 11 wherein said FPT further comprises hysteresis parameters associated with said operational parameters.

16. The multi-level voltage regulator method of claim 11 wherein said FPT further comprises IBC input voltage parameters and hysteresis parameters associated with said IBC input voltage parameters.

17. The multi-level voltage regulator method of claim 11 wherein said MVS is configured to generate said SRV by modulating the reference node of a precision voltage reference using said IOP.

18. The multi-level voltage regulator method of claim 11 wherein said SSS is configured to select a plurality of IBC Operational Parameters (IOP) from said FPT for use in determining the SRV defined by said MVS.

19. The multi-level voltage regulator method of claim 11 wherein said SSS further comprises a data communication interface configured to allow communication with a computing device, said communication configured to enable selection of an IBC Operational Parameter (IOP) from said FPT by said computing device.

20. The multi-level voltage regulator method of claim 11 wherein said SSS further comprises a data communication interface configured to allow communication with a computing device, said communication configured to enable configuration of said FPT by said computing device.

* * * * *